US007379903B2

(12) United States Patent
Caballero et al.

(10) Patent No.: US 7,379,903 B2
(45) Date of Patent: May 27, 2008

(54) USER INTERFACE FOR A COMPLEX ORDER PROCESSING SYSTEM

(75) Inventors: Richard Joseph Caballero, San Mateo, CA (US); Mark David Lewis, Castle Rock, CO (US); Carlos Alejandro Sandrea, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 555 days.

(21) Appl. No.: 10/028,541

(22) Filed: Dec. 19, 2001

(65) Prior Publication Data

US 2007/0203798 A1 Aug. 30, 2007

Related U.S. Application Data

(63) Continuation of application No. 10/024,691, filed on Dec. 17, 2001.

(51) Int. Cl.
*G06Q 30/00* (2006.01)
(52) U.S. Cl. ...................................................... 705/26
(58) Field of Classification Search .................. 705/26, 705/27, 37
See application file for complete search history.

(56) References Cited

U.S. PATENT DOCUMENTS

| | | | | | |
|---|---|---|---|---|---|
| 5,319,542 | A | * | 6/1994 | King et al. ..................... | 705/27 |
| 5,704,044 | A | | 12/1997 | Tarter et al. .................... | 705/4 |
| 5,758,327 | A | * | 5/1998 | Gardner et al. ................ | 705/26 |
| 5,799,289 | A | * | 8/1998 | Fukushima et al. ......... | 705/400 |
| 5,839,112 | A | | 11/1998 | Schreitmueller et al. ........ | 705/4 |
| 5,870,717 | A | * | 2/1999 | Wiecha ........................ | 705/26 |
| 5,956,024 | A | | 9/1999 | Strickland et al. .......... | 715/717 |
| 5,987,423 | A | | 11/1999 | Arnold et al. ................. | 705/14 |
| 6,052,667 | A | | 4/2000 | Walker et al. ................. | 705/15 |
| 6,064,987 | A | | 5/2000 | Walker et al. ................. | 705/38 |
| 6,112,185 | A | | 8/2000 | Walker et al. .................. | 705/6 |
| 6,587,838 | B1 | | 7/2003 | Esposito et al. .............. | 705/26 |
| 6,606,603 | B1 | * | 8/2003 | Joseph et al. ................. | 705/26 |
| 6,876,977 | B1 | * | 4/2005 | Marks .......................... | 705/26 |
| 6,910,018 | B1 | * | 6/2005 | Okada et al. ................. | 705/26 |
| 7,039,604 | B1 | * | 5/2006 | Srinivasan et al. ........... | 705/26 |
| 7,096,189 | B1 | * | 8/2006 | Srinivasan .................... | 705/11 |
| 7,127,415 | B1 | * | 10/2006 | Verchere ....................... | 705/26 |

OTHER PUBLICATIONS

Anonymous, www.cplusplus.com, Sep. 30, 2000, p. 14.
Anonymous, www.mindview.net, Jun. 14, 2001, p. 22.

* cited by examiner

*Primary Examiner*—Gerald J. O'Connor
(74) *Attorney, Agent, or Firm*—Campbell Stephenson LLP; Samuel G. Campbell, III

(57) ABSTRACT

A user interface for a computerized complex order processing system presents a list of products and services associated with an account, a list of quotes associated with the account, a list of orders associated with the account, and several user-selectable options. The options allow the user to transfer a service profile by defaulting the existing services at an old location to a new location; add, modify, and disconnect products and services the service profile, quotes, and orders associated with a selected account. The options further allow the user to accept a quote, convert the quote to a sales order, update the amount of revenue to be generated by a quote, approve an order, and submit the order for provisioning.

15 Claims, 73 Drawing Sheets

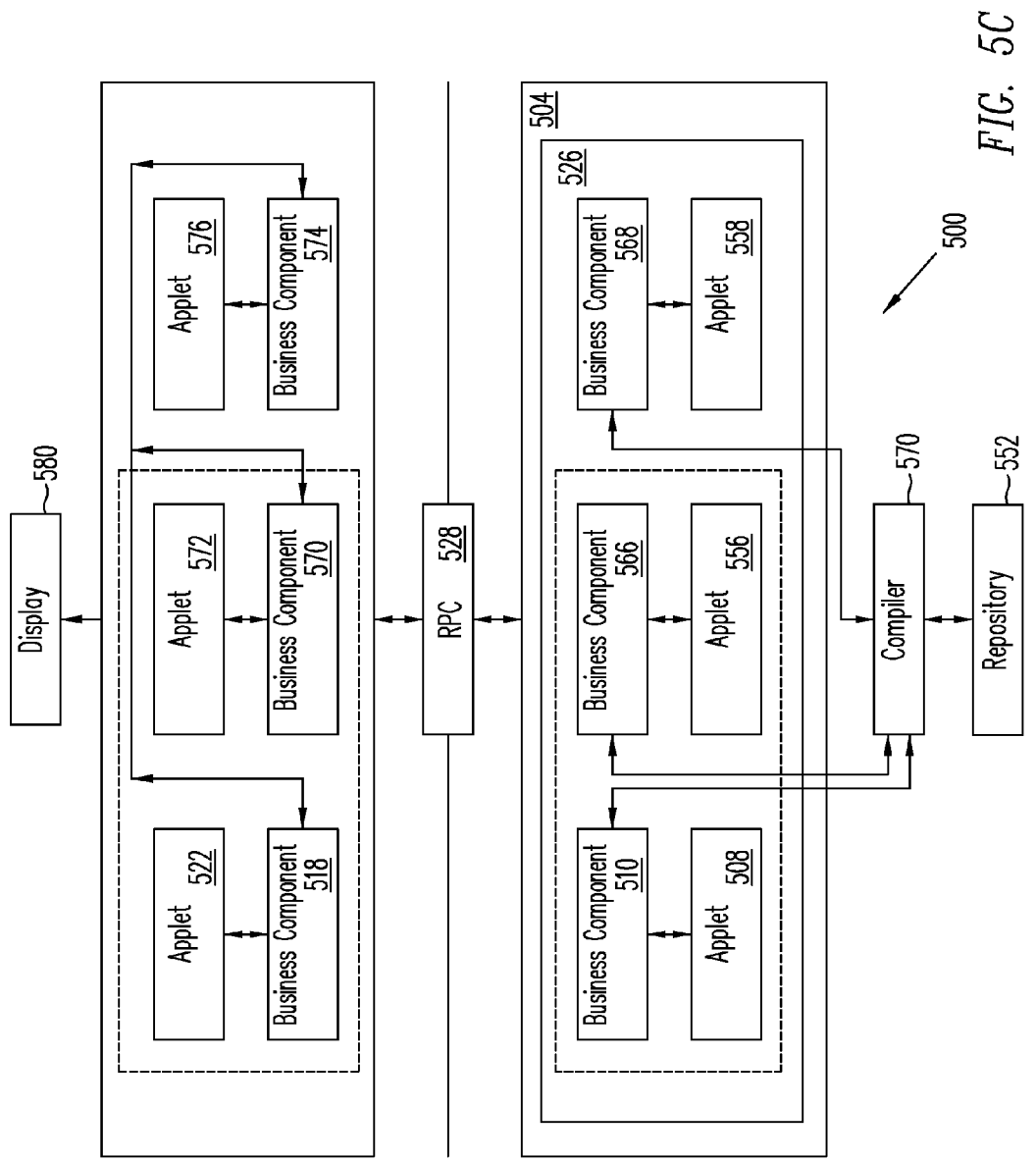

FIG. 9B

| New | Name | Move | Parent | Main Phone# | Status | Type | Account Team | Account |
|---|---|---|---|---|---|---|---|---|
| | ABC Americas East | | | (908) 456-8900 | Active | Distributor | SADMIN | Customer |
| | ABC Mart #18 | Montgomery | | (908) 325-6701 | Active | Retailer | SADMIN | Customer |
| ☐ | ABC Mart #17 | Princeton | ABC America East | (908) 325-6702 | Active | Retailer | SADMIN | Customer |
| | ABC Mart #21 | Pennington | | (908) 325-7801 | Active | Retailer | SADMIN | Customer |
| | ABC Mart HQ | HQ | | (908) 456-8900 | Active | Distributor | SADMIN | Customer |
| | Ace Corporation | | | (908) 456-8900 | Active | Distributor | SADMIN | Customer |
| | Americas Accounts | | | (908) 456-8900 | Active | Distributor | SADMIN | Customer |

*Name: ABC Mart #17    Site: Princeton    Synonyms:    *Account Type: Retailer

Address Line 1: ABC Mart #17    Address Line 2:    Status: Active    Main Phone #: (908) 325-6702

City:    State:    Industry:    Main Fax #: (908) 325-6705

Zip:    Country:    Account Team: SADMIN    *Account Class: Customer

FIG. 9C

Quote:

| Quote | | | | | | | | | |
|---|---|---|---|---|---|---|---|---|---|
| ▣▷ | New | Save | Verify | Browse Catalog | Revise | Update Opportunity | Get Advice | ◁▷ 1 of 7+ | |

Quote #:     Opportunity: [ ... ]     Account: [Marriot International] [...]     Site: [HQ]

1-10MLH

Revision: [1]     *Status: [Order Placed ▷]     Last Name: [Dalton]     *Sales Rep: [SADMIN]

*Name: [1-10MLH]     Price Lists: [Application List – eBusiness] [...]     First Name: [Mike]     Effective: [8/3/2001 ▷]

Active: ☒     Discount: [ ▷]     *Currency: [USD] [...]     Through: [9/2/2001 ▷]

Comments:     Agreement Name: [ ] [...]     Service Account: [Marriot International] [...]     *Created: [8/3/2001]

Organization: [Default Organization] [...]     Billing Account: [Marriot International] [...]     Due: [ ▷]

934 ↗

| More Info | Agreements | Attachments | Bill To/Ship To | Line Items | Line Item (SAP) | Orders | Terms & Totals | Charts |
|---|---|---|---|---|---|---|---|---|
| ▣▷ | New | Save | Reprice | Reprice All | Customize | Renumber | Profile | Ungroup | ▣ ≡ ◁▷ 1 – 4 |

| Sequence | Qty ⇕ | Item | Start Price ⇕ | Net Price | Extended Price | U/M | Service ID | Service Point ID | Action |
|---|---|---|---|---|---|---|---|---|---|
| ▤ 1 | 10 | California Wireless | 150.00 | 150.00 | 1500.00 | Each | | 12-48HDJ39 | Add |

| | More Info | Agreements | Attachments | Bill To/Ship To | Line Items | Line Item (SAP) | Orders | Terms & Totals | Charts | | | 936 |
|---|---|---|---|---|---|---|---|---|---|---|---|---|
| New | Save | Reprice | Reprice All | Delta Quote | | | Renumber | Profile | Ungroup | | | |

| Sequence | Qty | Item | Start Price | Net Price | Extended Price | UoM | Service ID | Service Point ID | Action |
|---|---|---|---|---|---|---|---|---|---|
| 1 | 10 | California Wireless | 150.00 | 150.00 | 1500.00 | Each | | | |
| 2 | 1 | Call Waiting | 3.00 | 3.00 | 30.00 | Per Month | 273498201 | 12-48HDJ39 | Update |
| 3 | 1 | Nokia 8009 | 160.00 | 160.00 | 160.00 | Each | | | Add |
| 4 | 1 | Hands Free Accessn | 25.00 | 0.00 | 0.00 | Each | | | Delete |

Totals | Line Item Detail | Attributes

Save | 1 of 7+

| Item Total MRC: | Item Total NRC: | Comments: |
|---|---|---|
| 30.00 | 150.00 | Description of pricing, discounts and adjustments for both MRC and NRC. |
| Total Item Discount MRC: | Total Item Discount NRC: | |
| 10.00 | 100.00 | |
| Net Total MRC: | Net Total NRC: | |
| 20.00 | 50.00 | |
| Adjustment MRC: | Adjustment NRC: | |
| 0 | 0 | |

| Sequence | Qty | Item | Start Price | Net Price | Extended Price | UoM | Service ID | Service Point ID | Action |
|---|---|---|---|---|---|---|---|---|---|
| 1 | 10 | California Wireless | 150.00 | 150.00 | 1500.00 | Each | | 12-48HDJ39 | Update |
| 2 | 1 | Call Waiting | 3.00 | 3.00 | 30.00 | Per Month | 273498201 | | Add |
| 3 | 1 | Nokia 8009 | 160.00 | 160.00 | 160.00 | Each | | | |
| 4 | 1 | Hands Free Accessin | 25.00 | 0.00 | 0.00 | Each | | | Delete |

Tabs: More Info | Agreements | Attachments | Bill To/Ship To | Reprice All | Delta Quote | Customize | Sum components | Service | Renumber | Profile | Ungroup | Orders | Terms & Totals | Charts Totals | Line Item Detail | Attributes | Deals    1 of 5

Product: California Wireless 600
Service ID:
Service Point ID:
Action: Add
Package:
Service: ☒
Service Asset #:

Service Account: A.K. Parker (Service)
Billing Account: A.K. Parker (Billing)
Agreement Name: Test Agreement
Qty: 10
Write-In Product:
Attributes:
Covered Product:

Start Price: 89.99
Disc %: 10
Disc Amount:
Disc Price:
☐ Keep Discount:
Current Discount:
Next Discount:
Net Disc %: 10

UoM:
Comment:
Pricing Co
Product
Part #:
Upsell:

936

| | | | | | | | | | |
|---|---|---|---|---|---|---|---|---|---|
| More Info | Agreements | Attachments | Bill To/Ship To | Line Items | Line Item (SAP) | Orders | Terms & Totals | Charts | |
| ⊞▽ | (New) (Save) (Reprice) (Reprice All) (Delta Quote) | | | | (Renumber) (Profile) (Ungroup) | | ⊟◁▷ 1-4 of 4 | | |
| Sequence | Qty⇕ | Item | Start Price⇕ | Net Price | Extended Price | UoM | Service ID | Service Point ID | Action | Service Account | Billing Account | Agreement Name |

Table at top (936):

| Sequence | Qty | Item | Start Price | Net Price | Extended Price | UoM | Service ID | Service Point ID | Action | Service Account | Billing Account | Agreement Name |
|---|---|---|---|---|---|---|---|---|---|---|---|---|
| 1 | 10 | California Wireless | 150.00 | 150.00 | 150.00 | Each | | 12-48HDJ39 | | A.K. Parker (Service) | A.K. Parker (Billing) | Test Agreement |
| 2 | 1 | Call Waiting | 3.00 | 3.00 | 3.00 | Per Month | 273498201 | | Update | A.K. Parker (Service) | A.K. Parker (Billing) | Test Agreement |
| 3 | 1 | Nokia 8009 | 160.00 | 160.00 | 160.00 | Each | | | Add | A.K. Parker (Service) | A.K. Parker (Billing) | Test Agreement |
| 4 | 1 | Hands Free Accessin | 25.00 | 25.00 | 25.00 | Each | | | Delete | A.K. Parker (Service) | A.K. Parker (Billing) | Test Agreement |

Lower table:

| Totals | Line Item Detail | Attributes |
|---|---|---|
| (Save) | ◁▷ 1-2 of 2 | |

| Attribute Name | Data Type | Value | Description | Action |
|---|---|---|---|---|
| No. of Rings | Number | 6 | Number of rings before call is forwarded | Update |
| Forwarding No. | Text | (650) 278-3632 | Number to forward call to | |

Quote:

Quote

Quote #: 1-10MLH
Revision: 1
*Name: 1-10MLH
Active: ☒

Opportunity:
*Status: Order Placed
Price Lists: Application List – eBusiness
Discount:

Account: Marriot International
Last Name: Dalton
First Name: Mike
*Currency: USD Agreements | Attachments | Bill To/Ship To | Shipments | Product Search | Line Items | Lin

| Order # | Order Date | Type | Status | Account | Priorit |
|---|---|---|---|---|---|
| 1972-1719601 | 9/18/2001 2:39:26 PM | Sales Order | Open | Marriot International | Medium |

Sales Order
Service Order

Columns Displayed...
Advanced Sort...
Change Records
Merge Records

Import...
Export...

Select All
Invert Selection

New Record
Edit Record

Save Record
Copy Record
Undo Record
Delete Record

New Query
Run Query
Refine Query

First Records
Last Records

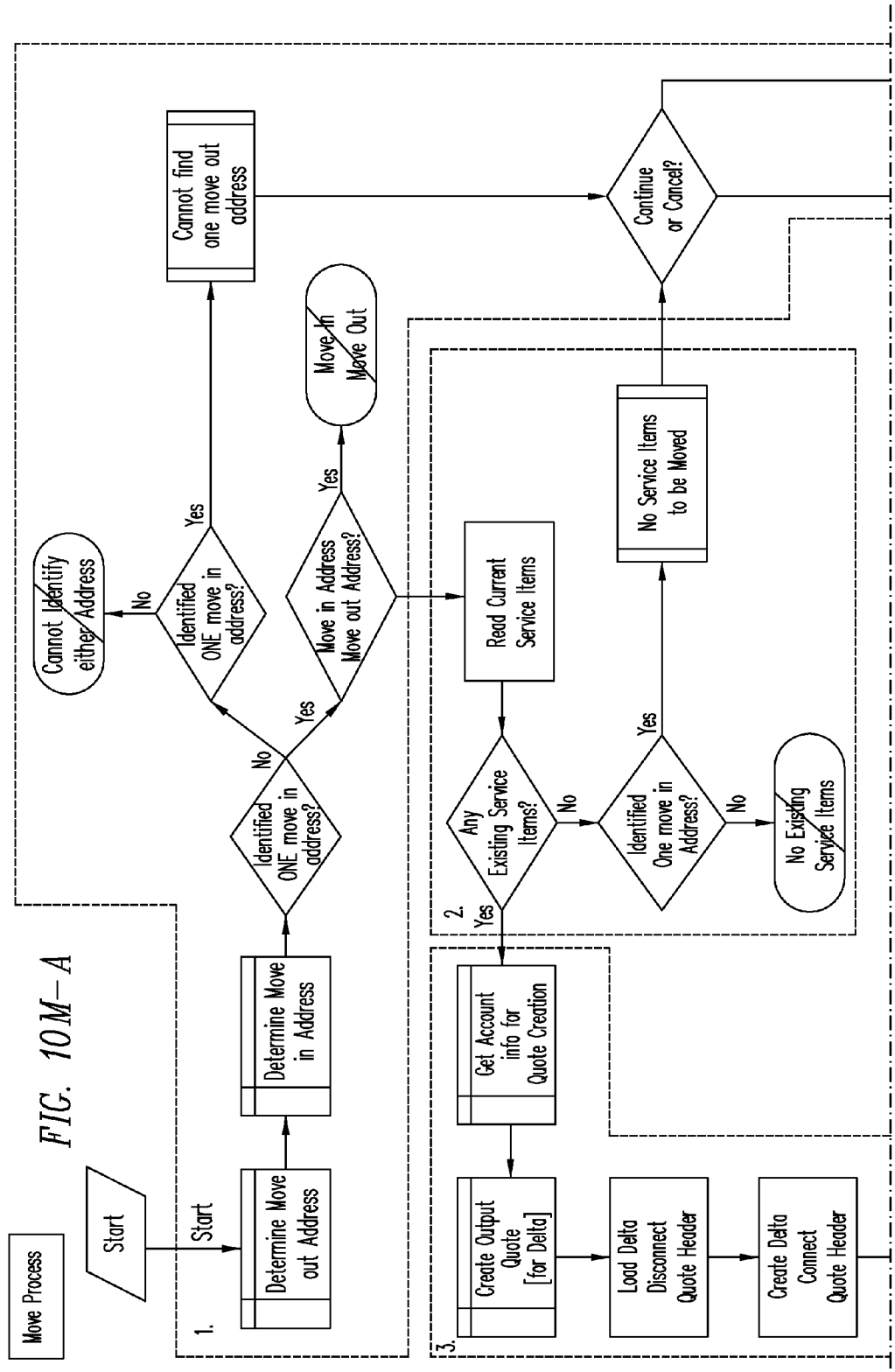
FIG. 10M-A

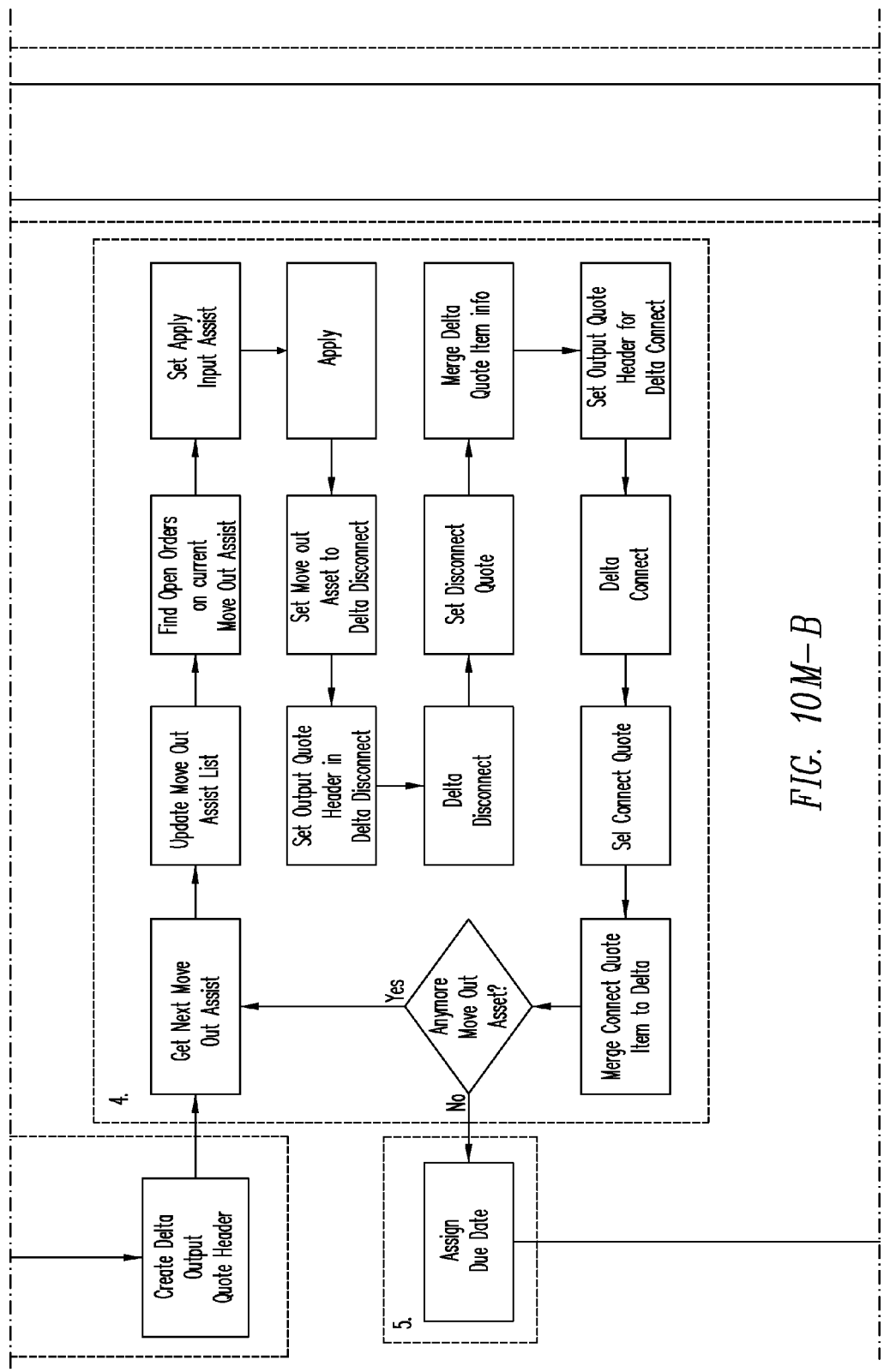
FIG. 10M-B

FIG. 10M-C

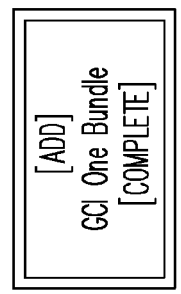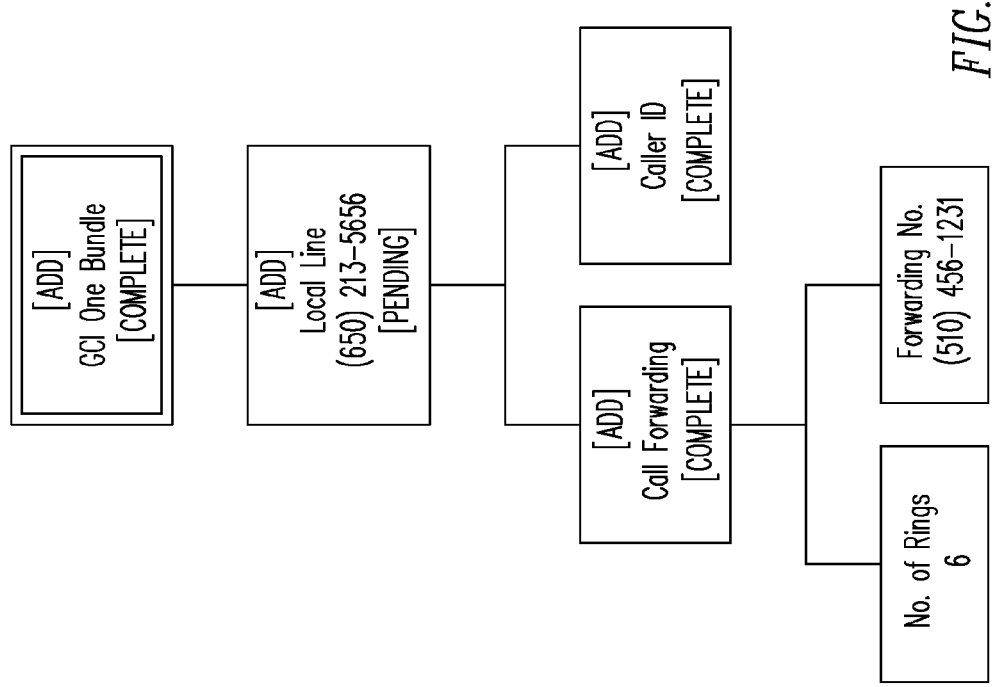
FIG. 11N-2
FIG. 11N-1

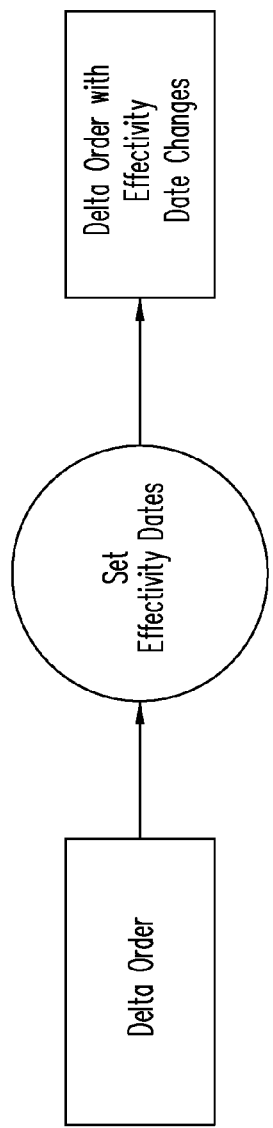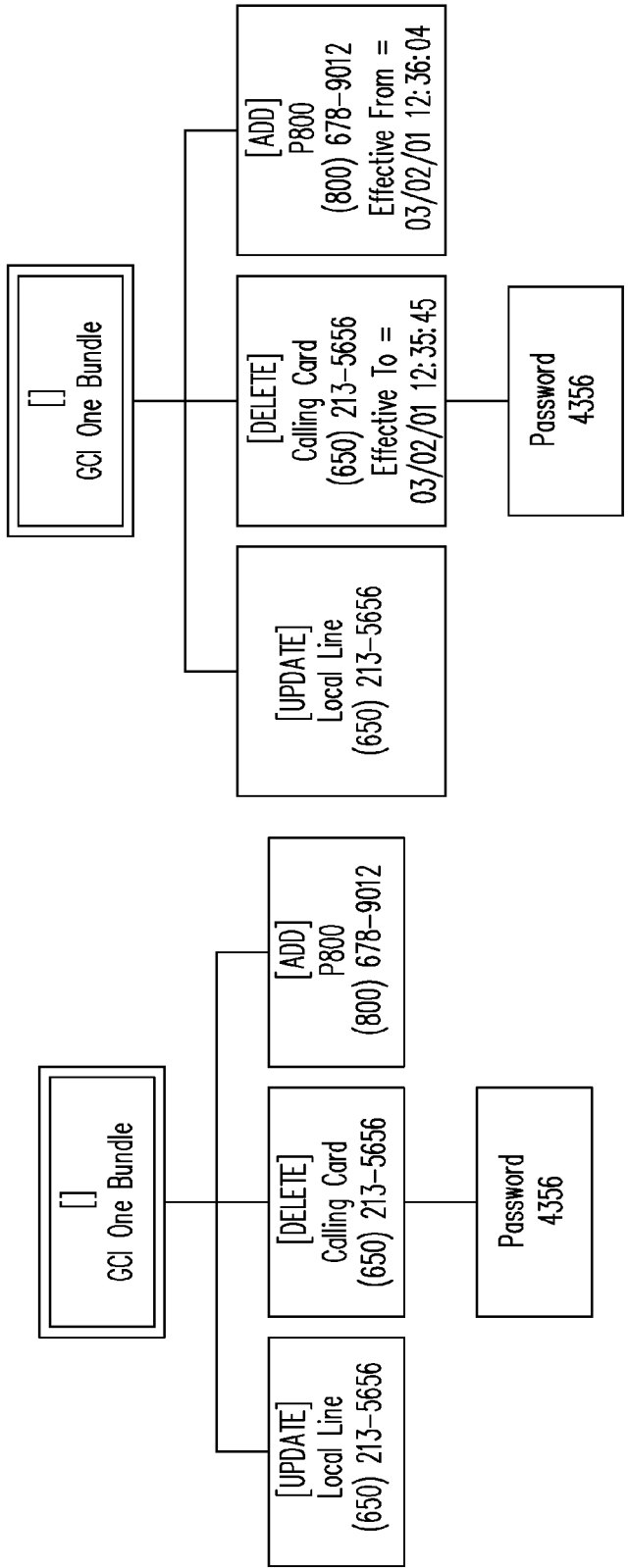
FIG. 11R
FIG. 11S-2
FIG. 11S-1

USER INTERFACE FOR A COMPLEX ORDER PROCESSING SYSTEM

REFERENCE TO RELATED APPLICATION

This application is a continuation of U.S. patent application Ser. No. 10/024,691 entitled "System and Method for Processing Complex Orders," filed Dec. 17, 2001, which is assigned to the same assignee as the present disclosure.

BACKGROUND

Virtually every company provides goods and/or services to their customers. The goods and services often include several components that can be ordered to the customer's specifications. For example, a telephone company can provide wireless and wired phone service, access to the Internet via one or more communication links such as wireless access, a digital subscriber line (DSL), or a T1 line, and hardware for accessing the services. During the initial ordering process, it is common for a customer to select and change various components or service options over a period of time until the goods are delivered and services are established or performed. As the needs of a customer change over time, the customer can choose to add or remove services, or upgrade some of the products or components in the products.

Many companies, such as communications and energy companies, bill for their services by a mix of one-time fees (e.g. installation or disconnection), recurring charges (e.g. a monthly access charge) and usage based charges (e.g. long distance calling charges). The recurring and usage based rates are determined when the request for service is captured as a quote or an order. After the initial installation order is provisioned, those rates can be re-priced due to an update to the price list, or the addition or removal of other products and services that impact the pricing of all services offered to the customer (e.g. adding a new local line qualifies the customer for a volume discount on the recurring charge for all local lines).

It is often convenient to provide customers with a system to view the configuration of a product or service options currently selected, and to modify the selections until a more desirable configuration or set of options is ordered. Such a system would allow the customer to modify the selections themselves, or with the help of a sales agent. As an order develops and is completed, it is desirable to allow distributors to access the system to determine inventory and service levels required to provision the order.

SUMMARY

A system and method for processing complex orders in accordance with the present invention includes features designed to meet the needs of companies whose product offerings include complex services and products, such as those in the communication and energy industries. Users can capture and validate customer orders for complex combinations of products and services.

For example, a single sales order for a telecommunications customer can contain products and services from multiple suppliers, each provisioned in a different way. Such an order might include service installation, monthly-billed services (such as voice mail and usage-based calling plans), and feature services such as call forwarding. The customer can configure the exact characteristics of the services they want and need. These services can have different price types—one time, recurring, and usage-based—in the same order. In addition, the life cycle of the services is supported as they are created, modified, moved, and retired, as the customer's needs change.

Through a combination of workflows and business service methods, a complex order processing system in accordance with the present invention automates some important processes that support complex orders by allowing customer service representatives, sales representatives, and customers to:

create accurate quotes for new products and services;

create accurate quotes to modify existing products and services;

modify in-process orders that have been submitted for provisioning;

create orders to move services from one location to another;

create orders to disconnect services when customers no longer want them; and generate accurate order information for submission to back office billing and provisioning systems.

In addition, companies can have multiple price types and totals for products and services. Pricing models can include one-time, periodic, and usage-based charges. Complex order processing in accordance with the present invention integrates with other front-end applications that allow companies set up the structure required for order management by defining products, pricing structures, and catalogs of products. On the back end, these applications include the ability to decompose orders into multiple work orders and route them to the appropriate system for provisioning service.

In some embodiments, A user interface for a computerized complex order processing system presents a list of products and services associated with an account, a list of quotes associated with the account, a list of orders associated with the account, and several user-selectable options. The options allow the user to transfer a service profile by defaulting the existing services at an old location to a new location; add, modify, and disconnect products and services the service profile, quotes, and orders associated with a selected account. The options further allow the user to accept a quote, convert the quote to a sales order, update the amount of revenue to be generated by a quote, approve an order, and submit the order for provisioning. Multiple assets, quotes, and orders can be associated with a customer, and the user can view information regarding the status of each asset, quote, and order, as well as whether a price type of a product or service item is a one-time charge, recurring, or usage-based.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention can be better understood, and its numerous objects, features and advantages made apparent to those skilled in the art by referencing the accompanying drawings.

The use of the same reference symbols in different drawings indicates similar or identical items.

FIG. 5C shows an alternative view of the exemplary framework or infrastructure shown in FIG. 5A.

FIG. 9B shows an example of an Identify Account View that allows the user to review high level information for a customer account in one frame, and additional information about the selected account in another frame that can be utilized in the complex order processing system of FIG. 7B.

FIG. 9C shows an example of a Customer Portal View that allows the user to view, add, modify, and disconnect assets for a customer account that can be utilized in the complex order processing system of FIG. 7B.

FIGS. 9D-1 through 9D-4 show an example of a Quote Line Items View that can be utilized in the complex order processing system of FIG. 7B.

FIG. 9E shows an example of an Order Line Items View that can be utilized in the complex order processing system of FIG. 7B.

FIG. 10B-1 shows a flowchart for an embodiment of the Modify Products and Services Process that can be utilized in the complex order processing system of FIG. 7B.

FIG. 10B-2 shows a flowchart of the logic for implementing the Modify Asset Sub-process shown in FIG. 10B-1.

FIG. 10C-1 shows a flowchart of an embodiment of a Disconnect Products and Services Process that can be utilized in the complex order processing system of FIG. 7B.

FIG. 10C-2 shows a flowchart of an embodiment of the Disconnect Assets Sub-process of FIG. 10C-1.

FIG. 10H-1 shows a flowchart of an embodiment of a Quote to Order Process that can be utilized in the complex order processing system of FIG. 7B.

FIG. 10H-2 shows a Quote Line Items View with a pull-down menu with an option for invoking the Quote to Order Process of FIG. 10H-1.

FIGS. 11B-1 through 11E-3 show examples of the input to, and results output by the functions performed in the Apply Method of FIG. 11A.

FIGS. 11G-1 through 11K-3 show examples of the input to, and results output by the functions performed in the Delta process.

FIG. 11L shows a block diagram of input and output for a Trim Method that can be utilized in the complex order processing system of FIG. 7B.

FIGS. 11M-1 through 11Q-2 show examples of the input to, and results output by the functions performed in the Trim Method.

FIG. 11R shows a block diagram of input and output for a Logical Delete Method that can be utilized in the complex order processing system of FIG. 7B.

FIGS. 11Q-1 through 11Q-2 show examples of the input to, and results output by the functions performed in the Logical Delete Method.

FIG. 11R shows a block diagram of input and output for a Set Effectivity Dates Method that can be utilized in the complex order processing system of FIG. 7B.

FIGS. 11S through 11S-2 show examples of the input to, and results output by the functions performed in the Set Effectivity Dates Method.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
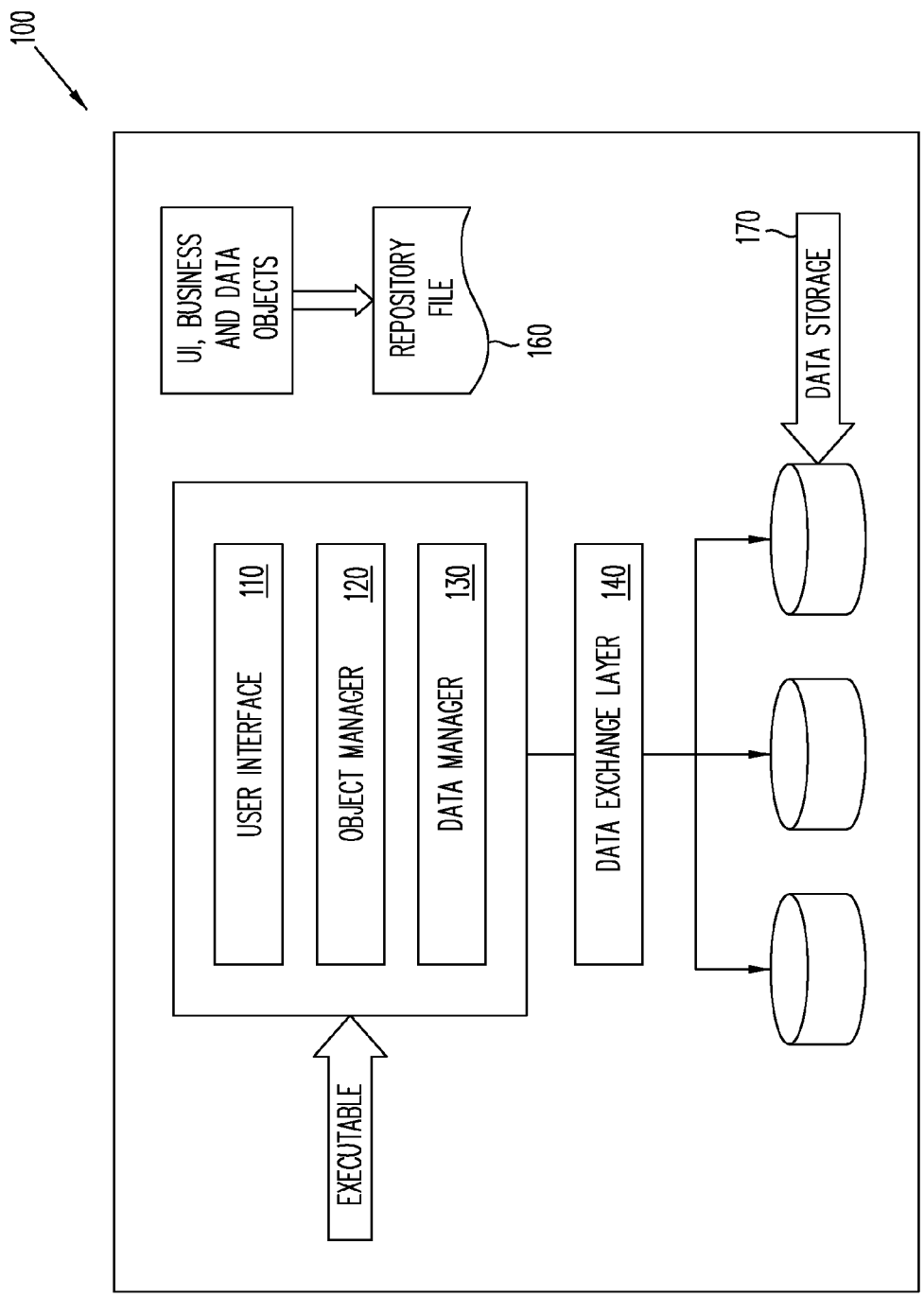
FIG. 1 shows a multi-layered system architecture in which the teachings of the present invention are implemented.

I. Overview of Exemplary System for Implementing Embodiments of the Present Invention An embodiment of a system in which the teachings of the present invention can be implemented is logically structured as a multi-layered architecture as shown in FIG. 1. The logical multi-layered architecture as shown in FIG. 1 provides a platform for common services to support the various applications. These services can include a user interface layer 110, an object manager layer 120, a data manager layer 130, and a data exchange layer 140.

User Interface layer 110 can provide the applets, views, charts and reports, etc. associated with one or more applications. Various types of clients can be supported via the user interface layer 110. These various types of clients can include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. The business rules or concepts can be represented as business objects. The business objects can be designed as configurable software representations of the various business rules or concepts such as accounts, contacts, opportunities, service requests, solutions, etc.

The data manager layer 130 can maintain logical views of the underlying data and allow the object manager to function independently of underlying data structures or tables in which data are stored. The data manager 130 can also provide certain database query functions such as generation of structure query language (SQL) in real time to access the data. The data manager 130 can operate on object definitions in a repository file 160 that define the database schema. The data storage services 170 provide the data storage for the data model associated with one or more applications.

The data exchange layer is designed to handle the interactions with one or more specific target databases and provide the interface between the data manager layer 130 and the underlying data sources.

Figure 2:
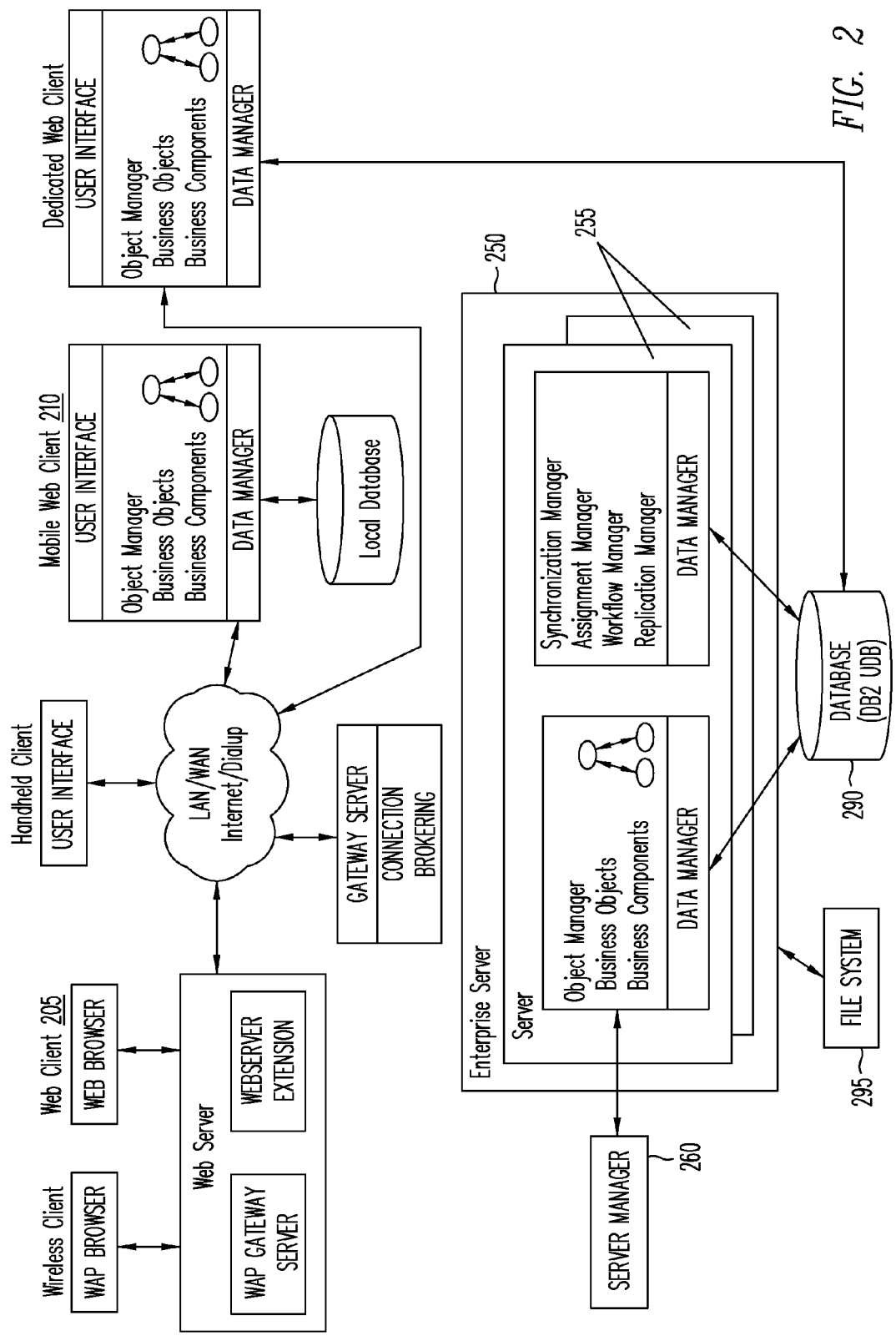
FIG. 2 shows a block diagram of one embodiment of a system configuration in which the teachings of the present invention are implemented.

FIG. 2 shows a block diagram of one embodiment of a system configuration in which the teachings of the present invention can be implemented.

The multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanatory purposes and can vary depending upon the particular embodiments and applications of the teachings of the present invention.

The system environment illustrated in FIG. 2 can include more than one database 290. One or more subsets of the database 290 can be created or replicated by a replication manager. In addition, mobile web clients can have additional remote databases (also called local databases). Unless the remote or local databases associated with the mobile web clients are defined as read-only databases, these mobile web clients can create and update data locally that can be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and data supplied by a user or customer. Dedicated web clients and server components, including those that operate in conjunction with the other types of clients, can connect directly to the database 290 and make changes in real time. Mobile web clients 210 can download a subset of the server's data to use locally, and periodically synchronize with the server database through the system server to update both the local and the server database.

Various tables included in the database 290 can be logically organized into the following types: data tables, interface tables, and repository tables, etc.

Data tables can be used to store user business data, administrative data, seed data, and transaction data, etc. These data tables can be populated and updated through the various applications and processes and can include the base tables and the intersection tables, etc. Base tables can include columns that are defined and used by the various applications. The base tables provide the columns for a business component specified in the table property of that business component. Intersection tables are tables that can be used to implement a many-to-many relationship between two business components. They can also include intersection data columns, which store information pertaining to each association. In one embodiment, intersection tables provide the data structures for association applets.

Interface tables can be used to denormalize a group of base tables into a single table and used as a staging area for exporting and importing of data to interface with external programs.

Repository tables contain the object definitions that specify one or more applications regarding:

The client application configuration

The mapping used for importing and exporting data

Rules for transferring data to mobile clients

In some embodiments, file system 295 is a network-accessible directory that can be located on an application server. The file system 295 can store the physical files created by various applications, such as files created by third-party text editors, and other data that is not stored in the database 290. Physical files stored in the file system 295 can be compressed and stored under various naming conventions. Dedicated web clients can read and write files directly to and from the file system 295. Mobile web clients can have a local file system, which they synchronize with the server-based file system 290 periodically. Other types of client such as the wireless clients and the web clients can access the file system 290 via the system server.

Enterprise server 250 can be a logical grouping of the system servers 255 that share a common table owner or a database, point to a common gateway Server, and administered as a group using server manager 260. The connection to the gateway server can be established via a suitable communication protocol, such as TCP/IP. Enterprise server 250 can be scaled effectively by deploying multiple system servers 255 in the enterprise server 250, thus providing a high degree of scalability in the middle tier of applications.

Server 255 can run on one or multiple server programs, handle the incoming processing requests, and monitor the state of all processes on the server. Server programs can perform one or more specific functions or jobs including importing and exporting data, configuring the database, executing workflow and process automation, processing to support mobile web clients for data synchronization and replication, and enforcing business rules, etc. Server 255 can be an NT Service (under Windows NT operating system) or a daemon (e.g., a background shell process) under UNIX operating system, supports both multi-process and multi-threaded components, and operate components in batch, service, and interactive modes.

The server manager 260 is configured as a utility that allows common control, administration and monitoring across disparate programs for servers 255 and enterprise server 250. Server manager 260 can perform tasks such as: start, stop, pause, and resume servers 255, components, and tasks; monitor status and collect statistics for multiple tasks, components, and servers within an enterprise server; and configure the enterprise server, individual servers individual components, and tasks, etc.

The gateway server can be configured as a logical entity that serves as a single entry point for accessing servers and can be used to provide enhanced scalability, load balancing and high availability across the enterprise server. The gateway server can include a name server and a connection brokering component. The name server can be configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component can perform load balancing functions such as directing client connection requests to an appropriate server (e.g., the least-busy server).

In the embodiment illustrated in FIG. 2, the various types of clients that can be supported by the system can include the following clients: dedicated web clients, mobile web clients, web clients, wireless clients, and handheld clients, etc.

In one embodiment, dedicated web clients (also called connected clients) can be connected directly to a database server for data access via a LAN or WAN connection. The connected or dedicated web clients do not store data locally and can also access the file system directly. In one embodiment, the user interface, the object manager, and the data manager layers of the multi-layered architecture reside on the dedicated web client.

The mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

A web client runs in a standard browser format from the client's machine. The web client can connect to a system server 255 through a web server. The system server 255 can execute business logic and access data from the database 290 and file system 295. In one embodiment, the web client in accordance with the teachings of the present invention can operate in an interactive mode. The interactive web client framework as described herein utilizes dynamically created objects implemented in JavaScript on the browser side that correspond to objects on the server side. These dynamically created objects on the browser side can include the current view and its corresponding applets, the current business object and the corresponding business components, etc. The web client is described in more details below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more detail below with references to various structures, databases, tables, file systems, etc. as illustrative examples.

Figure 3:
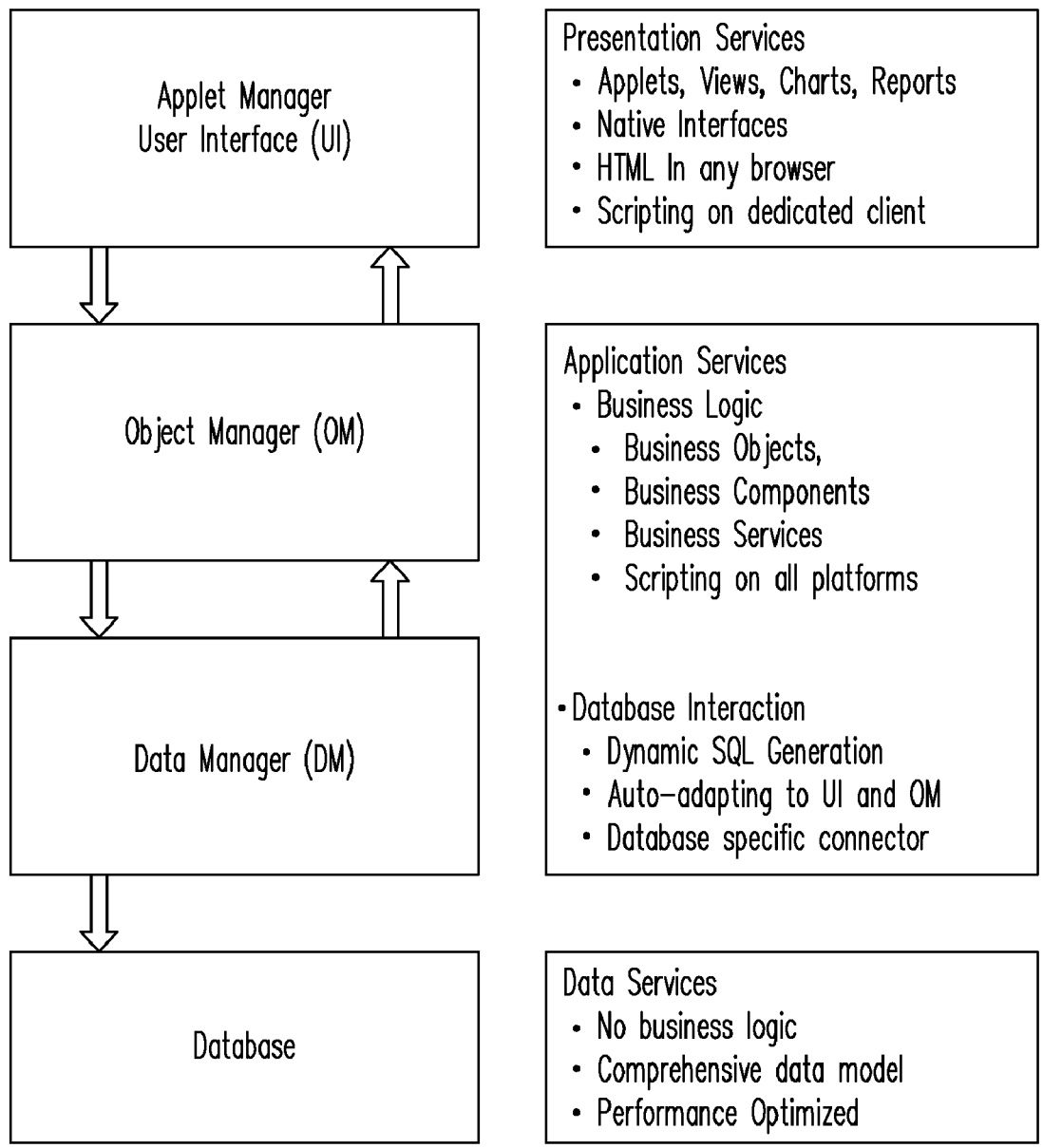
FIG. 3 shows a block diagram illustrating another logical representation of a multi-layered architecture in which applications can be built in accordance with the teachings of the present invention.

FIG. 3 shows a block diagram of another logical representation of a multi-layered architecture in which applications can be implemented in accordance with the teachings of the present invention. The multi-layered architecture provides a platform for various common services designed and to support the various applications. These various services can include presentation services logic layer 315 which corresponds to an applet manager and user interface layer 310, application services logical layer 325 which corresponds to an object manager (OM) layer 320 and a data manager (DM) layer 330, and data services logical layer 345 which corresponds to a database layer 340.

The presentation services 315 can provide user interface applets, views, charts, and reports, and support various types of clients including wireless clients, handheld clients, web clients, mobile web clients, and dedicated (connected) clients, etc.

Application services 325 can include business logic services and database interaction services. In one embodiment, business logic services provide the class and behaviors of business objects and business components. Database interaction services can take the user interface (UI) request for data from a business component and generate the database commands (e.g. SQL queries, etc.) necessary to satisfy the request. For example, the data interaction services can be used to translate a call for data into DBMS-specific SQL statements.

Data storage services 345 can be designed and configured to provide the data storage for the underlying data model which serves as the basis of the various applications. For example, the data model can be designed and configured to support various software products and applications including call center, sales, services, and marketing, etc., as well as various industry vertical products and applications such as eFinance, eInsurance, eCommunications, eSales, and eHealthcare, etc., provided by Siebel Systems, Inc. of San Mateo, Calif.

Figure 4A:
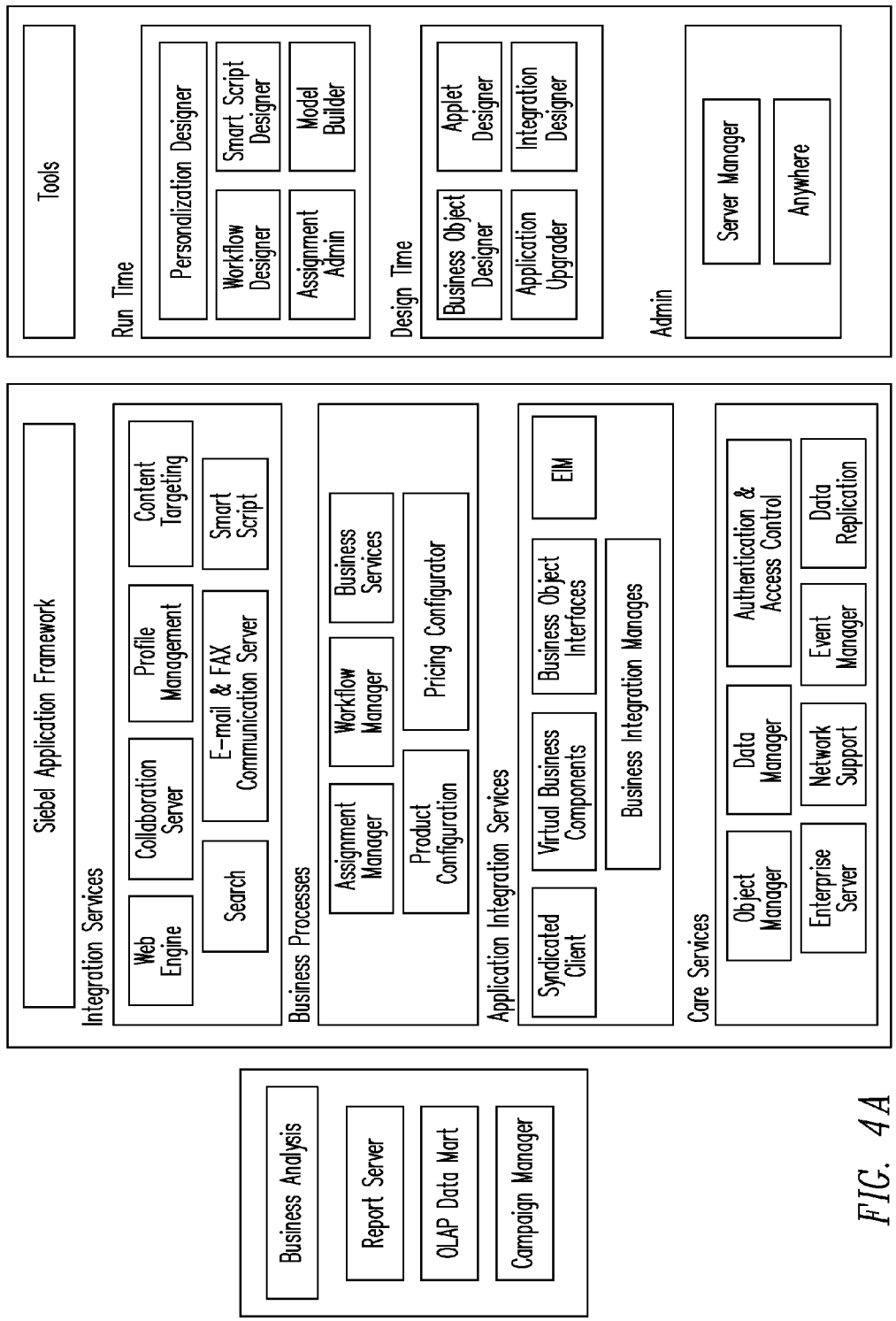
FIG. 4A shows a block diagram of one embodiment of an application framework in which the teachings of the present invention can be implemented.

FIG. 4A illustrates a block diagram of one embodiment of an application framework in which the teachings of the present invention can be implemented. As illustrated in FIG. 4, the application framework can include logical groupings of various types of services and tools that can be used to design and configure particular applications based on business needs and environments.

In one embodiment, the core services provide the framework in which the applications execute and may include the following:

The enterprise server, which is the middle-tier application server

The networks that link all of the components together

Facilities like event manager and data replication, which allow sharing data between multiple installations of various applications as well as between the various applications and other external applications The authentication and access control security facilities.

Application integration services can allow the various applications built in accordance with this application framework to communicate with the external world. The various types of services in this logical grouping can provide for real-time, near-real-time, and batch integration with external applications. For example, these integration services can be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server supplying information.

Business processes can allow the client to automate business processes through the application server. Various business processes can be included, such as the following:

Assignment of tasks through Assignment Manager

Enforcement of business practices through Workflow Manager

Reuse of custom business logic through Business Services

Ensuring proper product configuration and pricing through the Product Configurator and Pricing Configurator In one embodiment, these business processes can be created through Run-Time tools such as Personalization Designer, Workflow Designer, SmartScript Designer, Assignment Administration Views, and the Model Builder, etc.

Figure 4B:
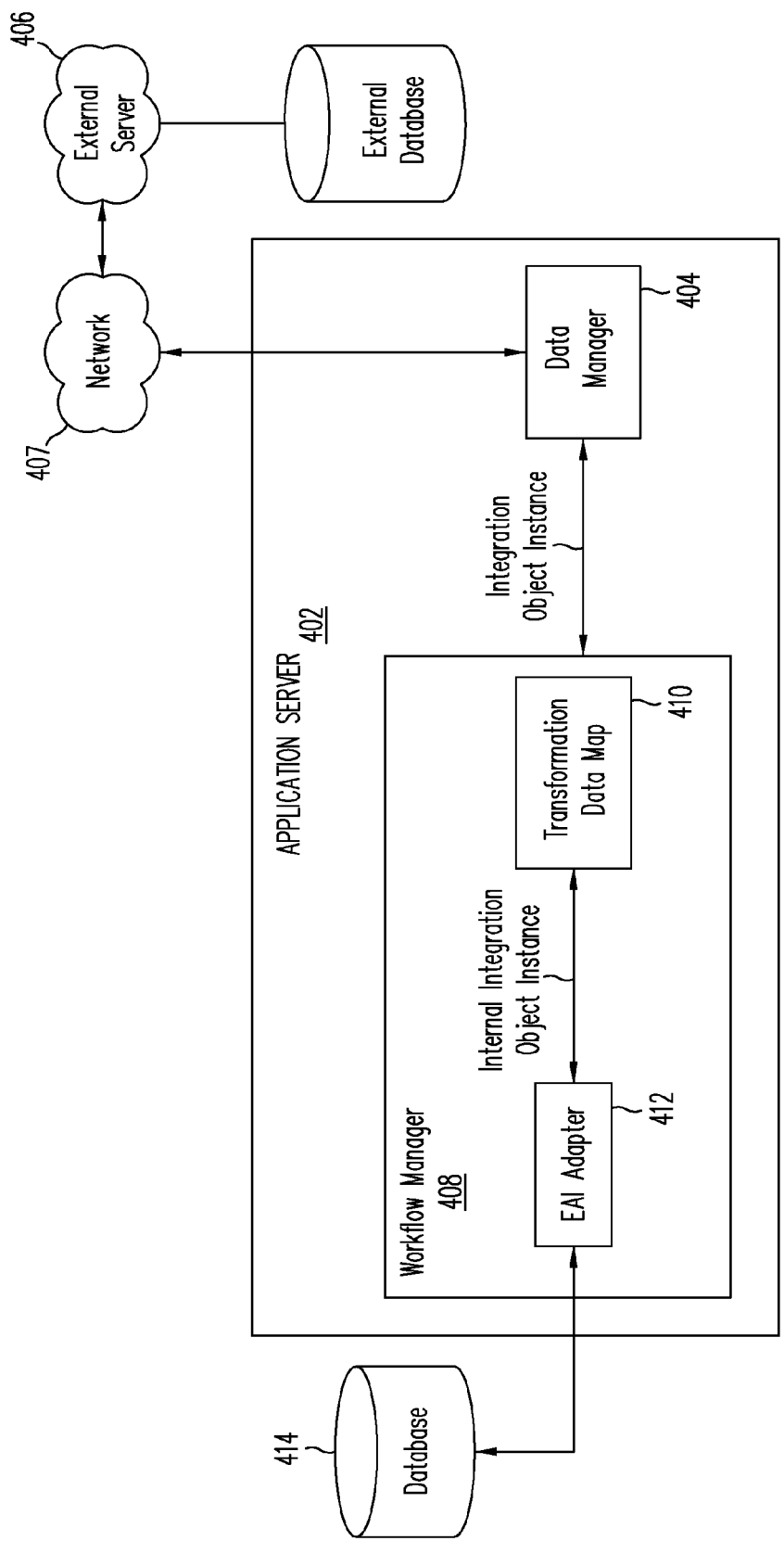
FIG. 4B shows an example of business data flow in application server.

FIG. 4B shows an example of business data flow in application server 402. When data manager 404 receives data via network 407 in one or more suitable formats, for example, an extensible markup language (XML) file, data manager 404 converts the data to an integration object. Data manager 404 then invokes workflow manager 408 to process the data further. Workflow manager 408 controls the flow and transformation of data into and out of the application programs (not shown) in application server 402.

In some embodiments, workflow manager 408 invokes transformation data map 410 to transform the integration object instance to an internal integration object instance using a data map. The internal integration object instance is then passed to EAI adapter 412 where it can be stored in database 414 as a business object that can be accessed by application programs and business services.

When returning data to external server 406, EAI adapter 412 populates an internal integration object instance with corresponding data from database 414. The internal integration object instance is passed to transformation data map 410, which includes pre-configured data mappings to transform internal integration object instances to equivalent integration object instances. Data manager 404 converts the integration object instances to the required format and then passes that data to external server 406 via network 407.

Integration services can provide the client with user interface and thin client support. In one embodiment, these can include capabilities for building and maintaining web-based applications, providing web support facilities such as user Profile Management, Collaboration Services, and Email and Fax services, as well as advanced Smart Scripting, etc.

Design time tools can provide the services to customize, design, provide integration points, and maintain the application. These various tools provide one common place to define the application.

Admin services provide one place to monitor and administer the application environment. In one embodiment, these services allow the user to administer the application either through a graphic user interface (GUI) or from a command line, etc.

II. Exemplary System Framework

Figure 5A:
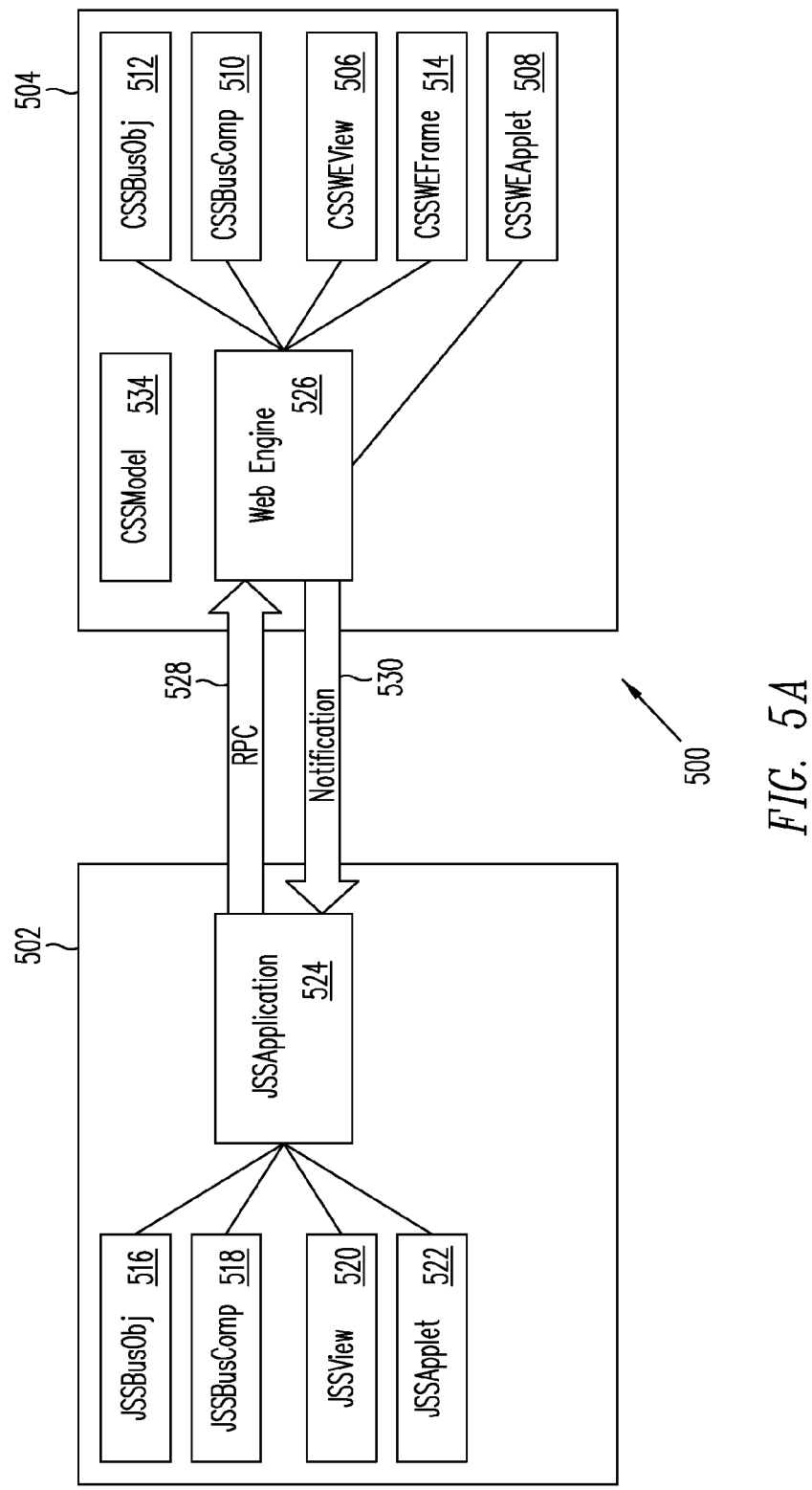
FIG. 5A shows an exemplary framework or infrastructure 500 to support an interactive web client and a mobile web client of FIG. 2.
Figure 5B:
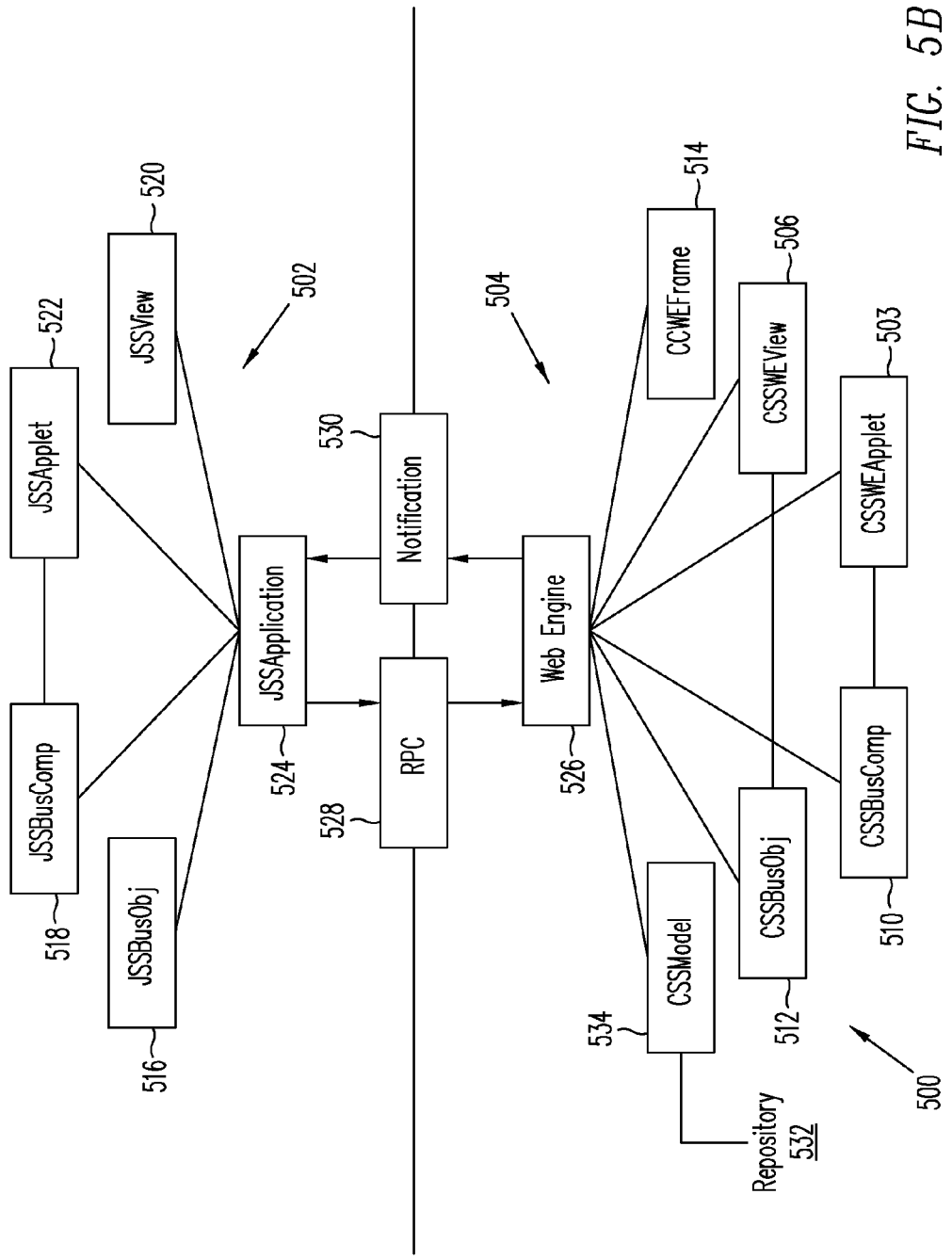
FIG. 5B shows an alternative view of the exemplary framework or infrastructure shown in FIG. 5A.

FIG. 5A illustrates an exemplary system framework or infrastructure 500 to support an interactive web client 205 and a mobile web client 210 of FIG. 2 in accordance with one embodiment of the present invention. FIG. 5B illustrates an alternative view of the exemplary system framework or infrastructure 500 shown in FIG. 5A.

The framework or infrastructure 500 can support the interactive web client 205 (shown in FIG. 2) and the mobile web client 210 (also shown in FIG. 2) and is capable of meeting certain criteria, such as increasing the interactivity and performance of the web client and the mobile web client, and reducing the number of page refreshes for common actions.

The framework or infrastructure 500 can include objects 502 that can be dynamically created on the browser to mimic corresponding objects 504 managed by the object-manager. In one embodiment, the objects 504 managed by the object manager (OM) can be built using a programming language, such as C++, supporting the object-oriented paradigm.

As shown in FIGS. 5A and 5B, exemplary objects 504 managed by the OM can include an object 506 representing a view, CSSWEView 506. A view is generally a display panel consisting of a particular arrangement of applets. In one embodiment, one active view can be displayed at any given time. Another exemplary object managed by the OM can be an object 508 representing an applet, CSSWEApplet 508. An applet is generally a visual application unit that appears on the screen as part of a view. Other exemplary objects managed by the OM can include an object 510 representing a business component (CSSBusComp 510), an object 512 representing a business object (CSSBusObj 512), and an object 514 representing a frame (CSSWEFrame 514). In one embodiment, the business object can be designed as configurable software representations of the various business rules or concepts such as accounts, contacts, opportunities, service requests, solutions, etc. In this embodiment, the business components typically provide a layer of wrapping over tables, and the applets reference business components rather than the underlying tables. In addition, a frame is generally a sub-component of a view and can include one or more applets.

In one embodiment, objects 502 on the browser can be built using JavaScript. As shown in FIGS. 5A and 5B, exemplary objects 502 on the browser side can include JSSBusObj 516, JSSBusComp 518, JSSView 520, and JSSApplet 522 to respectively mirror CSSBusObj 512, CSSBusComp 510, CSSWEView 506, and CSSWEApplet 508, which are objects 504 managed by the OM.

FIG. 5C illustrates an exemplary embodiment of a computing system for an automatic completion of a pick field.

The computing system 500 is shown including the client 502 coupled to the server 504 through a remote procedure call (RPC) module 528. The client 502 includes the application 524 coupled to the RPC module 528, the active applet 522, and the applet 510. The active applet 522 is coupled to the display 580. The active applet 522 can be a record field. The display 580 can be a user interactive display to display the record value for the active applet 522. The display 580 is coupled to the display object 516. The applets 522 and 510 are coupled to the business components 510 and 572 respectively. The business component 518 includes a cache 568. A user can enter a partial record value for the active applet 522 through the display 580. The application 524 is also coupled to the command manager 574, the local object 576 and the alarm manager 584.

The server 504 is coupled to the repository 552. The client 502 objects include the proxy objects of the server 504 objects. For example, the application 524 is a proxy of the frame manager 526, the display 580 is a proxy of the display 558, the active applet 522 is a proxy of the active applet 508, the applet 510 is a proxy of the applet 556, and the business components 518 and 572 are proxies of the business components 510 and 566 respectively. The display 558 is coupled to the business object 512. The business object 516 is a proxy of the business object 512.

Figure 6A:
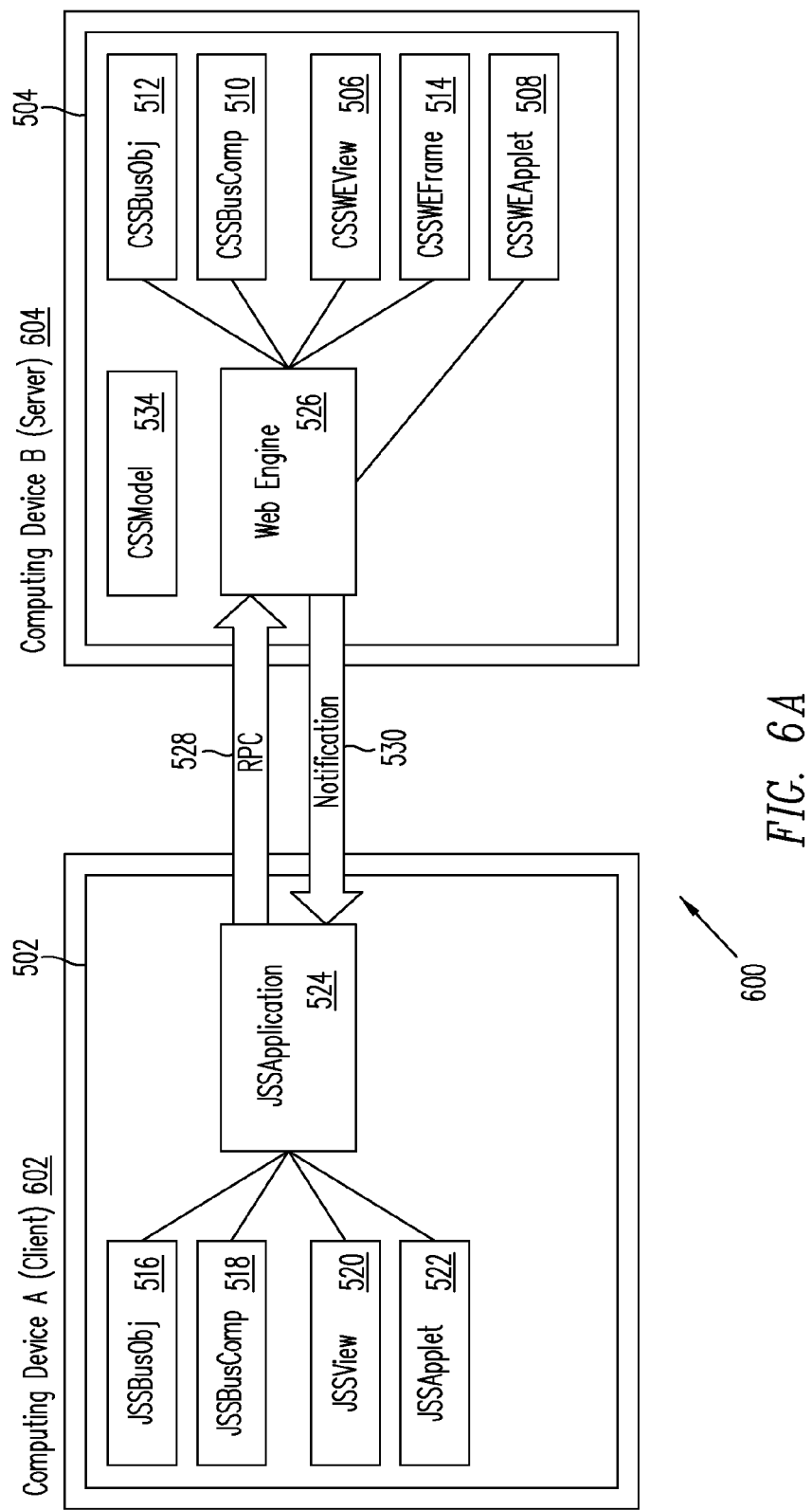
FIG. 6A shows an exemplary configuration in which objects on the browser and objects managed by the object manager (OM) reside and operate on multiple computing devices, including a client and a server.
Figure 6B:
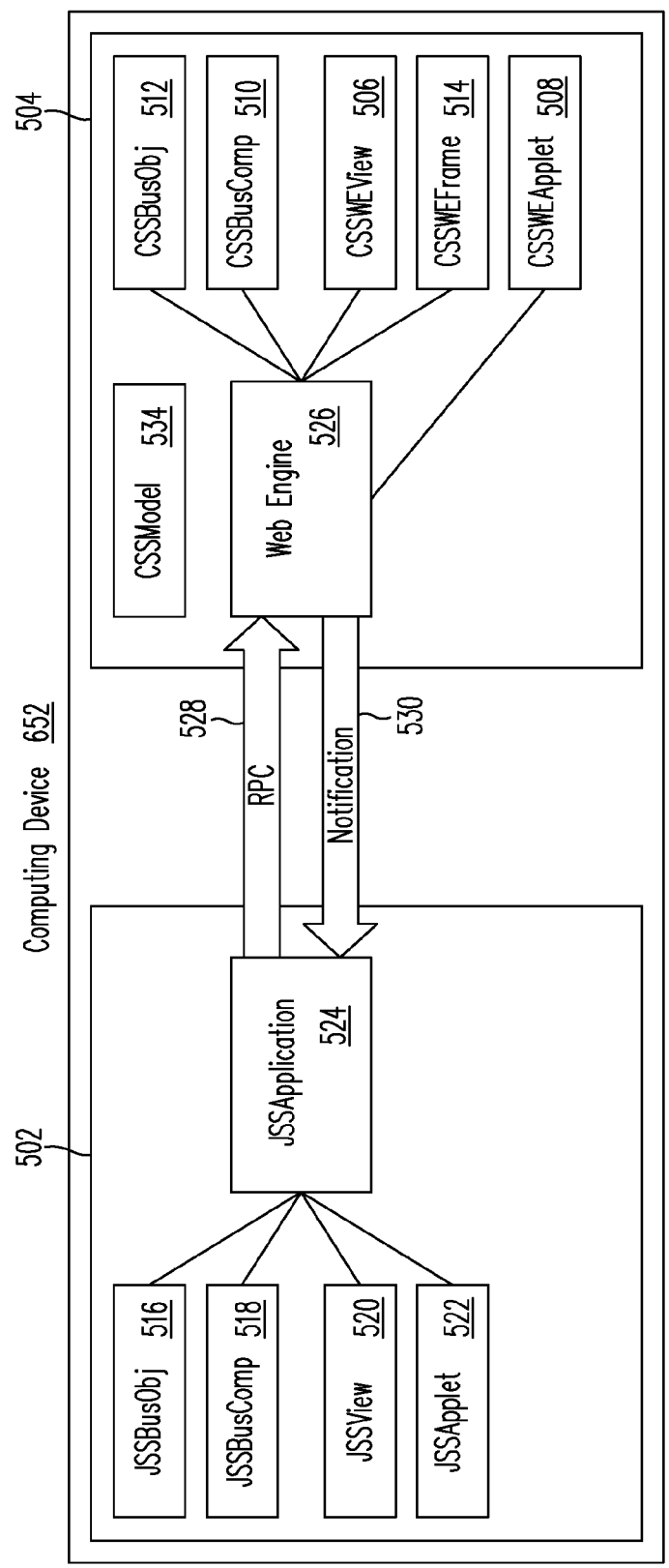
FIG. 6B shows an exemplary configuration in which objects on the browser and objects managed by the OM reside and operate on one computing device.

Objects 502 on the browser and objects 504 managed by the OM can be configured to reside and operate on one computing device or multiple computing devices. FIG. 6A illustrates an exemplary configuration 600 in which objects 502 on the browser and objects 504 managed by the OM reside and operate on multiple computing devices 602,604, including a client 602 and a server 604. FIG. 6B illustrates an exemplary configuration 650 in which objects 502 on the browser and objects 504 managed by the OM reside and operate on one computing device 652.

Returning to FIGS. 5A and 5B, objects 502 on the browser are generally synchronized with corresponding or mirrored objects 504 managed by the OM. Synchronization can be accomplished through a remote procedure call (RPC) mechanism 528 and a notification mechanism 530. The RPC mechanism 528 and the notification mechanism 530 is further described in U.S. patent application Ser. No. 09/969, 849 entitled Computing System And Method For Automatic Completion Of Pick Field, filed Sep. 29, 2001 which is assigned to the same assignee as the present disclosure, and is hereby incorporated by reference.

Of the objects 502 on the browser, the JSSApplication object 524 typically persists throughout a user-session. The JSSApplication object 524 should be initially loaded initially when the user starts an application. An application would generally be started when the user invokes a subset of the application from an icon on the desktop or from the Start menu. The JSSApplication object 524 generally performs a role similar to that of the CSSModel object 534. The CSSModel object 534 is generally a global session object that provides access to repository objects that are in use, the current business object instance in memory, the relationships between the current business object and the business components contained in it, and the user's global state information. The CSSModel object 534 generally accesses a repository 532 to obtain needed information. The repository 532 is generally a set of object definitions used to define an application or a suite of applications. However, the JSSApplication object 524 is generally scaled down to track one view, applets associated to the tracked view, one business object, and the business components that are in use in the view.

Unlike the JSSApplication object 524, the JSSView object 520, and the JSSApplet object 522, the JSSBusObj object 516 and the JSSBusComp object 518 are typically temporary or impermanent entities, and are generally replaced when a page refresh occurs. For example, a request to navigate to a new view can cause a new set of JSSView 520, JSSApplet 522, JSSBusObj 516, and JSSBusComp 518 objects to be created to run on the browser.

Accordingly, objects 502 on the browser can be generally described as lightweight representations of mirrored or corresponding objects 504 managed by the OM. Each object 502 on the browser would typically include a subset of the functions included in corresponding objects 504 managed by the OM. For example, the JSSView object 520, similar to a CSSView object 506, generally represents a collection of applets. The JSSBusObj object 516, similar to a CSSBusObj object 512, generally manages the various one-to-many relationships between active business components so that correct relationships are employed when these active business components are populated via queries. The JSSBusObj object 516 generally exists on the browser for the life of the current view, and should be synchronized with the corresponding CSSBusObj object 512.

In one embodiment, when the browser submits a request to navigate to a new view to the web engine 526, the web engine 526 sends a response containing the view layout that is devoid of data. Then the web engine 526 sends a response containing a string of data to populate the view.

The JSSApplication object 524 generally manages communications flowing into and out of objects on the browser. In one embodiment, a method invoked on an object on the browser is typically directed to the JSSApplication object 524 if the invoked method should be re-targeted to an object 504 managed by the OM. The JSSApplication object 524 generally uses the RPC mechanism 528 to route the invoked method through the web engine 526 to the appropriate object 504 managed by the OM. The web engine 526 typically sends return notifications and data from objects 504 managed by the OM to objects 502 on the browser. The web engine 526 generally uses the notification mechanism 530 to route notifications and data through the JSSApplication object 524 to objects 502 on the browser.

The browser objects 502 generally use the remote procedure calls 528 to invoke methods on the objects 504 managed by the OM. These remote procedure calls 528 are generally packaged as HTTP requests. Responses from the objects 504 managed by the OM are packaged as HTTP responses containing notifications and associated status information and data. In one embodiment, remote procedure calls are made with blocking enabled to ensure synchronization between the objects 502 on the browser and the objects 504 managed by the OM. With blocking enabled, control would typically not be passed back to the calling code until the called remote procedure finishes executing.

III. Terms for Complex Order Processing System

The following terms as used herein to describe a complex order processing system are defined as follows:

Association level—represents a parent/child hierarchy of complex assets that defines which children can belong to which parent. In some applications, it is necessary to identify which products require a metering point and service account. A flag can be used to indicate whether a metering point and service account is required.

Attributes—In some embodiments, all logic, tables, business components, applets and views pertaining to parameters in the complex order processing system are implemented in an object system that allows attributes of a product or service to be defined. A view or pop-up applet can be associated with a set of attributes.

Complex asset—A complex asset is a particular instance of a customizable product or service that has been sold and delivered to the customer.

Configuration Session—A configuration session is an instantiation of a customizable product within the Product Configurator. The configuration session captures requests and applies configuration rules and constraints. A session ends by writing out the set of changes made by the end user.

Customer Service Profile—The customer service profile is the set of products and services provided to the customer. The customer service profile includes the hierarchy of complex assets and attributes, as well as the line item pricing agreed in the originating sales order.

Delta Quote—A delta quote is a quote created by determining the differences between the current state and final state of a configuration session.

Delta Sales order—A delta sales order is a sales order created by determining the differences between the current state and final state of a configuration session, or by submitting a delta quote.

Integration identifier—the integration identifier, or key, uniquely identifies a product or service item (asset) and links it to the quotes and orders that modify it. In some embodiments, a quote is created to add a new service item and the integration identifiers are generated when a quote is converted to an order. In some embodiments, a new integration identifier is generated from the row Id of the order line item if the action code of the quote line item is 'Add'. This causes the keys to be unique if multiple orders are created from the same quote, since each of the items are listed in different rows. When the completed order is converted to an asset, the integration identifier is copied from the order line item to an asset. When the asset is subsequently modified (via Modify or Disconnect Options) the integration identifier is copied to the quote and order line items.

Price Configurator—Features of customizable products enable customers to model multiple price types and units of measure (UoMs) for a customizable product by associating one price with each of multiple sub-products. For example, in the communications industry, a local line product with non-recurring charges (NRC) of $15 and monthly recurring charges (MRC) of $12 per month is modeled as a customizable product, local line, with two sub-products, local line installation=$15 each and local line service=$12 per month. Price configurator includes a bundle-pricing scheme to support various UoMs and multiple price types (i.e. "One-Time", "Recurring" or "Usage"). UoMs of price type "One-Time" are included in the total of extended amounts rolled up to the parent product in a bundle. A customer may supply their own price configurator that interfaces with server 604 (FIGS. 6A, 6B). Alternatively, any other suitable Pricing Configurator, such as ePricer commercially available through Siebel Systems, Inc., San Mateo, Calif. may be utilized with a complex order processing system in accordance with the present invention.

Product—Product refers to a physical product, such as a cell phone. A customizable product is defined as a hierarchy of instances of sub-products. Each of the sub-products can be a customizable product. The ability to create customizable products enables users to model bundles of goods and services that are typically provided by companies in industries such as communications and energy. Data tables for products include a field labeled "Track As Asset" to indicate whether the product should be converted to an asset by the order-to-asset workflow.

Product Configurator—supports configuring customizable products and attributes of the products. A product instance (e.g. asset or quote item) can be edited in the Product Configurator after its underlying customizable product definition is changed. The Product Configurator identifies products or attributes that are no longer part of the customizable product and allows the user to remove them from the asset or quote item. A customer may supply their own Product Configurator that interfaces with server 604 (FIGS. 6A, 6B). Alternatively, any other suitable Product Configurator, such as eConfigurator commercially available through Siebel Systems, Inc., San Mateo, Calif. may be utilized with a complex order processing system in accordance with the present invention.

Quote—An offer to change the products and services provided to a customer. The quote includes priced line items that detail the one-time, recurring and usage based fees that will be incurred. When a customer approves the additions and/or changes described in a quote, the quote is converted to a sales order for provisioning. Multiple quotes may be in progress for a particular customer or even a particular service item at any given time. Every level of a service item can have pricing, billing and service accounts, a service asset, and attributes. One key difference between a quote and a sales quote is the "Action Code" field. Items included in a new quote have an action code "Add". When an item is modified, moved, or disconnected, a delta quote is created in which other action codes such as "Update" or "Delete" can apply. is created, items Request—Once a configuration session is initiated, requests can be submitted to the configuration engine to change the state of the customizable product. Requests specify new states for one or more items. Requests can be made singly or in unordered batches. If the requested state is allowed by the rules, the request succeeds and the solution state changes to reflect the request. If the state is not allowed by the rules the request fails and the state of the customizable product remains unchanged.

Run-Time Environment—The run-time environment is the set of user interface elements with which end users configure a set of products and services for a customer.

Sales Order—A sales order is an instruction to change the products and services provided to a customer. The sales order undergoes order assurance and approval before being sent either directly, or as decomposed work orders, to the network provisioning systems. Multiple sales orders may be in progress for a particular customer or even a particular service item at any given time. Service items can have pricing, billing and service accounts, a service asset, and attributes. One key difference between a sales order and a sales order is the "Action" field. A sales order can "Add", "Update" or "Delete" a product, whereas a sales order performs an implied "Add". The account in the sales order header is the corporate entity that contracts with the providing company to receive service. This account can be of any account class (customer, service, billing etc). An integrator can configure restrictions for particular accounts. Sales orders have an order type of "Sales order". An order and its line items transmit through a set of statuses before they are complete. A workflow process updates the status based on external actions and initiates new processing. Order assurance, order approval, order decomposition, order status, and order fulfillment can be configured to a customer's business environment. Sales orders can be modified via the user interface. Customers can choose to limit this capability, however, it is advantageous to allow updates to sales orders and status for demonstration and testing purposes.

Service—Service refers to work that is performed for others, or metered access to an asset by others. The access to the asset can be provided over time. For example, a service can be associated with a communication network metering point such as an assigned telephone number. Metering points are represented as assets.

Supplemental Order—A supplemental order is a sales order that overrides the open order items on an order that has already been sent to a provisioning system.

User Profiles—The following types of users can be granted access to one or more accounts in the order processing system. Further, access to various features and functions of the complex order processing system can be limited on a user-by-user basis, or by type of user. User profiles are maintained by a Profile Manager.

a. Customer Care Representative—A customer care representative can utilize the complex order processing system to configure products and services, provide quotes, and accept orders from a customer.

b. Customer Care Representative Manager—A customer care representative manager will use the system in a manner similar to the Customer Representative. A manager may have access to more features of the order processing system, such as the ability to configure any product within the product catalog.

c. Sales Representatives—Sales representatives can configure products and services, and generate quotes and orders using the order processing system.

d. Channel Partners, Competitors—Channel Partners or competitors can access the Product Configurator in the complex order processing system primarily when providing services. For example, a communications company may need to purchase local loop access from another company to provide xDSL to their customers. In this situation, the Product Configurator performs in a manner similar to that for customer users. These users will typically gain access to the Product Configurator via an information network, such as the Internet. They also can run in batch mode if they want to submit and configure several orders at once.

e. Customer Self Service—Customers can be granted access to the order processing system, particularly the Product Configurator when purchasing products via an information network such as the Internet.

Premises, Meters and Service Points

Figure 7A:
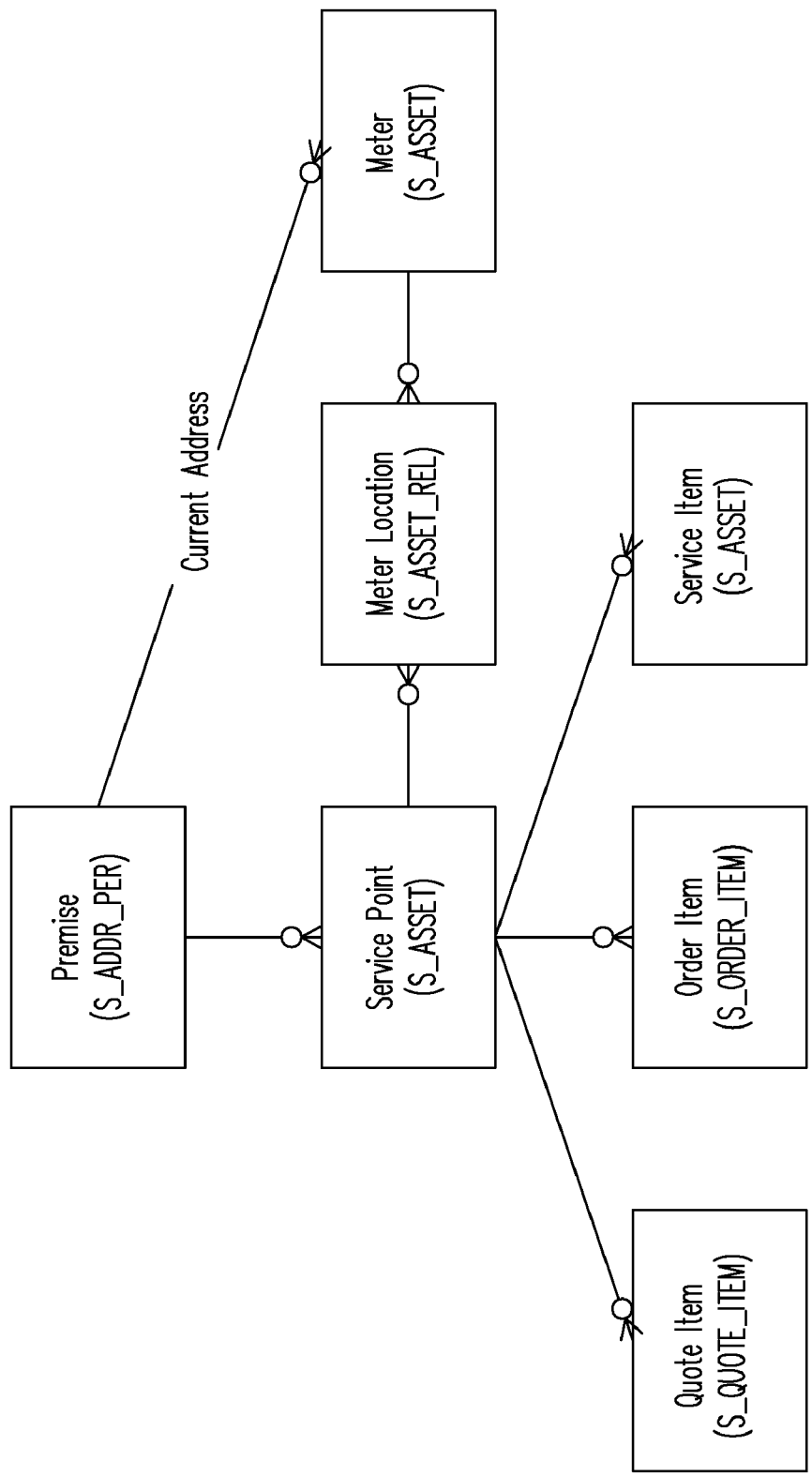
FIG. 7A shows diagram of an example of the relationship between premises, meters, and service points in an object model in accordance with the present invention.

FIG. 7A shows an example of the relationship between premises, meters, and service points in an object model which may be utilized in accordance with the present invention. The object model activates the core 1:M relationship between addresses and assets. This allows premises to map directly to meters without an active service instance. In some applications, a premise is an address at which the company offers service. A service point is a termination point in the service delivery network. For example, a gas pipe, a phone wire or a cable TV jack. Service points are fixed at a premise. A meter is a serialized item of customer premise equipment that measures service usage. A meter is attached to a service point. Over time a meter may become defective and be removed and repaired. The meter is then installed at another premise. Meter location tracks the location of a meter over time.

The use of Premises, Meters and Service Points allows the company to model premises, service points and meters with or without an account associated with the premise or a service item having been installed. The service point and meter are network elements and the meter location entity models the connection, over time, of those elements. The user creates a meter (asset) for each service instance. The service instance is uniquely identified by its meter id. The model supports a full range of products and services. For example, a local telephone line can be metered by the switch at the local office rather than by customer premise equipment. Unlike a gas meter which has a serial number stamped on the side of the box, a telephone number has no physical manifestation. A customer might request a telephone number change without any change to the associated service. The telephone number is an attribute of the service item. To support all product types and varying customer requirements (e.g. whether to store service id inventory, or to perform meter management), both an asset foreign key and a field, SERIAL_NUM, are exposed to store the service item identifier. The complex order processing system can be configured so that one or the other can be used on a company-wide or per product basis. The model supports three options for service identification (ID):

1. Service ID is stored as an attribute of the service item.
2. Service item joins to a service point/meter entity. Service point and meter are treated as one entity and no meter management is performed. Service ID is joined from service point.
3. Service item joins to service point entity. The service point is associated with multiple meters over time. The service ID is joined in from service point. Customers may choose to de-normalize the meter ID for the current meter into the service point.

IV. Complex Order Processing System

Figure 7B:
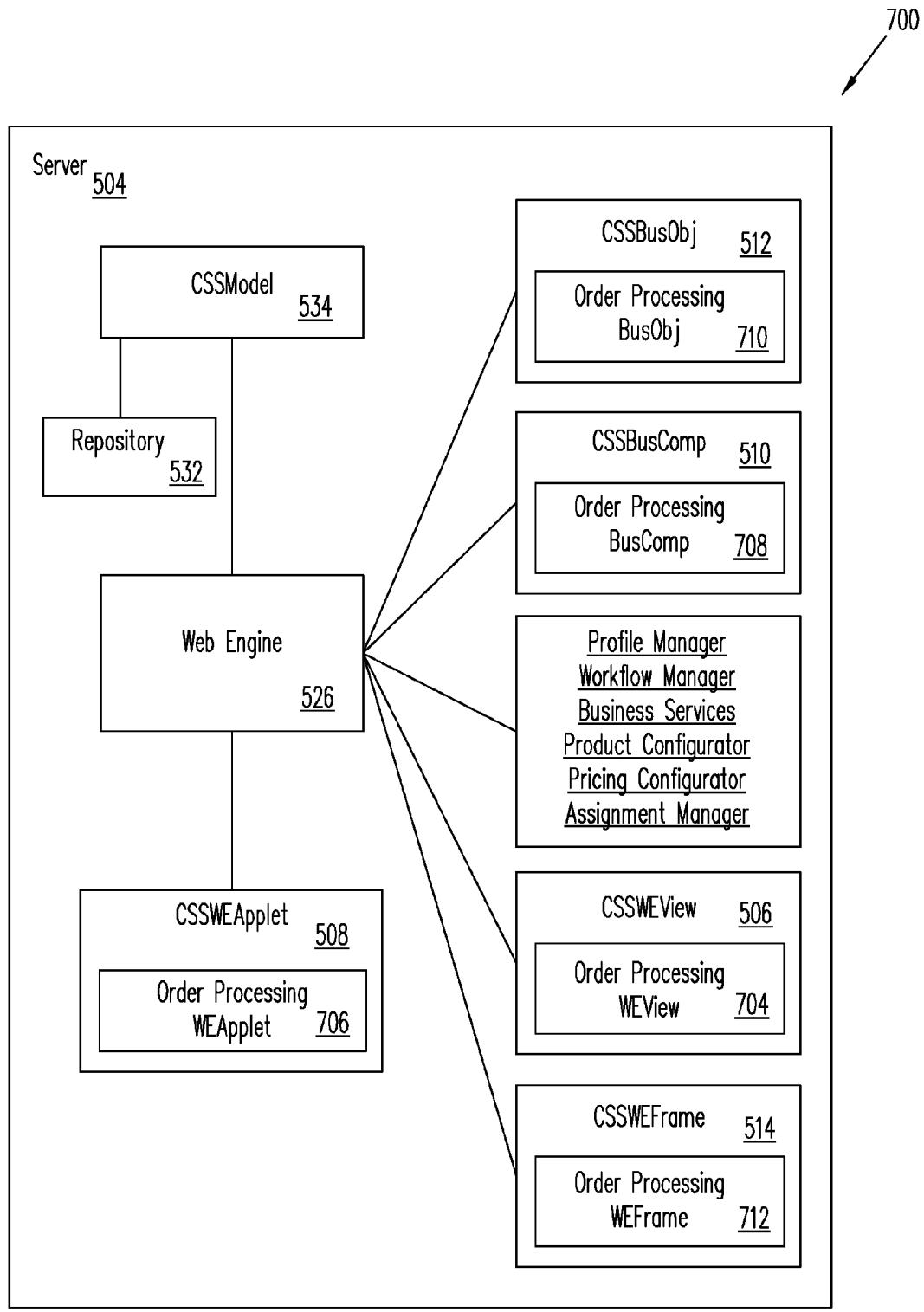
FIG. 7B shows a block diagram of an embodiment of a complex order processing system in accordance with the present invention.

Referring now to FIG. 7B, components included in an embodiments of complex order processing system 700 in accordance with the present invention are shown in server 504. Exemplary objects managed by the OM 120 can include an order processing view 704 in CSSWEView 506. Order processing view 704 is generates a display using a particular arrangement of applets pertaining to creating or modifying an order by selecting and deselecting products and/or services. Another exemplary object managed by the OM can be one or more order processing applets 706 in CSSWEApplet 508 that generate visual application units that appears on the screen as part of the order processing view 704. Other exemplary objects managed by the OM can include order processing business components 708 in CSSBusComp 510, order processing business objects 710 in CSSBusObj 512, and an order processing web engine frame 712 in CSSWEFrame 514.

In some embodiment, the order processing business objects 710 are implemented as configurable software representations of various business rules or concepts such as accounts, contacts, opportunities, service requests, solutions, etc. In such embodiments, the order processing business components 708 typically provide an interface layer around data tables and order processing applets 706. The CSSModel object 534 provides access to repository objects that are in use, the current business object instance in memory, the relationships between the current business objects and the business components contained in it, and the user's global state information. The CSSModel object 534 generally accesses repository 532 to obtain needed information.

In the embodiment shown, complex order processing system 700 also includes other components such as Web engine 526, Profile Manager, Workflow Manager, Business Services, Product Configurator, and Pricing Configurator, among others. These components are also shown in FIG. 4 and further described herein.

An order synchronization workflow can be invoked to update the status of order line items when an external order management provisioning) system completes all or part of an order. After the order synchronization workflow updates all the order items, the Profile Manager applies the completed changes to the customer's service profile, which is stored as a set of assets. The synchronization workflow can be disabled if an external system maintains service profiles.

Figure 8:
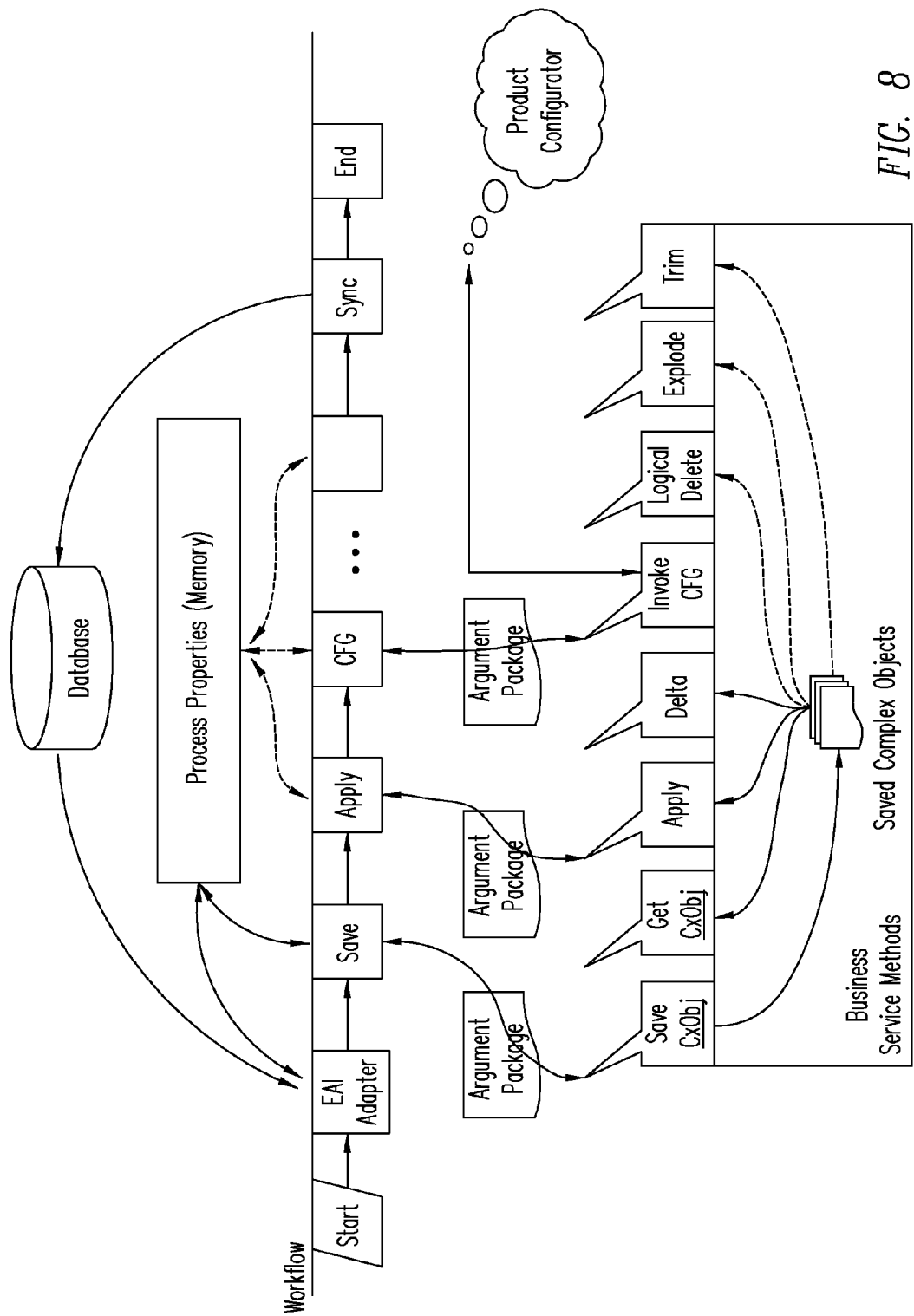
FIG. 8 shows a block diagram of an embodiment of an architecture for implementing the complex order processing system of FIG. 7B with business service methods and a workflow processes.

Referring now to FIG. 8, a diagram of an embodiment of an architecture for implementing complex order processing system 700 with business service methods 802 and a workflow 804 is shown. Complex order processing system 700 includes of a number of workflows, shown for example by workflow 804, that can be invoked based on the action requested by a user, for example, via a user interface. The workflows 804 utilize the business service methods 802 to perform various functions required to complete the action requested by the user. The following examples of workflows 804 can be included to support complex order processing system 700 and are further described hereinbelow:

Products and Services Workflows
New Products and Services Process
Modify Products and Services Process
Disconnect Products and Services Process
Quote Workflows
New Quotes Process
Edit Quotes Line Items Process
Ungroup Quotes Process
Account Profile Process
Delta Quotes Process
Quote to Order Process
Update Opportunity
Order Workflows
New Orders Process
Edit Order Line Items Process
Supplemental Orders Process
Submit Order/Order Approval Process
Moving a Service to Another Location
Move Process In some embodiments, the Product Configurator and the Pricing Configurator can be invoked from the quote workflows to select products and services, configure any components of the products and services, and to provide an estimate of the cost for the products and services. The Product Configurator and Pricing Configurators can be external to complex order processing system 700. Configurators supplied by third parties can be accessed via an application program interface (API). Alternatively, the Configurators can be provided as part of complex order processing system 700.

User Interface

Figure 9A:
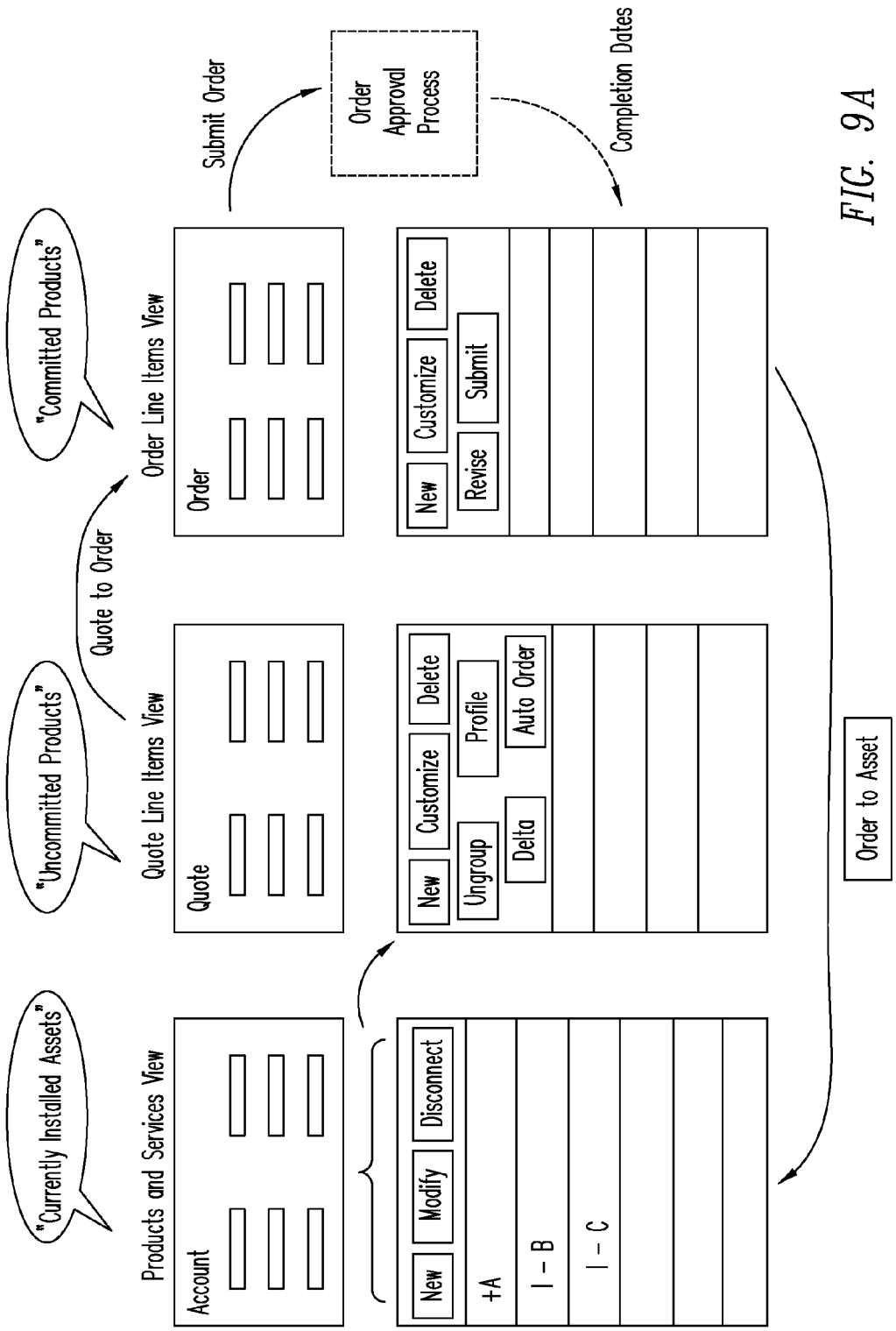
FIG. 9A shows a series of user views including Products and Services View, Quote Line Items View, and Order Line Items View that represent graphical user interfaces to the complex order processing system of FIG. 7B.

FIG. 9A shows a series of user views including Products and Services View, Quote Line Items View, and Order Line Items View that represent graphical user interfaces to complex order processing system 700 (FIG. 7B). The Products and Services View shows the assets currently installed at the premises of the selected account. When a user selects an account, one or more additional frames or windows are presented that allow the user add a new asset, modify an existing asset, and disconnect or remove an asset by selecting an option on the Products and Services View.

FIG. 9B shows an example of an Identify Account View 900 that allows the user to review high level information for the account in frame 902, and additional information about the selected account in frame 904. Frame 904 includes options for selecting types of information that can be shown for the selected account, for example, more information about the business associated with the account, account affiliations, account catalogs, account Dun & Bradstreet reports, members on the account team, activities, activity plans, address profile, and address. Information presented for each option can be entered and edited by selecting the corresponding edit window in frame 904.

Figure 9C:
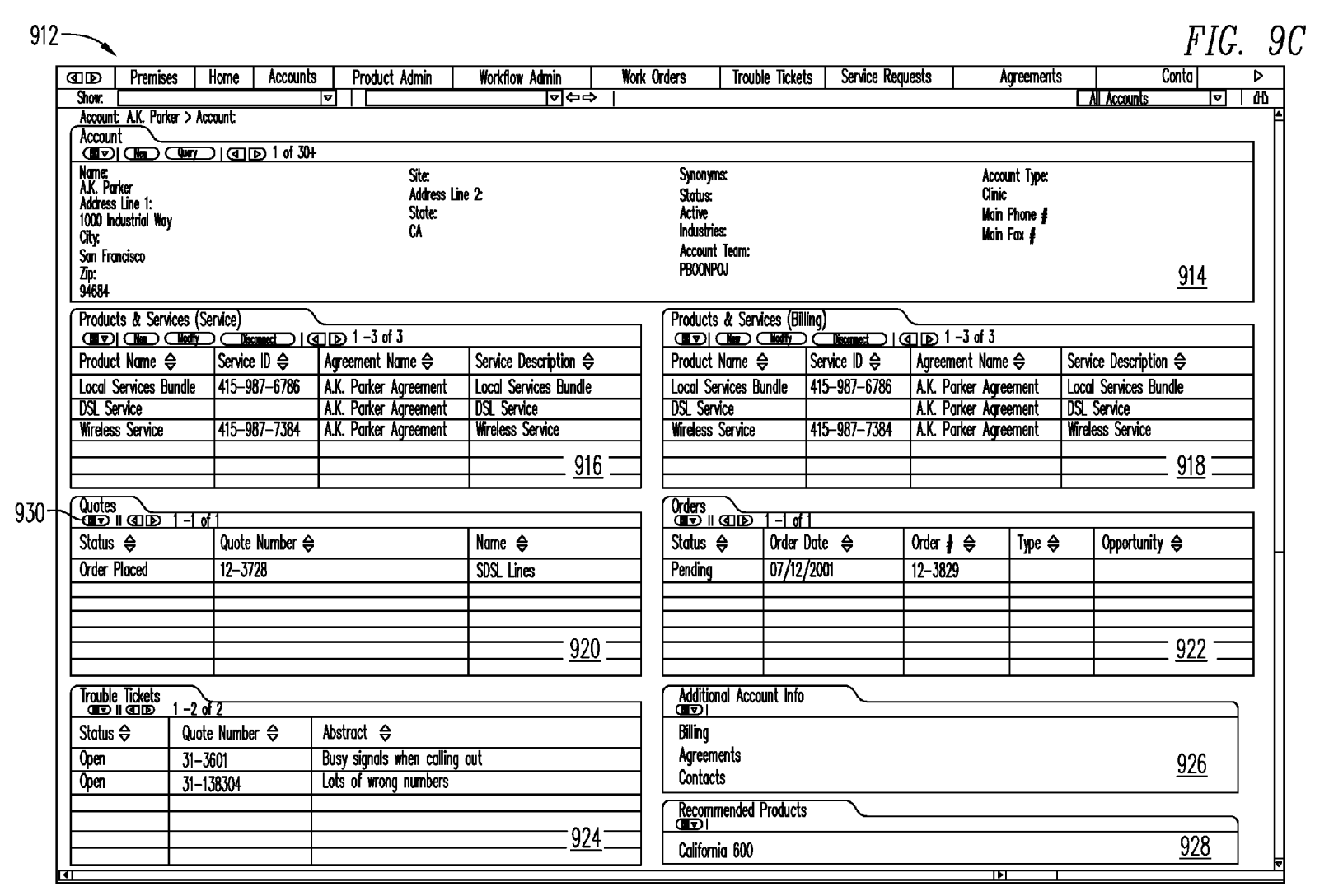

When the user "drills down" on a selected account in frame 902 by taking a suitable action such as double clicking a mouse pointer on the account, a Customer Portal View is presented. An example of a Customer Portal View 912 is shown in FIG. 9C including several frames including an account header frame 914, products and services (service) and (billing) frames 916, 918, quotes frame 920, orders frame 922, trouble tickets frame 924, additional account information frame 926, and a recommended products frame 928. A pull-down menu 930 includes several options such as sales order options to allow the user to initiate the ordering process. The user can drill down on a selected record in each of the frames to see further detailed information for the selected parameter.

The account header frame 914 shows a snapshot of the most relevant information about the account. In the products and services service and billing frames 916, 918, the user can select a New Option to invoke a new order workflow; a Modify Option to trigger a modify order workflow; and a Disconnect Option to trigger a disconnect workflow. The workflows are described in further detail hereinbelow.

The quotes frame 920 is presented in Customer Portal View 912 to allow the user to view a list of quotes for the account. When the user drills down on a selected quote, a Quote Line Items View is presented that allows the user to select options to create a new quote, save changes to the quote, verify the quote, browse a catalog to add or replace items or services in the quote, request advice, or update opportunity, as shown, for example, in Quote Line Items View 932 in FIG. 9D-1. Selecting the Update Opportunity Option causes the revenue fields of the opportunity to be populated with the product prices on the quote, thereby providing an indication of the potential revenue from a quote.

A detailed quote line items frame 934 can also be presented in Quote Line Items View 932 that includes options to allow the user to create a new quote; save changes to the quote; reprice one or more features of a quote; customize or edit the quote; show a summary of all of the components in the quote; view service details; renumber the quotes; view and edit service profile information for the account; and ungroup items in the quote to create identical copies of products equal to the number of items in the quote.

The orders frame is presented in Customer Portal View 912 (FIG. 9C) to allow the user to view a list of orders for the account. When the user drills down on a selected order, an Order Line Items View is presented that allows the user to see a list of orders for the selected account, and to choose options to view further details for a selected order.

Figure 9E:
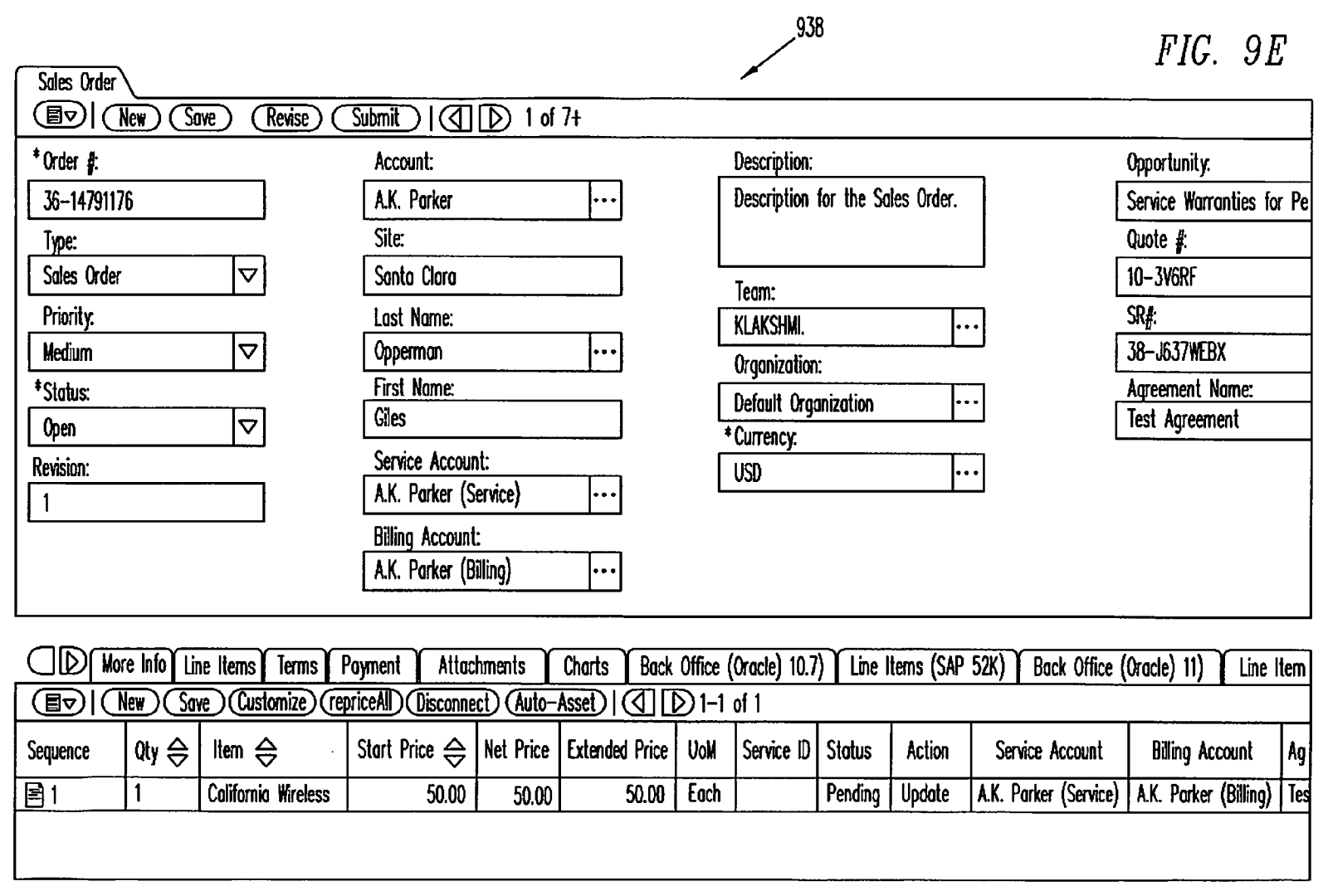

An example of an Order Line Items View 938 is shown in FIG. 9E. The Order Line Items View 938 allows the user to create a new order, revise the order, and submit the order. When the Revise Option on Order Line Items View 938 is selected, the revision number of the selected order is incremented so the user can edit a copy of the order. A user can select the Submit Option on Order Line Items View 938 to send the changes to a provisioning system.

The provisioning system can be supplied by a customer and hosted on external server 406 (FIG. 4B). The provisioning system maintains the status of orders that it receives from complex order processing system 700 (FIG. 7B). Complex order processing system 700 can also interface with the provisioning system to update service profiles.

When the status of an order is pending, the user can further select a Customize Option on Order Line Items View 938 to make the desired changes to the product. Selecting the Customize Option invokes the Product Configurator, which can present its own user interface that allows users to edit product selections and attributes. Once the changes are made and submitted, the status of the order changes from pending to open.

The embodiment of additional account information frame 926 shown in FIG. 9B includes hyperlinked options for viewing more information regarding billing, agreements, and contacts when the options are selected by the user. Other information can also be linked to additional account information frame 926 to allow the user to access other information in addition to, or instead of, billing, agreements, and contacts information.

Workflow Processes

Figure 10A:
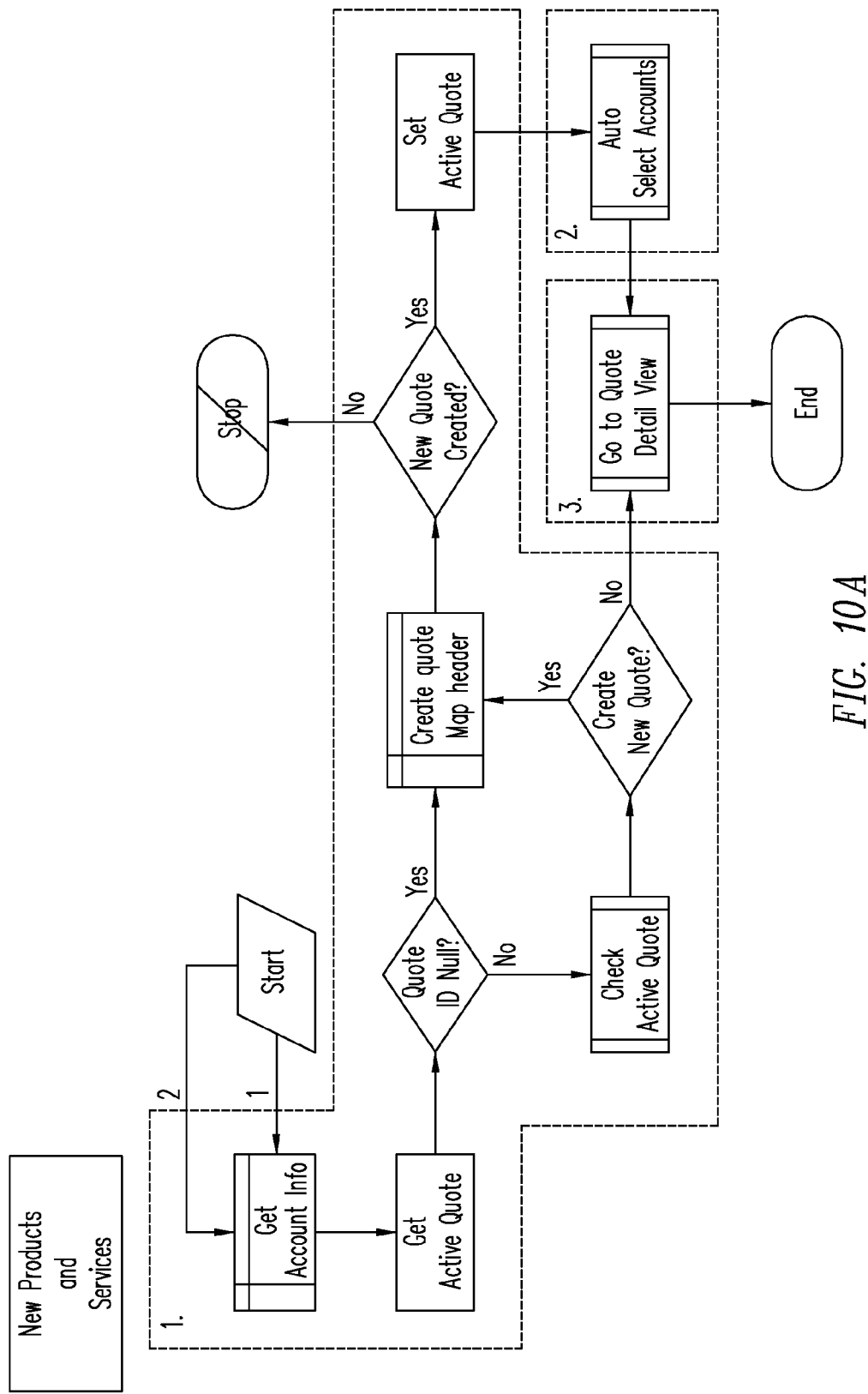
FIG. 10A shows a flowchart of an embodiment of the New Products and Services Process that can be utilized in the complex order processing system of FIG. 7B.

Complex order processing system 700 (FIG. 7B) can be implemented using several workflow processes to perform the functions available to the user via the user interface views, such as described hereinabove for FIGS. 9A-9E. Some embodiments of complex order processing system 700 includes the following workflow processes.

a. New Products and Services Process is invoked by selecting New Option in a Products and Services (billing or service) View 916, 918 such as shown in FIG. 9C. FIG. 10A shows a flowchart for an embodiment of the New Products and Services Process, which performs the following functions:

1) Retrieves the active quote. The New Products and Services Process retrieves the active quote from the session. If there is no active quote, a new quote is created and set as the active quote. If there is an active quote, the quote is associated with the same customer account as the asset being modified, and that the quote has a status of In Progress. If the quote does not meet these criteria, the New Products and Services Process creates a new quote and sets it as the active quote.

2) Designates the billing and service accounts. If the billing account and the service account have not been specified for the Quote header, they are automatically filled.

Figures 1, 10B:
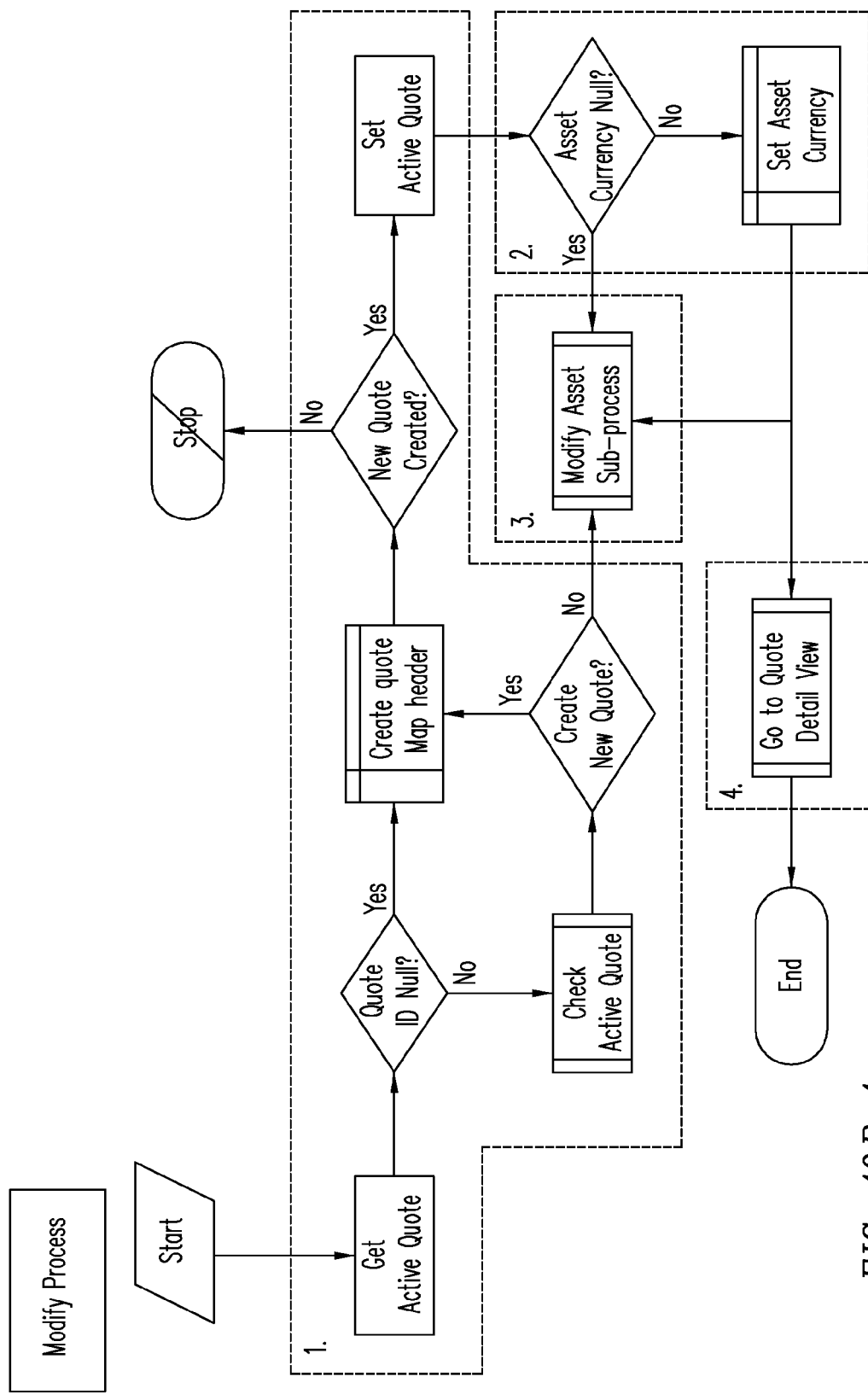
Figures 2, 10B:
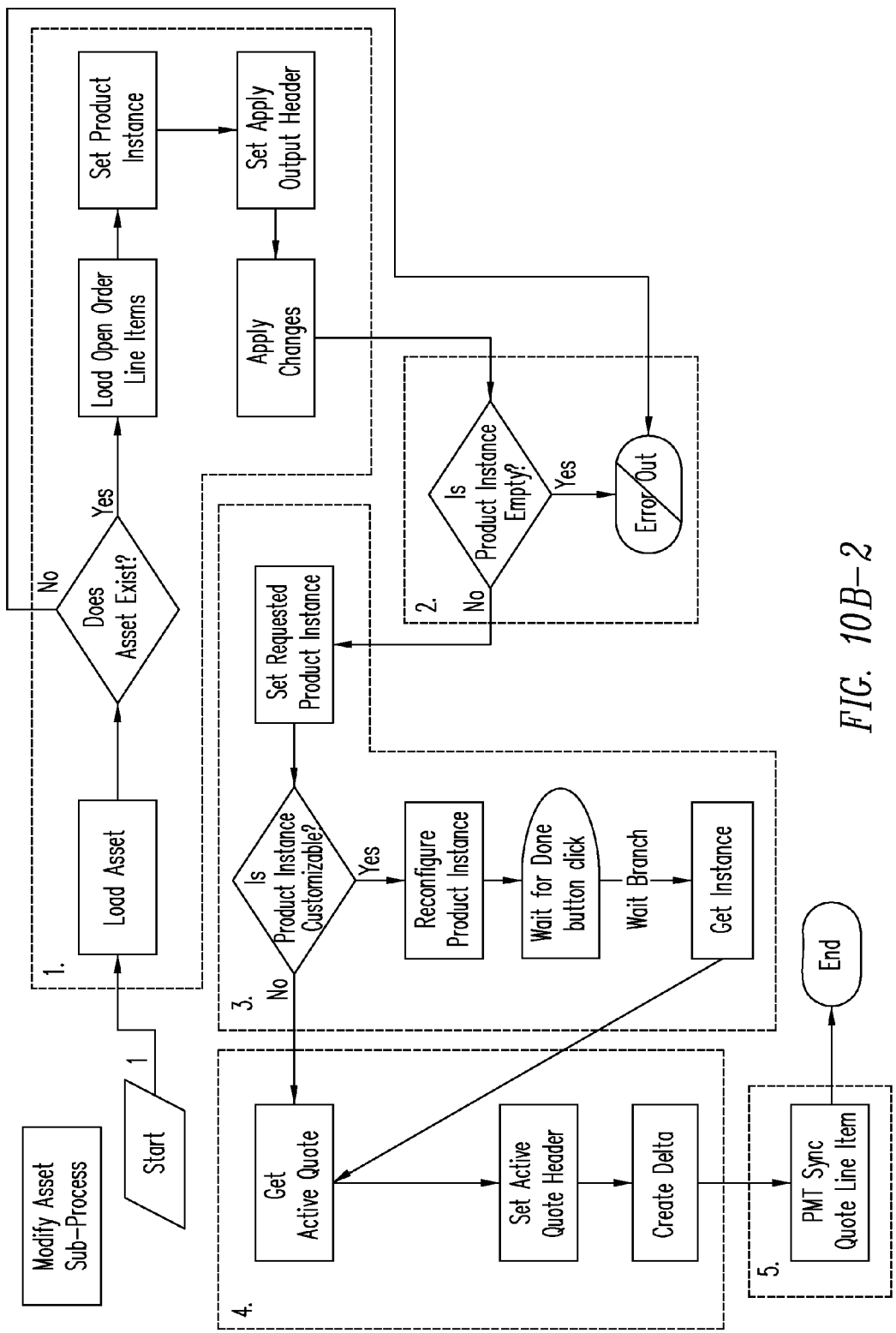

3) Displays the active quote in the Quote Line Items View.

b. Modify Products and Services Process is invoked by selecting the Modify Option in a Products and Services (service or billing) View 916, 918 such as shown in FIG. 9C. FIG. 10B-1 shows a flowchart for an embodiment of the Modify Products and Services Process, which 1) Retrieves the active quote from the session. If there is no active quote, a new quote is created and set as the active quote. If there is an active quote, determine whether the quote is associated with the same customer account as the asset being modified, and whether the quote has a status of In Progress. If the quote does not meet these criteria, a new quote is created and set as active.

2) Checks currency and assigns one, if necessary. If Currency is Null, the workflow proceeds to Step 3 without doing any processing. If Currency is not Null, the Modify Products and Services Process sets the quote's currency to the same currency as that of the associated asset.

3) Makes changes requested by the user. The Modify Asset Sub-Process allows the user to make changes to the currently requested state of the asset.

4) Displays the active quote in the Quote Line Item View.

A flowchart of the logic for implementing the Modify Asset Sub-process is shown in FIG. 10B-2 and performs the following functions:

1) Reads the asset from the database. Only components that do not have a status of Inactive are included. The changes specified by all the open and pending orders related to the asset are applied to re-create the state of the service product as the customer has requested.

2) Determines whether an open or pending order disconnects the root component. If one of the open or pending orders disconnects the root component, then the workflow returns an empty asset and displays an error message.

3) Tests for a customizable asset. If the asset is customizable, it is displayed in the Product Configurator View, where the user can make changes to it. If the asset is not customizable, Modify Products and Services Process goes directly to Step 4.

4) Updates the active quote. The workflow retrieves the active quote. The delta of the previously requested state of the asset and the newly requested state of the asset are added as line items.

5. Saves the quote to the database.

c. Disconnect Products and Services Process disconnects a service item and creates a new quote line item. In one embodiment, the Disconnect Products and Services Process is invoked by selecting a Disconnect Option in a Products and Services View 916, 918, such as shown in FIG. 9C.

Figures 1, 10C:
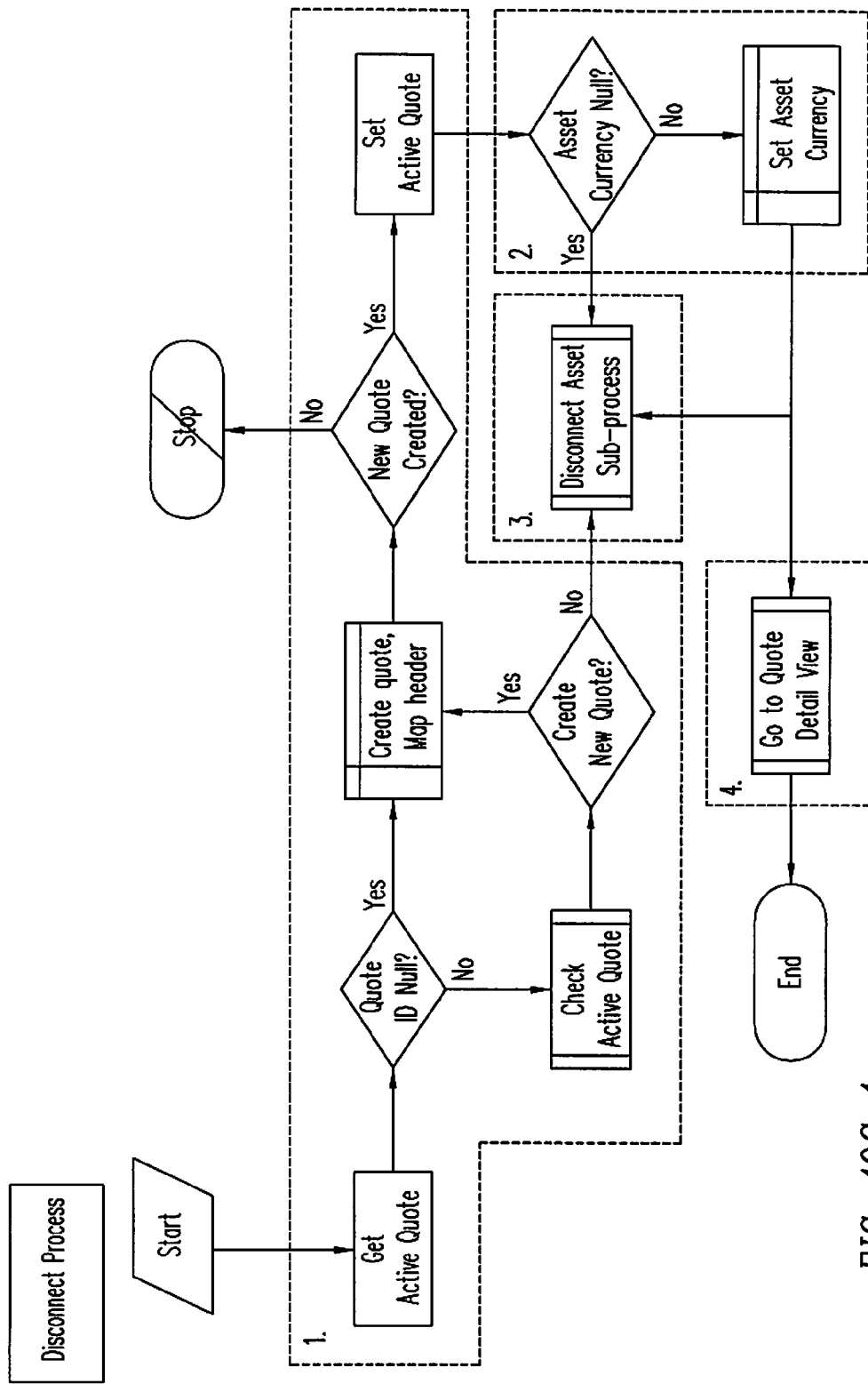
Figures 2, 10C:
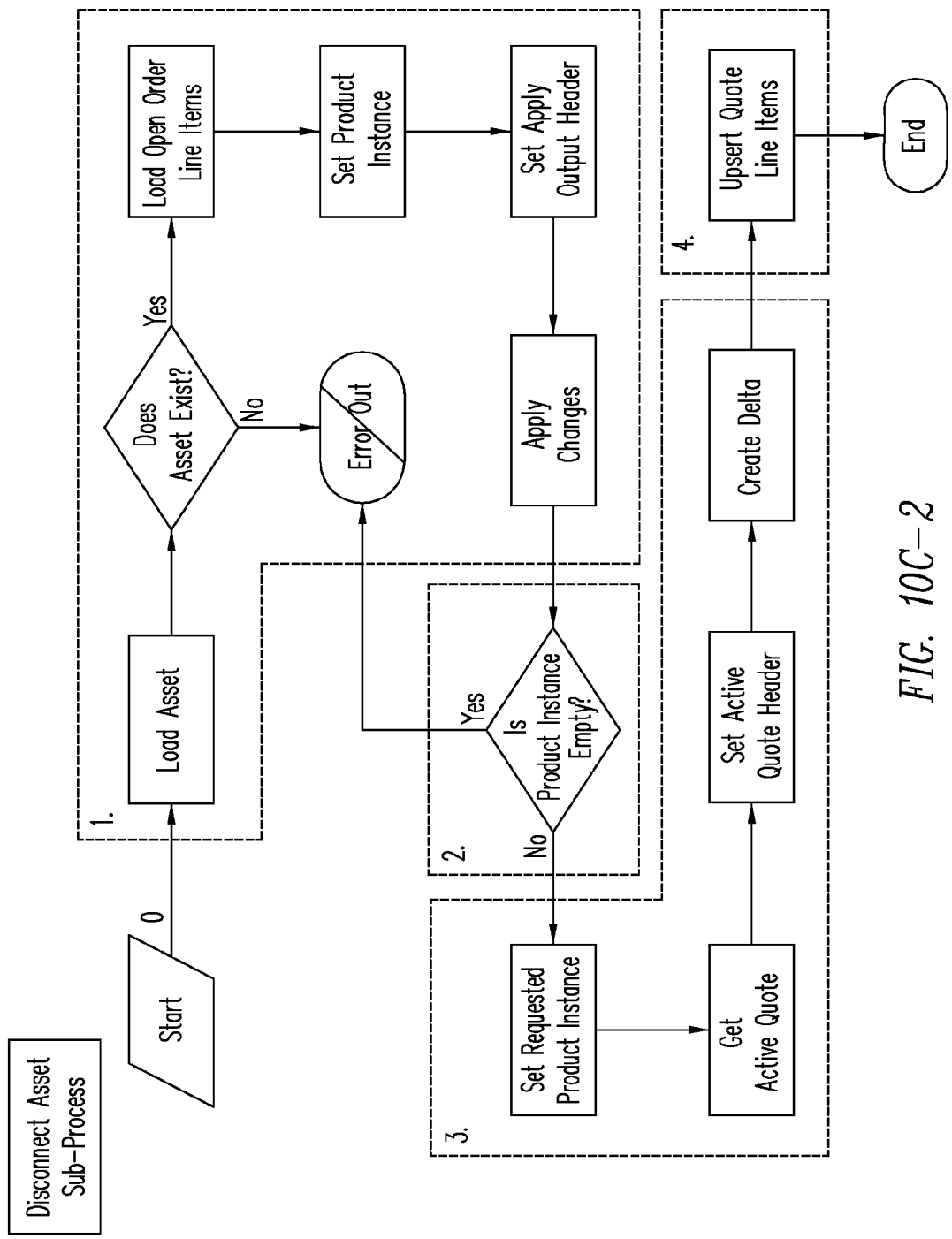

FIG. 10C-1 shows a flowchart of an embodiment of the Disconnect Products and Services Process, which performs the following functions:

1) Retrieves the active quote from the session. If there is no active quote, the Disconnect Products and Services Process creates a new quote and sets it as the active quote. If there is an active quote, the Check Active Quote subprocess determines whether the quote is associated with the same customer account as the asset being modified, and whether the quote has a status of In Progress. If the active quote does not meet these criteria, the Disconnect Products and Services Process creates a new quote and sets it as the active quote.

2) Identifies the currency. If Currency is Null, the workflow proceeds to Step 3 without doing any processing. If Currency is not Null, the Disconnect Products and Services Process sets the quote's currency to the same currency as that of the associated asset.

3) Allows the user to disconnect the asset. The Disconnect Products and Services Process gets the asset's current state and then creates quote line items to disconnect the asset in that state.

4) Displays the active quote. The Disconnect Products and Services Process displays the active quote in a Quote Line Items View such as Quote Line Items View 936 shown in FIG. 9D-2.

d. Profile Process

Figure 10D:
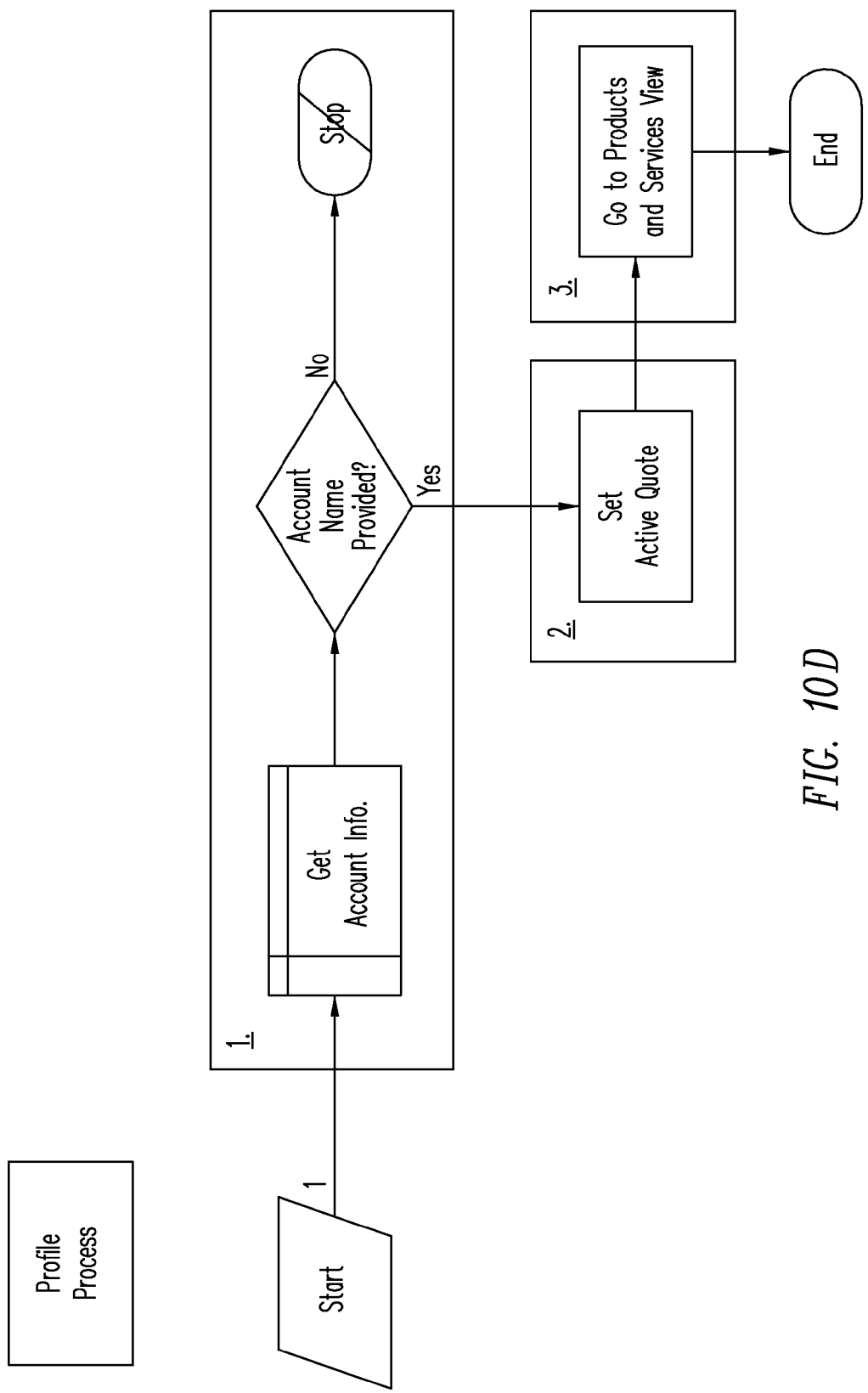
FIG. 10D shows a flowchart of an embodiment of a Profile Process that can be utilized in the complex order processing system of FIG. 7B.

FIG. 10D shows a flowchart of an embodiment of a Profile Process, which is invoked by selecting a Profile Option in Quote Line Items View 936 such as shown in FIG. 9D-2. The Profile Process determines whether account information is available that corresponds to the quote. If not, the Profile Process ends. If so, the Profile Process presents a Products and Services View, such as shown in FIG. 9C, that corresponds to that account type, i.e., whether a billing or service account.

e. Edit Quotes Line Items Process

Figure 10E:
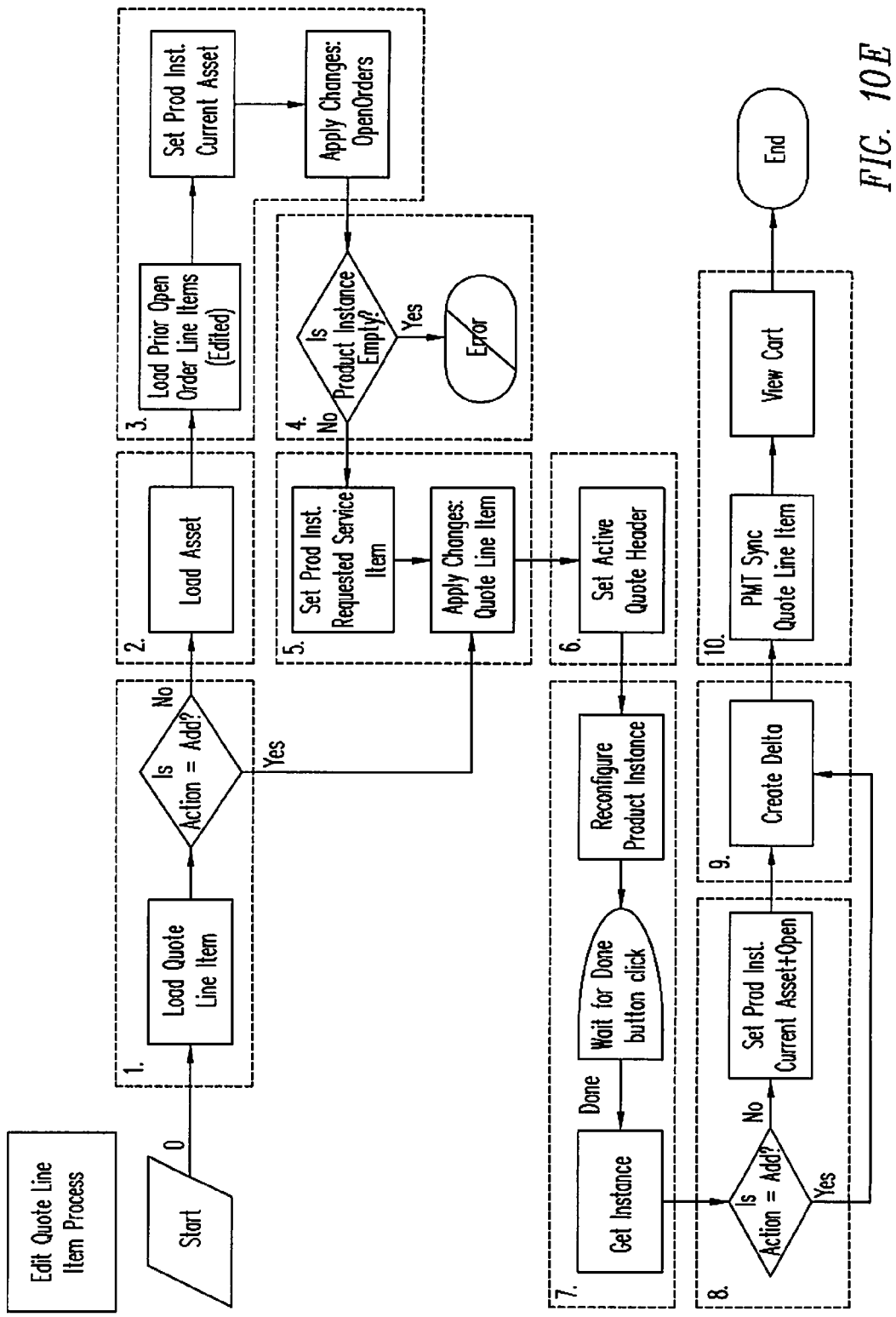
FIG. 10E shows a flowchart of an embodiment of an Edit Quotes Line Items Process that can be utilized in the complex order processing system of FIG. 7B.

FIG. 10E shows a flowchart of an embodiment of an Edit Quotes Line Items Process that is invoked when the user selects the Customize Option in a Quote Line Items View 936 such as shown in FIG. 9D-2.

The flowchart of the embodiment of the Edit Quotes Line Items Process in FIG. 10E includes the following functions:

1) Checks the action code of the top-level component of the order line item. If the action code is Add, then goes to Step 5.
2) If the action code is not Add, reads the asset associated with the selected quote line item from the database. Components with a status of Inactive are excluded.
3) Retrieves all prior active and unprocessed orders that relate to the asset and applies them to generate the requested future state of the asset.
4) If one of the open or pending orders disconnects the top-level component, the resulting asset is empty. Display an error message indicating that a request has already been made to disconnect this service item.
5) Applies the current quote line item to the asset.
6) Stores the quote header so that line items can be added to it.
7) Displays the currently requested state of the asset in the Product Configurator View. The user makes the required changes and selects a Done Option.
8) If the action code of the root item is not Add, caches the previously requested state of the asset to be used as an input to Delta Method.
9) Generates the delta of the following as 1 or more quote line items:
   The requested state of the asset before the current order line item was applied
   The state of the asset after the user has reconfigured the asset
10) Writes the quote line item to the database and refreshes the view.

f. Supplemental Order Process

Figure 10F:
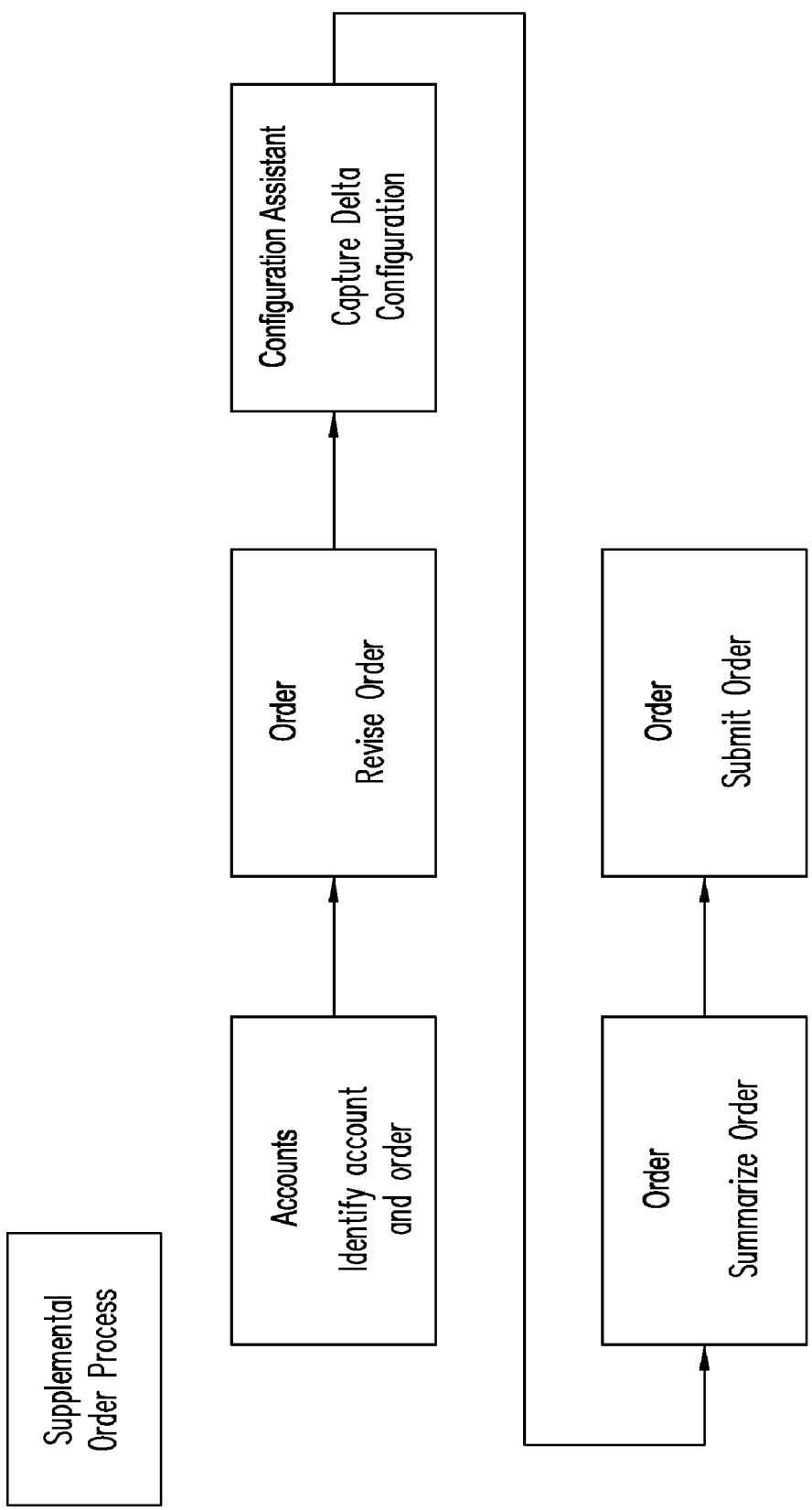
FIG. 10F shows a flow chart of one embodiment of a Supplemental Order Process that can be utilized in the complex order processing system of FIG. 7B.

In some situations, users may need to revise an order that has been submitted. Complex order processing system 700 (FIG. 7B) allows users to revise a previously submitted order and submit the changes. A flow chart of an embodiment of Supplemental Order Process is shown in FIG. 10F. The Supplemental Order Process is invoked by selecting an account and an order associated with the account to be revised.

Any change to an order may impact the price of other items in a bundle or break a product configuration rule. Therefore, changes made to an order must conform to the rules in the Product Configurator (FIG. 7B). A Revise Option is provided on Order Line Items View 938, such as shown in FIG. 9E, to initiate the Edit Order Line Items Process. In some embodiments, the Edit Order Line Items Process invokes the Product Configurator and a Delta Method, as further described herein, to identify the changes to the order. The original state of the configuration includes any order line items from the original order that are already complete as well as any other open orders for the same service item.

In some embodiments, the user revises the order by selecting the Revise Option in Order Line Items View 938. When an order is revised, the order is copied to a new order with a revision number that is incremented by one to become a supplemental order. A supplemental order can be created based on a previous supplemental order. When one or more line items in a pending order are revised, the status of the order changes to "open" when the order is submitted. In some embodiments, an order is submitted by selecting Submit Option from Order Line Items View 938.

When a supplemental order is submitted, part or all of the original order may have been fulfilled while the supplemental order was being created and transmitted to a provisioning system. The Provisioning System handles conflicts and updates the status of the order line items. A Cancel Option can also be provided to delete a supplemental order and reset the "active" flag on the original order.

Figure 10G:
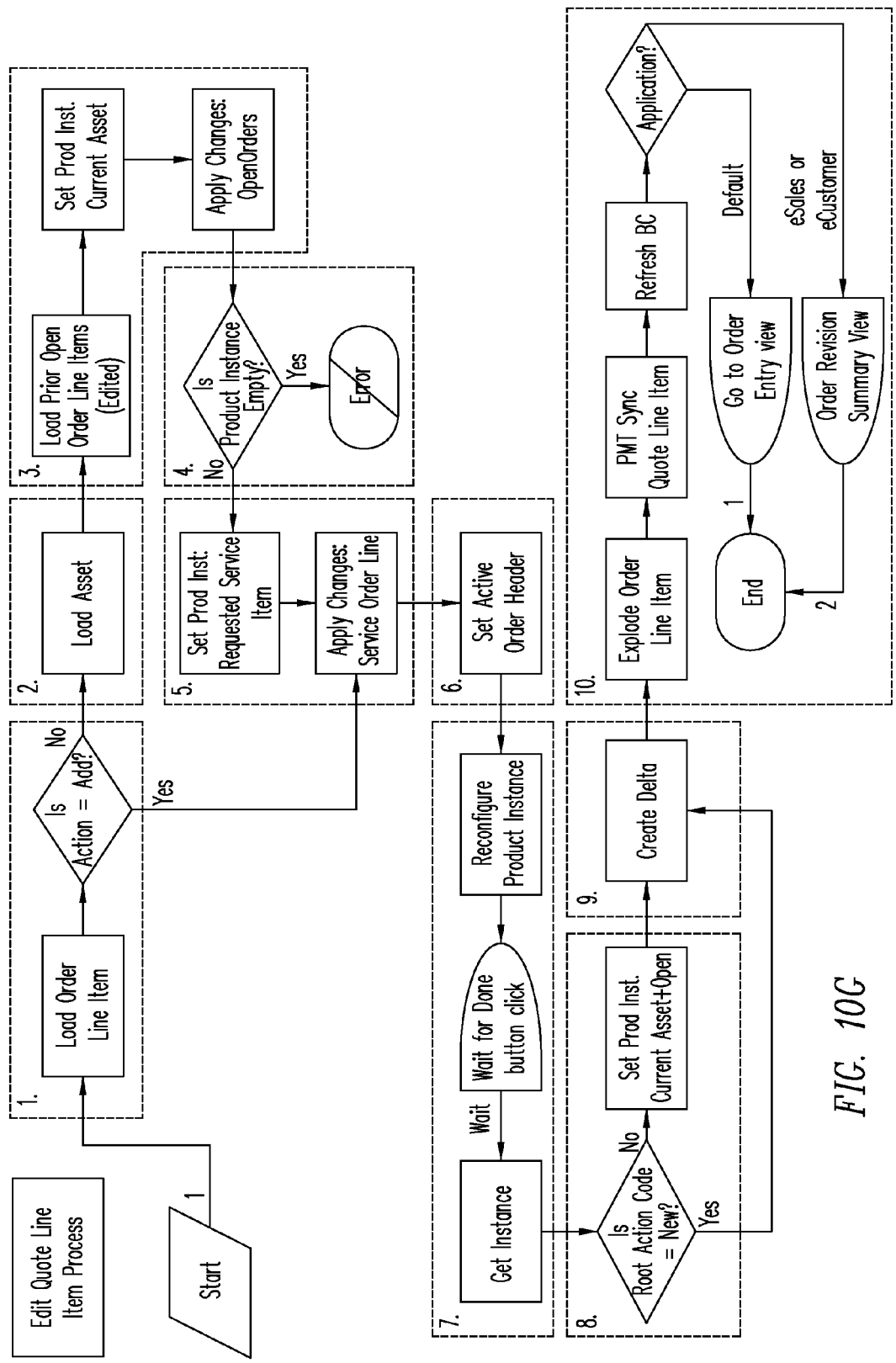
FIG. 10G shows a flowchart of an embodiment of an Edit Order Line Items Process that can be utilized in the complex order processing system of FIG. 7B.

FIG. 10G shows a flowchart of an embodiment of Edit Order Line Items Process which can be invoked in some embodiments by selecting the Customize Option or the Revise Option in Order Line Items View 938, such as shown in FIG. 9E.

g. Edit Order Line Items Process

A flowchart of an embodiment of Edit Order Line Items Process is shown in FIG. 10G and includes the following functions:

1) Check the action code of the top-level component of the order line item. If the action code is Add, then goes to Step 5.
2) If the action code is not Add, read the order line item from the database. Excludes components with a status of Inactive.
3) Retrieve all prior active and unprocessed orders related to the asset and applies them to generate the requested future state of the asset.
4) If one of the open or pending orders disconnects the top-level component, the resulting asset is empty. An error message is displayed to indicate that a request has already been made to disconnect this service item." The Edit Order Line Items Process stops.
5) Applies the current order line item to the asset.
6) Stores the order header so that line items can be added to it.
7) Displays the currently requested state of the asset in the Product Configurator View. The user makes the required changes and clicks the Done button.
8) If the action code of the root item is not Add, caches the previously requested state of the asset to be used as an input to Delta.
9) Generates the delta of the following as one or more order line items:
   The requested state of the asset before the current order line item was applied;
   The state of the asset after the user has reconfigured it.
10) Explodes (ungroups) any order line item that has a quantity of more than 1 into multiple line items, each with a quantity of 1. Writes the order line item to the database and refreshes the view.

h. Quote to Order Process

Figures 1, 10H:
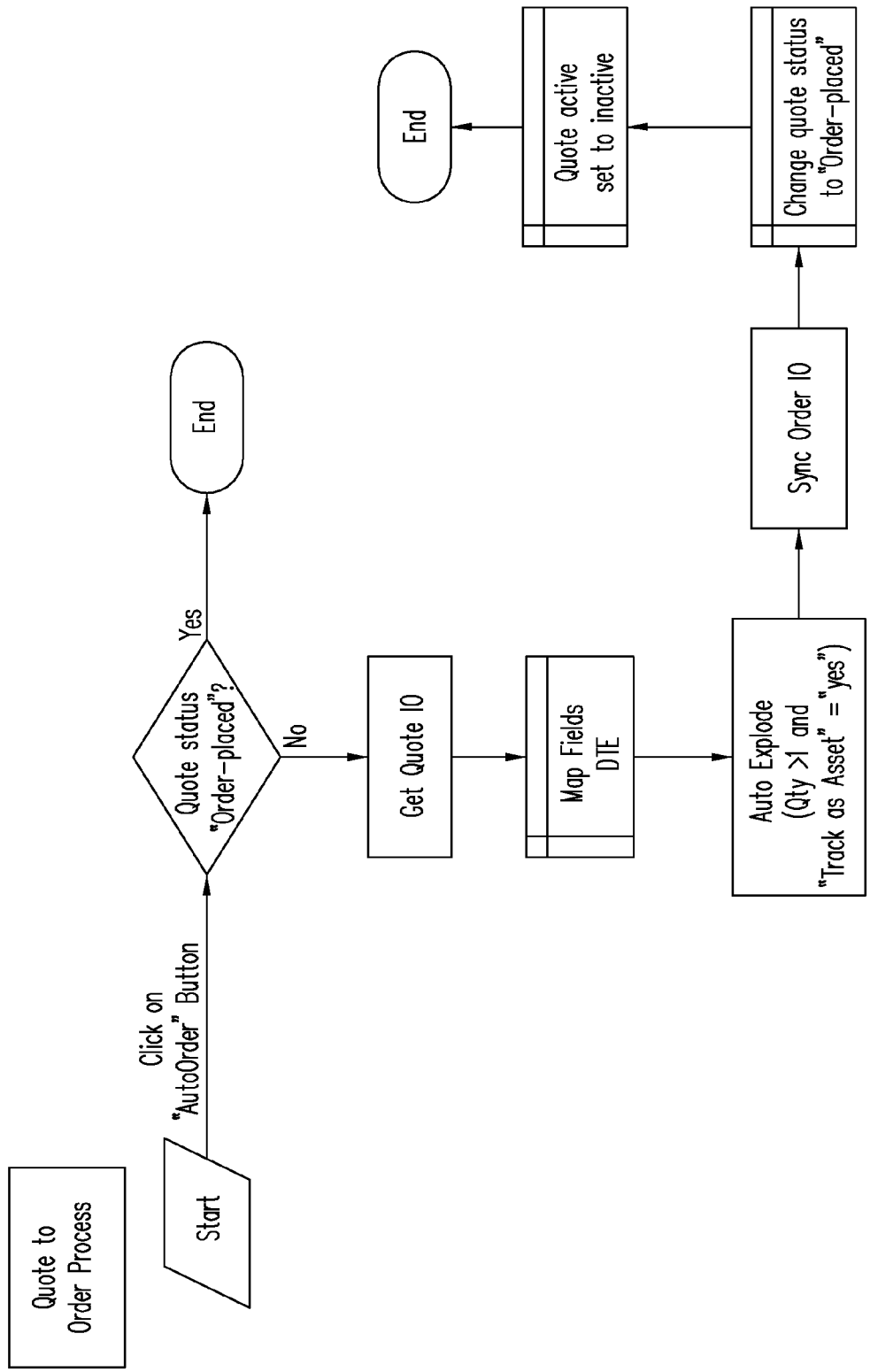

When the customer accepts the changes defined in a quote, the quote is converted to a sales order. A sales order is an instruction to change the services provided to a customer. FIG. 10H-1 shows a flowchart of an embodiment of a Quote to Order Process that is invoked by selecting a Sales Order Option in a pull-down menu in a Quote Line Items View such as shown in FIG. 10H-2. The Quote to Order Process determines whether the quote status is 'order-placed'. If the previous order was placed, the Quote to Order Process ends. If the previous order was not placed, the Quote to Order Process explodes all line items that have quantity greater than one (1) and marked as 'track as asset'.

Once a quote is successfully converted to a sales order, the Quote to Order Process changes the quote status to "Order Placed". The Quote to Order Process initially rejects a quote with a status of "Order Placed" to ensure that the changes are only executed once. The Quote to Order Process sets the order type of the new order to "Sales Order" and its status to "New". Similarly, the status of each order line item is set to either "New" if the action field is non-null or null if the action field is null.

i. Update Opportunity Process

Figure 10I:
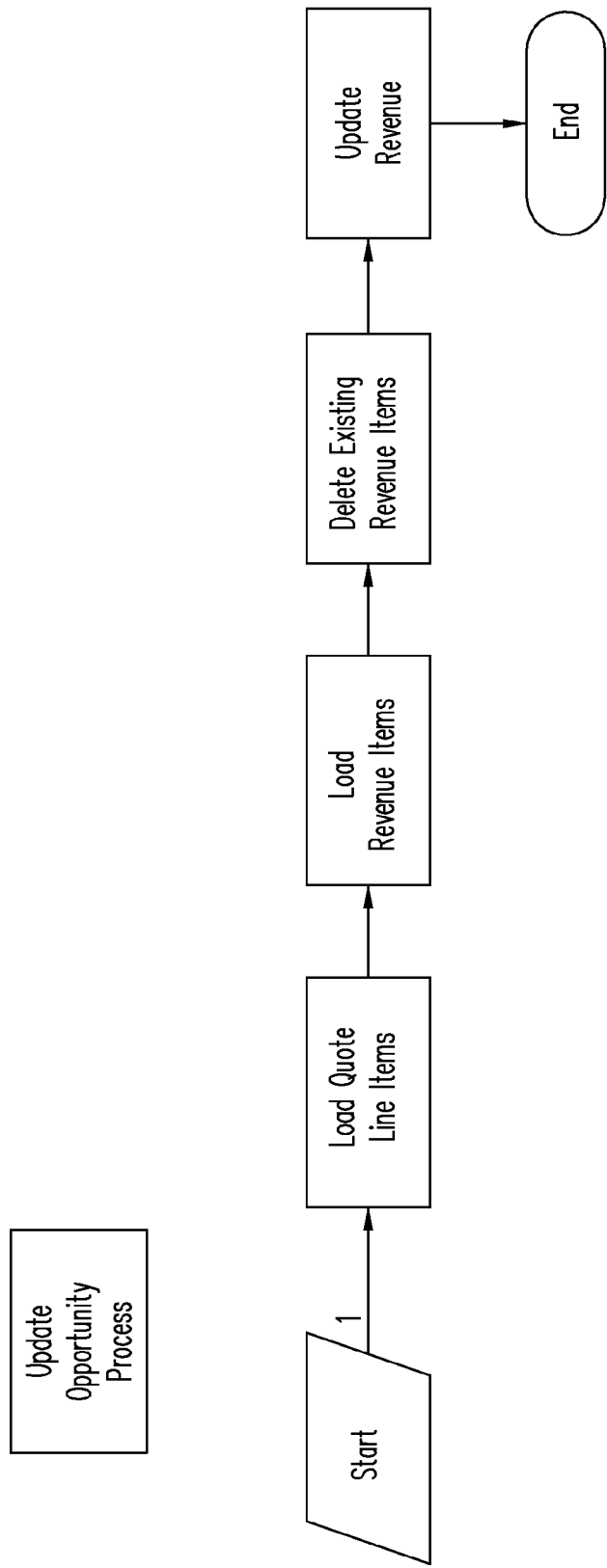
FIG. 10I shows an embodiment of an Update Opportunity Process.

FIG. 10I shows an embodiment of an Update Opportunity Process that is invoked by selecting an Update Opportunity Option in a Quote Line Items View such as shown in FIG. 9D-1. The Update Opportunity Process creates revenue items for all quote line items. The embodiment of the Update Opportunity Process shown in FIG. 10I performs the following functions:

1) Reads the quote line items from the database.
2) Reads the revenue items associated with the opportunity related to the quote from the database.
3) Deletes the existing revenue items.
4) Creates revenue items for each quote line item that has the following:
   An action code of Add or Update
   A price type that is not Usage
   An extended quantity that is not zero For line items with recurring price types, the Update Opportunity Process generates a quantity of revenue items equal to the value of the quote line item's Number of Occurrences field, at intervals equivalent to the unit of measure.

j. Submit Order Process

Figure 10J:
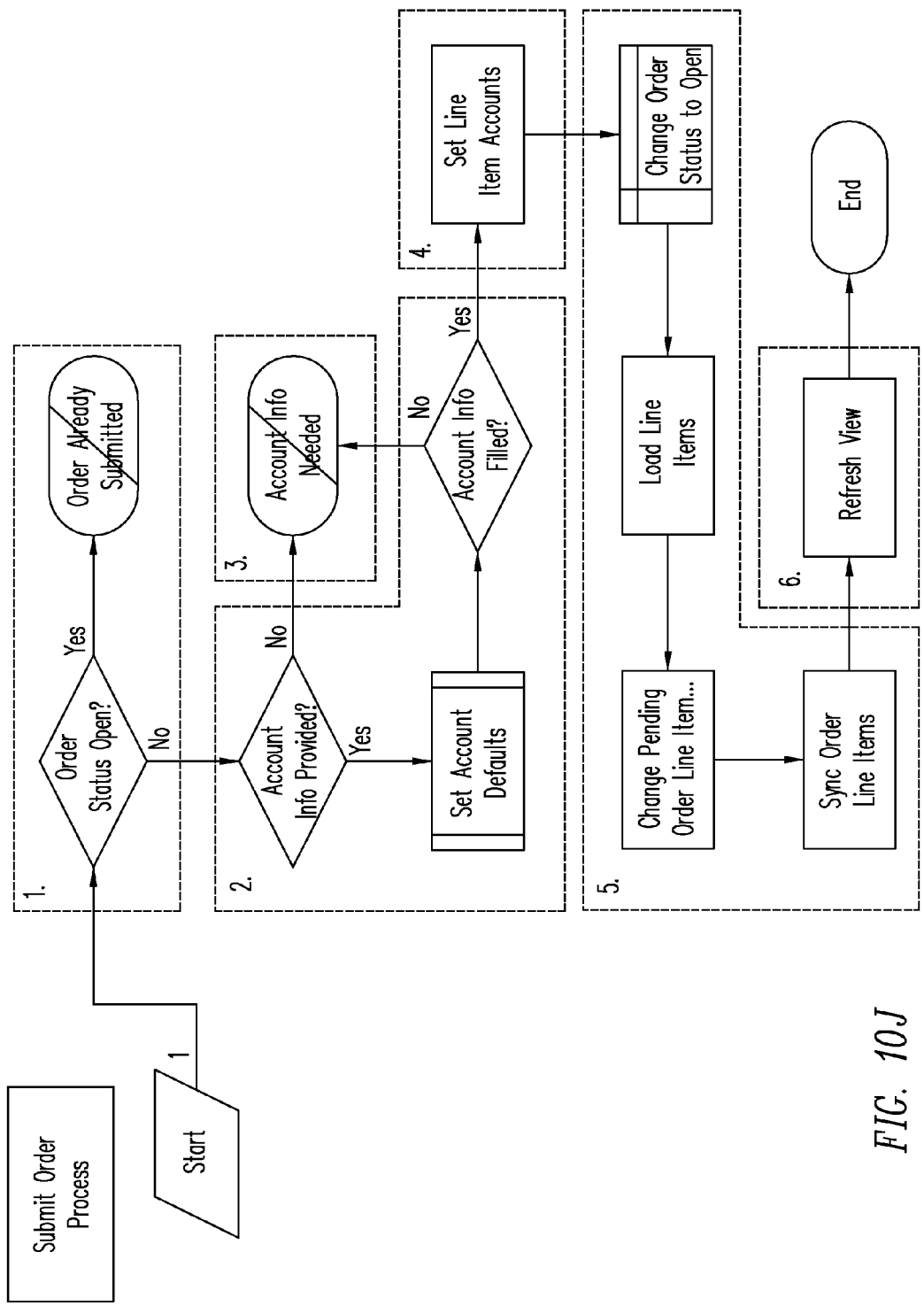
FIG. 10J shows an embodiment of a Submit Order Process that can be utilized in the complex order processing system of FIG. 7B.

FIG. 10J shows an embodiment of a Submit Order Process that is invoked by selecting a Submit Order Option in an Order Line Items View such as shown in FIG. 9E. The embodiment of the Submit Order Process shown in FIG. 10J performs the following functions:

1) Checks that the order status is not Open. If the order has a status of Open, it cannot be submitted, because it has already been submitted.
2) Fills the order header with the account information. If the service and billing accounts have not been specified in the order header and the Submit Order Process can identify the accounts, it automatically fills them in.
3) For unidentified accounts that the workflow cannot identify, displays an error message requesting that the user specify the accounts.
4) Propagates the account information to the line items. After the account fields are filled in the order header, the Submit Order Process propagates this information to any line item in which the accounts are not specified.
5) Sets the status of the order to Open. Also sets the status of any Pending line items to Open.
6) Refreshes the view.

k. Ungroup Quotes Process

Figure 10K:
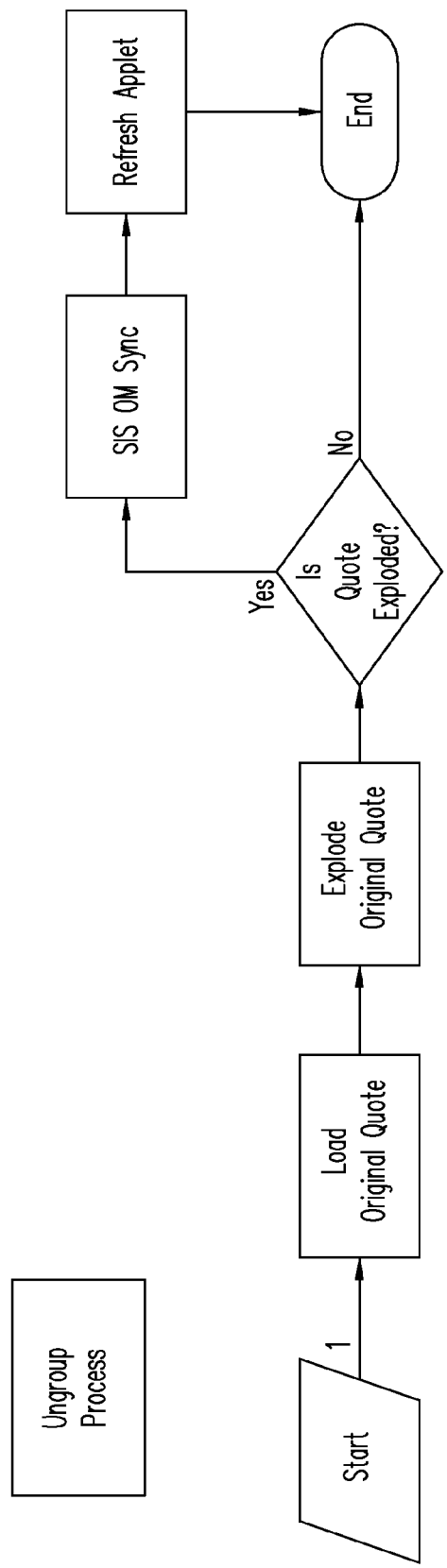
FIG. 10K shows a flowchart of an embodiment of an Ungroup Quotes Process that can be utilized in the complex order processing system of FIG. 7B.

FIG. 10K shows a flowchart of an embodiment of an Ungroup Quotes Process that is invoked to "explode" a root level quote line item which is the ultimate parent of the current active quote line item. In some embodiments, the Ungroup Quotes Process is invoked when the user selects the Ungroup Option on a Quote Line Items View such as shown in FIG. 9D-2.

In some embodiments, each service item must have a unique identifier (e.g. telephone number). Therefore, a quantity greater than one for each service item cannot be supported in the service profile (assets). A user can request a quote for multiple items in one quote line and configure that set of items as a unit, however, the items must be ungrouped into individual order line items with a quantity of one and enter service ID information for each instance before submitting an order. Products that are not tracked as assets (i.e. Track As Asset Flag="N") can appear on an order line item with quantity greater than one.

If the selected item is a sub-component of a customizable product, then multiple child records are created with the same parent. The copies include any child components and attributes. In one embodiment, the new copies are written to the database via the EAI Adapter 412 (FIG. 4B).

The embodiment of the Ungroup Quotes Process shown in the flowchart of FIG. 10K includes:

1) Loading the quote line item into a quote item integration object
2) Invoking the Explode Method with an identifier indicating the ultimate root level quote item integration ID of the selected active quote item.
3) Transform the integration object from Explode Method to an exploded quote, and synchronize the exploded quote to the database.
4) Refresh the Quote Line Items View.

When the completed order is converted into an asset the integration ID is copied from the order line item to asset. When the asset is subsequently modified (via selection of a Modify or Disconnect Option, for example), the integration identifier is copied to the quote and order line items.

l. Apply Completed Sales Order Line Item Process

Figure 10L:
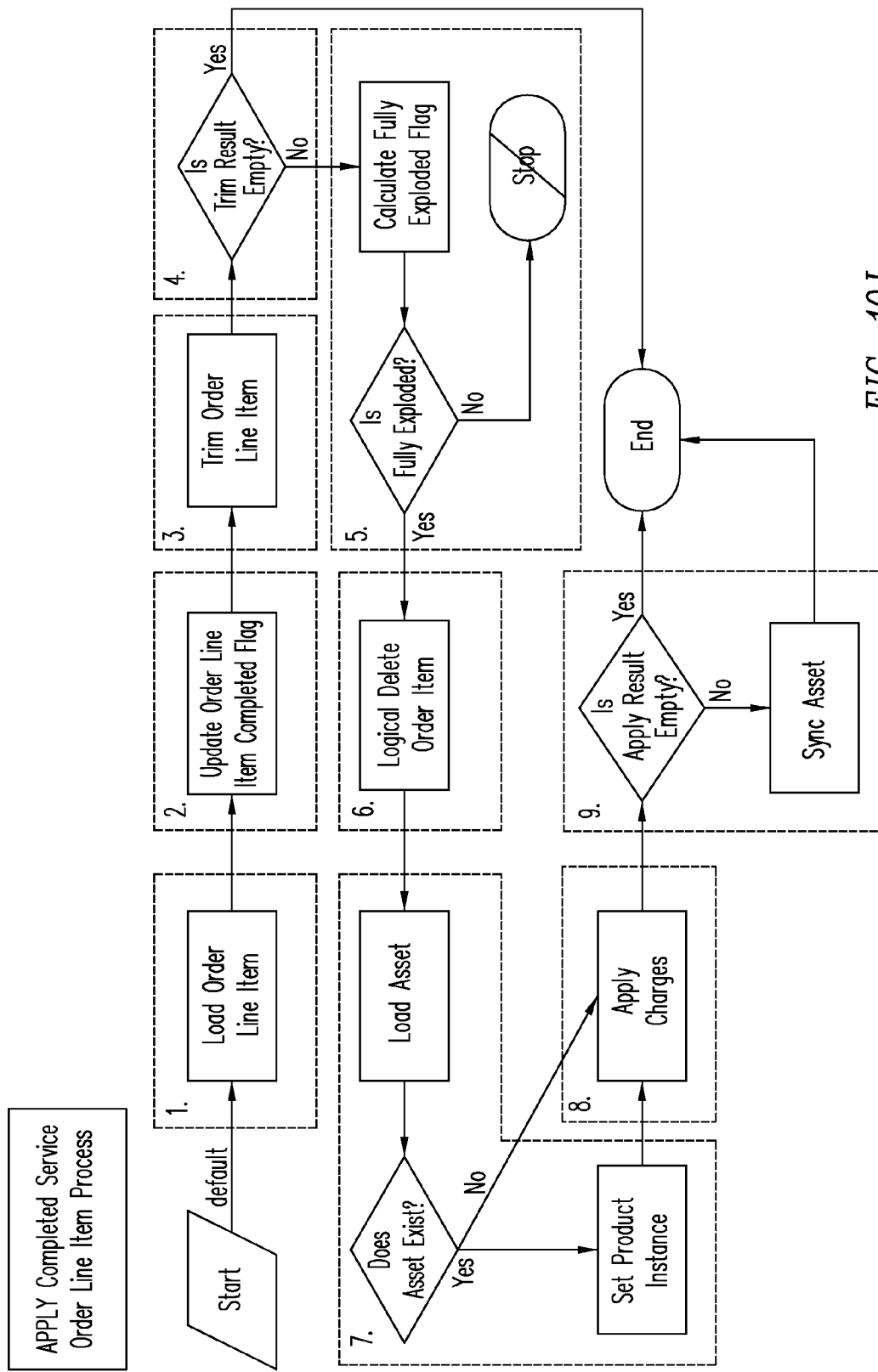
FIG. 10L shows a flowchart of an embodiment of an Apply Completed Sales Order Line Item Process that can be utilized in the complex order processing system of FIG. 7B.

FIG. 10L shows a flowchart of an embodiment of an Apply Completed Sales Order Line Item Process which applies completed sales order line items to a service profile. In some embodiments, the Apply Completed Sales Order Line Item To Service Profile Process updates the asset table of assets that have been provisioned and can be invoked by an external provisioning workflow to reflect the changes in the asset table. In one embodiment, the Apply Completed Sales Order Line Item To Service Profile Process is invoked by selecting the Auto-Asset Option from an Order Line Items View such as shown in FIG. 9E.

Referring to FIG. 10L, the embodiment of the Apply Completed Sales order Line Item Process shown includes the following functions:

1) Loads the selected order line item from the database.
2) Updates the Order Item Processed flag. The Apply Completed Sales Order Line Item Process updates the Order Item Processed flag of the topmost order line item. The Apply Completed Sales Order Line Item Process sets this flag to Y if all line items have a status of Complete, Failed, or –. Other workflow processes use this flag to determine whether a line item remains Open and should be applied to the current service profile to generate a requested future state.
3) Applies the Trim Method. Trim eliminates any incomplete or failed changes from the order line item. The Trim Method eliminates line items whose products are not tracked as assets, line items whose status is not Complete, and line items whose action code is "–". This causes the service profile to reflect the true state of the assets.

4) Checks whether line items exist. If Trim has eliminated all line items, the Apply Completed Sales Order Line Item Process stops. Otherwise, the Apply Completed Sales Order Line Item Process continues.

5) Checks the quantity of each line item. The Apply Completed Sales Order Line Item Process checks whether all line items have a quantity of one (1). At this point, all line items with a quantity greater than 1 should have been exploded into separate line items. The Apply Completed Sales Order Line Item Process stops if an item has not been exploded. Error-handling logic can be included to prevent this situation.

6) Converts Delete actions into Update actions. The Logical Delete step converts Delete actions into Update actions and sets the status to Inactive. This step supports the maintenance of a history of disconnected services.

7) Loads the service profile from the database. If the order line item is a change to an existing item, the Apply Completed Sales Order Line Item Process loads the corresponding service profile, or asset, from the database.

8) Applies the order line item to the asset. If the asset does not already exist, the Apply Completed Sales Order Line Item Process creates a new asset.

9) Checks whether the asset is empty. If, as a result of applying the changes, the asset is empty, the Apply Completed Sales Order Line Item Process stops. Otherwise, the Apply Completed Sales Order Line Item Process writes the asset to the database.

m. Move Process

A customer may wish to turn off all services (for example, electricity and gas in the case of an energy customer) at one of the addresses associated with his account (for example, his winter home) and "transfer" this service to a new address. This requires two separate actions—a disconnect of existing services, on a specified date, at the address from which the customer is moving and a connection of new services, on a specified date, at the location to which the customer is moving. The Move Process allows customer service representatives to transfer the customer's configuration from the old location to the new location by selecting a Move Option with the push of one button, by defaulting the existing services to the new location. This functionality is especially valuable for customers who wish to maintain complex configurations during a change of address.

In one embodiment, the Move Process is invoked by selecting the Move Option from Identify Account View 900, such as shown in FIG. 9B. The Identify Account View 900 is then replaced with a Move View (not shown) that displays the old address, and allows the user to enter the new address, the move out date, and the move in date. The Move View also includes a Transfer Option, which when selected after entering the move information, presents a Quote Line Item View 936, such as shown in FIG. 9D-3 showing two copies of the quote. One copy has an action code of Delete and is associated with the move-out address. The line items in the other copy have an action code of Add and are associated with the move-in address.

The services available at the new location may depend on the location itself (for example, even though the customer has both gas and electric service at their current address, the address they are moving to may not be set up for electric service). The customer service representative can verify that there is a service point in the Service Point field. If an item does not have a service point, the item is deleted from the quote, and the customer can be informed that some of their existing services are no longer available to them. The quote can then be converted to an order and submitted for provisioning.

Figure 10M:
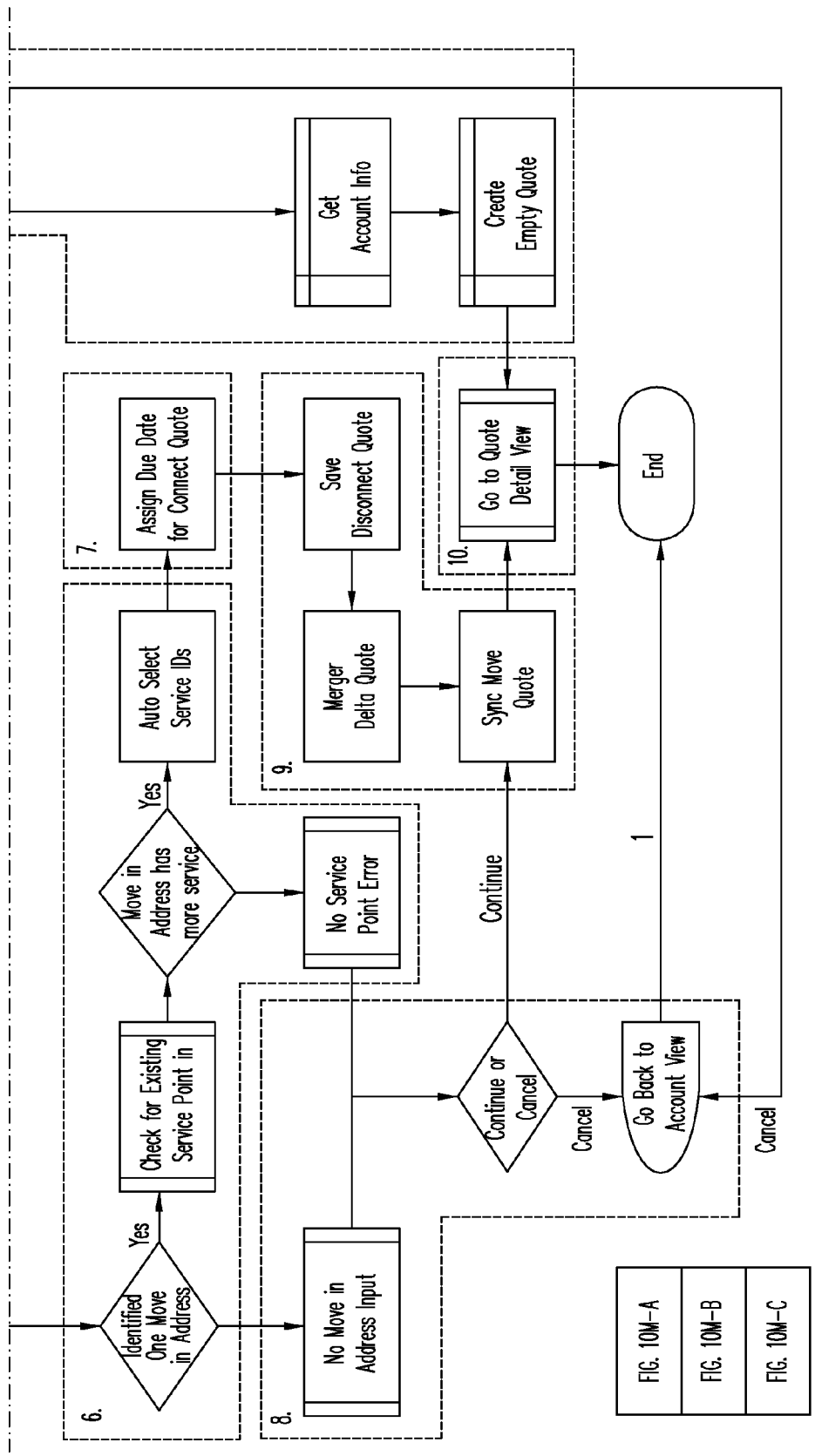
FIG. 10M shows a flowchart of an embodiment of a Move Process that can be utilized in the complex order processing system of FIG. 7B.

The embodiment of the Move Process shown in the flowchart of FIG. 10M includes:

1) Identifying and validating the move-out and move-in addresses.
2) Retrieving the complex assets for the move-out address if the move-in address and the move-out address are validated.
3) Generating a new quote and filling in the account information with information from the complex assets of the move-out address.
4) Generating two quote line items for each complex asset at the move-out address, one item having a disconnect action code, and the other line item having an "add" action code.
5) Specifying a due date for each of the quote line items.
6) If the move-in address is identified, assigning a service point to each quote line item to be connected at the move-in address.
7) If the move-in address is not identified, informing the user that the transfer cannot be completed if there is no move-in address.
8) Specifying the due date for each of the quote line items to be connected.
9) Merging the disconnect line items and the connect line items into one quote and saving the quote to the database.
10) Displaying the move-in and the move-out quotes in the Quote Line Item View.

The workflow processes described herein provide examples of workflow processes that can be utilized by some embodiments of complex order processing system 700 (FIG. 7B) in accordance with the present invention. It is recognized that other embodiments of complex order processing system 700 can utilize other workflow processes that perform different functions and have different configurations instead of, or in addition to, the workflow processes described herein.

Business Service Methods

Referring again to FIG. 8, business service methods 802 create, copy, compare, and merge complex objects, which can be based on service profile, quote, or order line items, among others. Business service methods can be linked to implement functions to be performed by the workflow processes, thereby allowing the user to add "Delta", "Apply", and other methods to any workflow process 804.

In some embodiments, the quotes and open orders are maintained in database 414 (FIG. 4B) while the assets are maintained in an external database. A Provisioning workflow can be included to maintain the service profiles by retrieving and storing service profile information from an internal or external provisioning system as options are selected in complex order processing system 700 (FIG. 7B). In some embodiments, this can be accomplished by invoking the synchronization process as described herein.

The two primary methods, Apply and Delta, transform data from Quotes and Orders to Assets, and from Assets to Quotes and Orders. The Apply Method applies changes defined in Quotes and Orders to an Asset, putting the Asset into a new state. Delta creates a Quote or Order that defines the changes required to convert the initial state of an Asset into the final state of an Asset.

In some embodiments, business service methods can be provided in a dynamic link library (DLL) to support complex order processing system 700 (FIG. 7B). The interface to the DLL is managed by the Object Manager (FIG. 4A). The following examples of business service methods can be included to support complex order processing system 700:

a. Apply Method

Figure 11A:
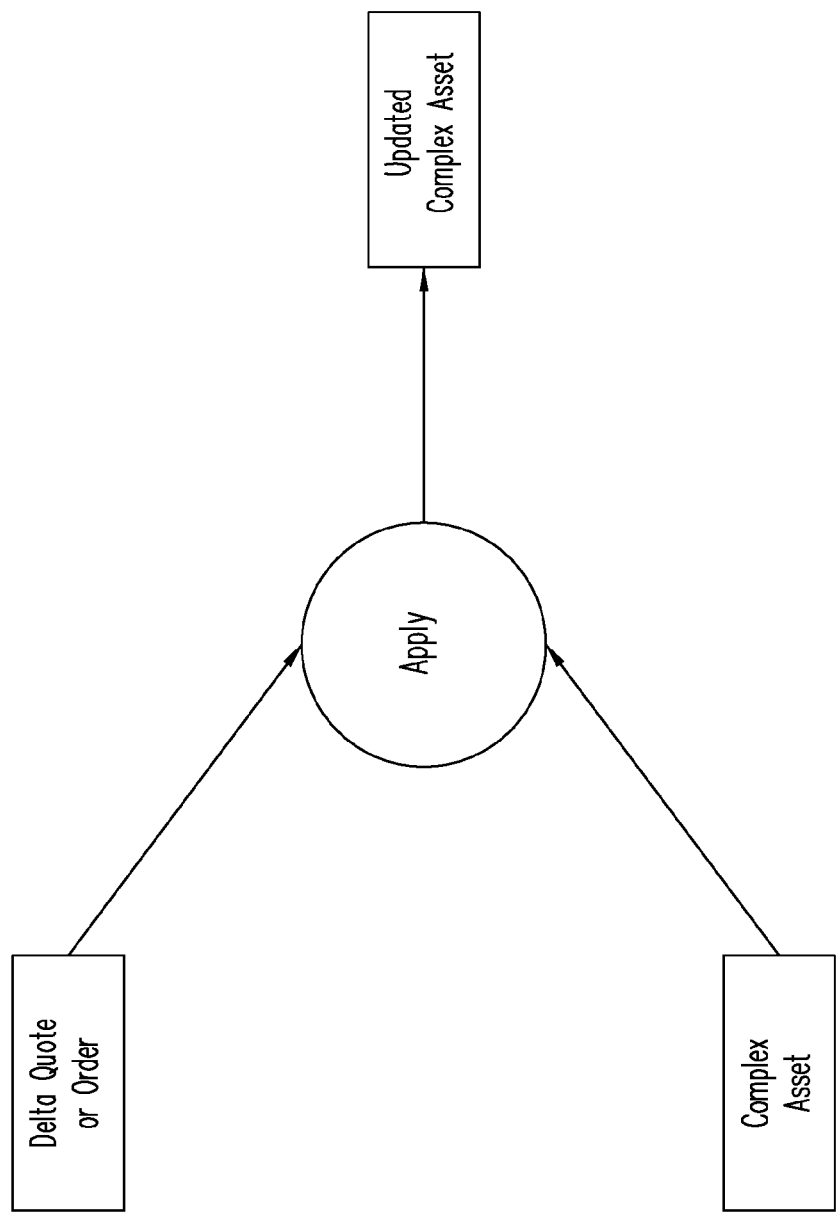
FIG. 11A shows a block diagram of input and output for an Apply method that can be utilized in the complex order processing system of FIG. 7B.

In some embodiments, the Apply Method creates a hybrid asset/order that simulates the future configuration of a customizable product. The Apply Method can take an asset representing a customizable product and overlay the unprocessed items and attributes of that product from all of the open orders, as represented by the flow diagram in FIG. 11A.

The asset's items and attributes are already provisioned, therefore their action codes carry the internationalized equivalent of the "–" (blank) value. An open orders property set can include anywhere from zero to many open orders in a single property set. When several orders are represented, the open orders property set can include a multi-root hierarchy.

In some embodiments, a Set Product Instance Method can be invoked to support enterprise application interface (EAI) Adapters in the generation of input property sets. For example, one EAI Adapter is invoked to generate the asset property set, and another is invoked to generate the open orders property set. The Apply Method returns a property set representing the combined output of the input property sets as a single complex asset. The asset property set is assumed to be a single hierarchy representing one customizable product, based on the integration identifier for the root of that customizable product.

In some embodiments, the open orders property set is assumed to have a Null hierarchy, a single hierarchy representing one customizable product, or a container of iterations of a customizable product, each representing a change over time. The customizable product is based on the integration identifier for the root of the customizable product. In order to accurately track the changes to the items and attributes, the natural iteration sequence of the container of hierarchies yields each customizable product in ascending chronological sequence.

In some embodiments, the Apply Method performs the following functions:

1) initializes internal structures and stores the passed property set;
2) retrieves the asset property set from its internal storage and instantiates an output complex object;
3) instantiates a complex object from the open orders property set, which can be input as a parameter;
4) iterates through the open order property set, applying each item in turn, repeating for each open order in ascending chronological sequence, as shown in the example of apply Method pseudo-code hereinbelow;
5) fixes the output hierarchy to reflect the open order when the structure of the hierarchy is altered; and
6) returns the output property set.

Figures 1, 11B:
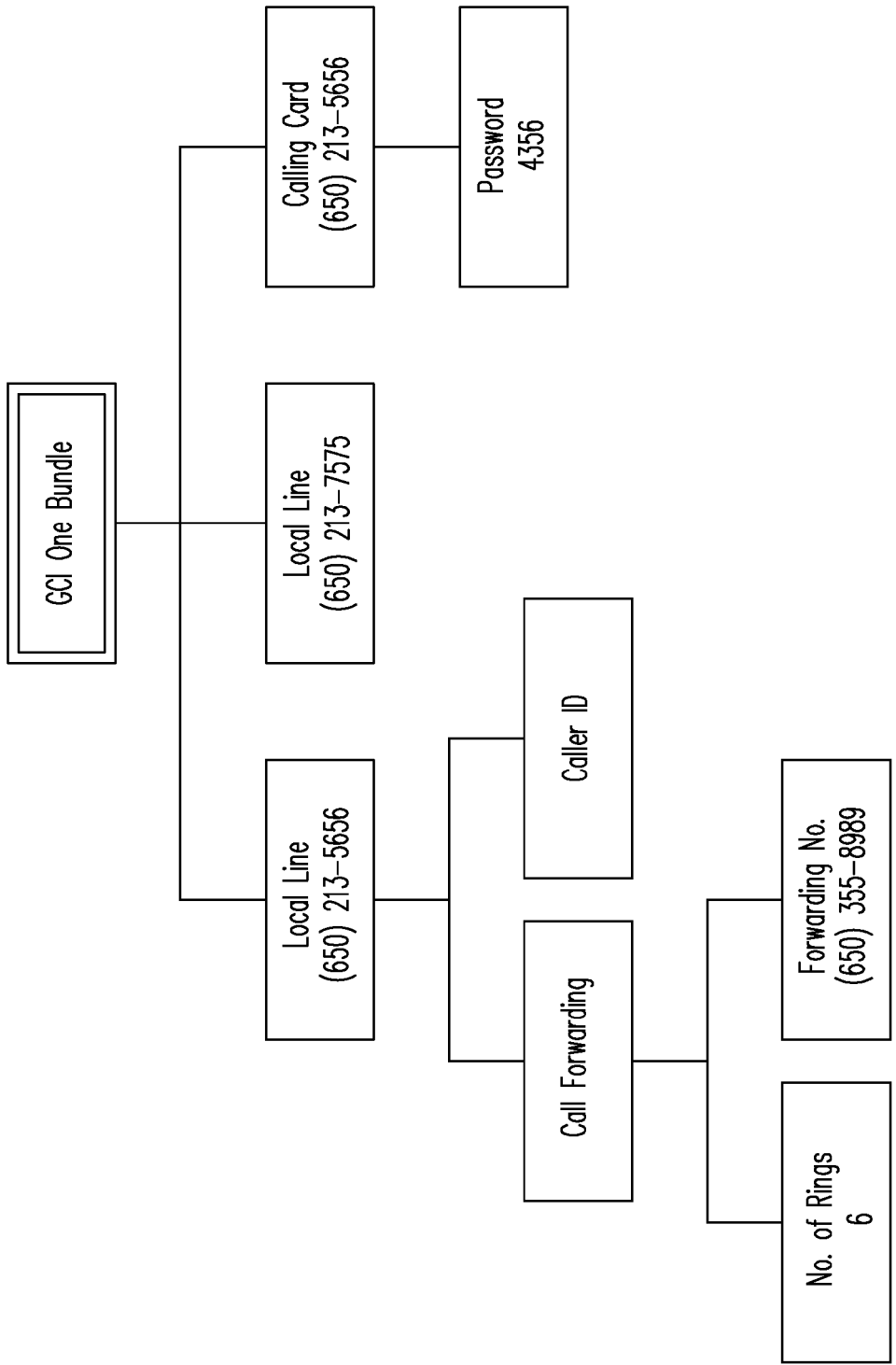
Figures 2, 11B:
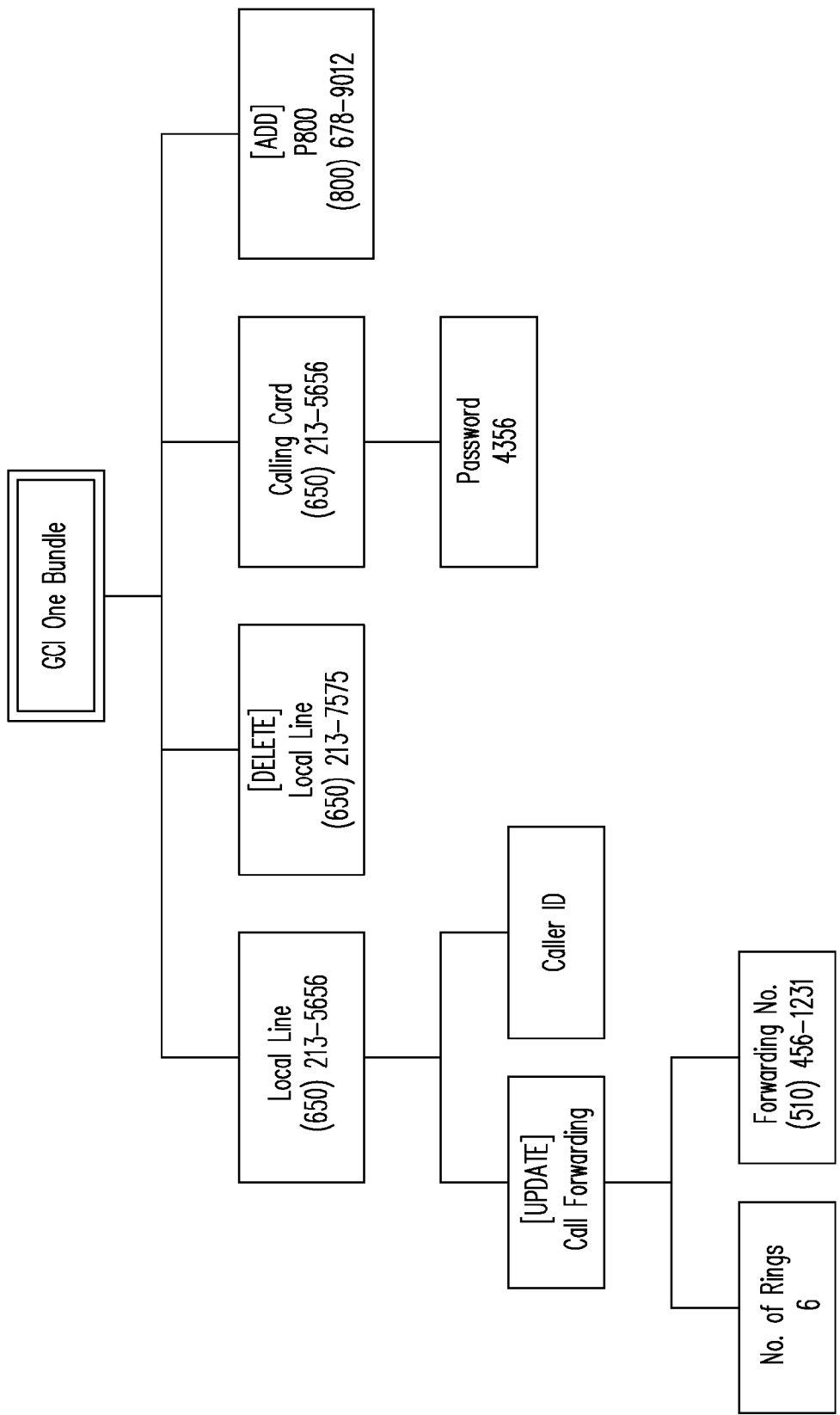
Figures 3, 11B:
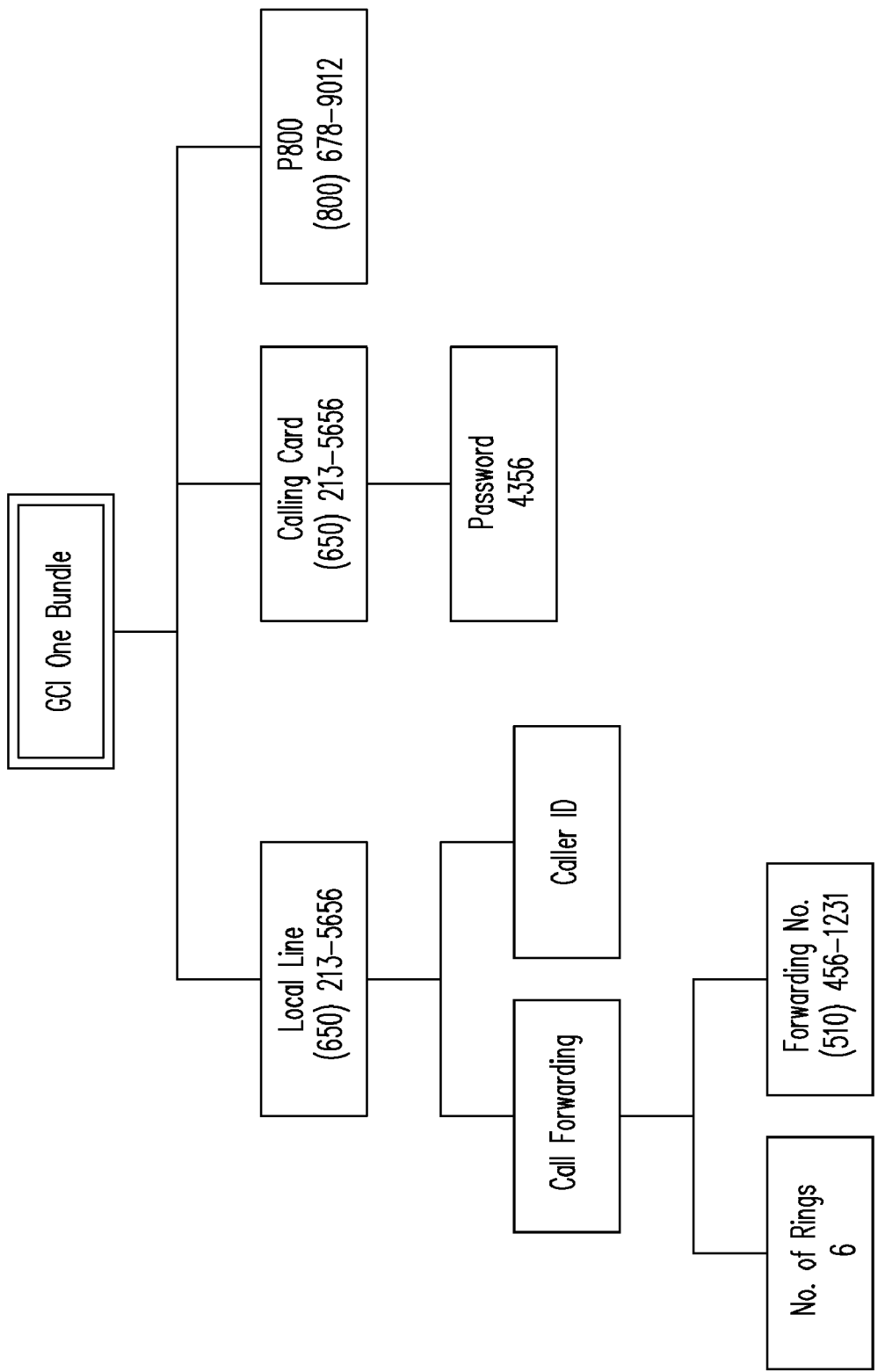

FIGS. 11B-1 through 11B-3 show an example of the results of the functions performed by the Apply Method that starts with a complex asset in FIG. 11B-1, applies a delta order shown in FIG. 11B-2, and generates a new complex asset shown in FIG. 11B-3.

Figures 1, 11C:
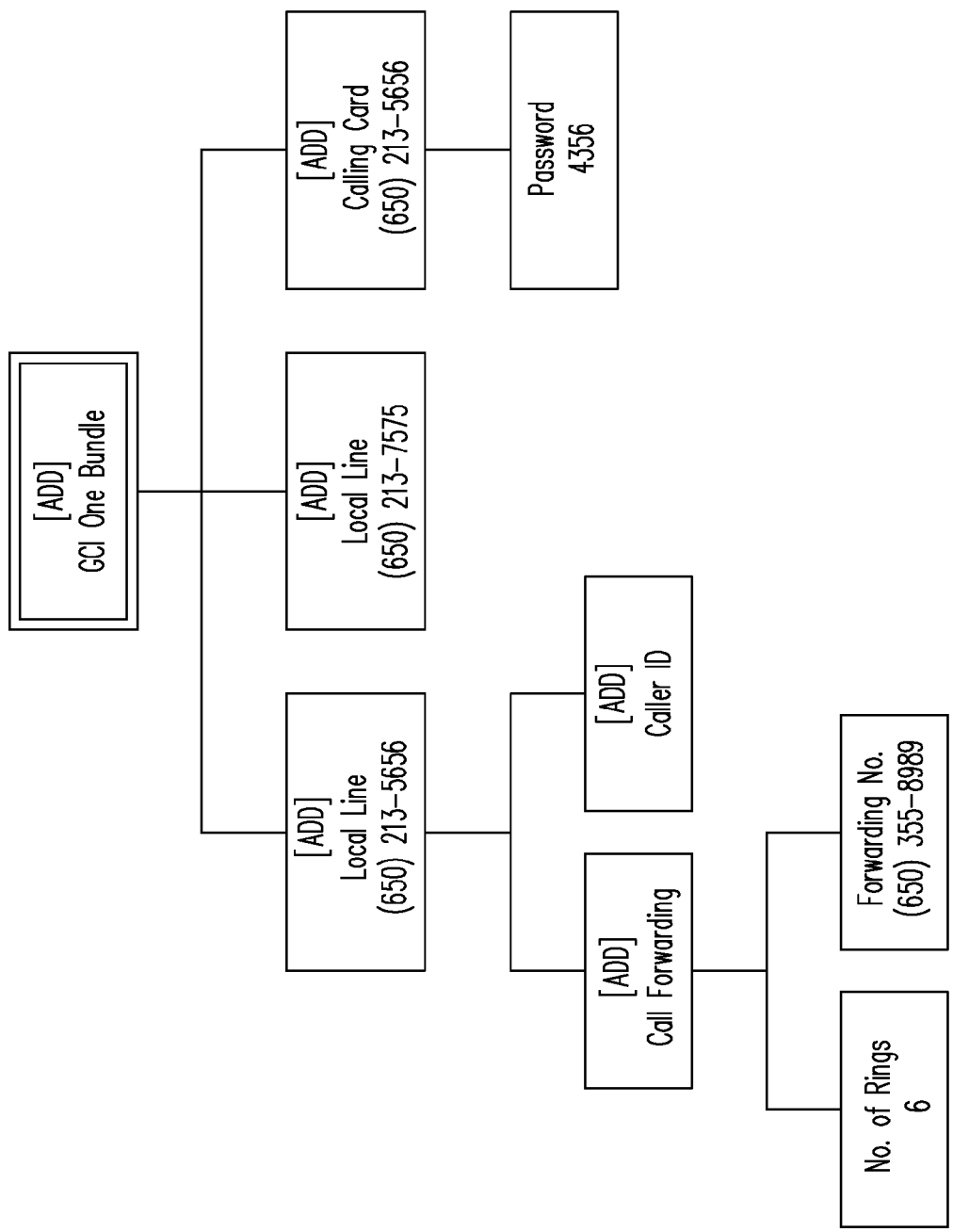
Figures 2, 11C:
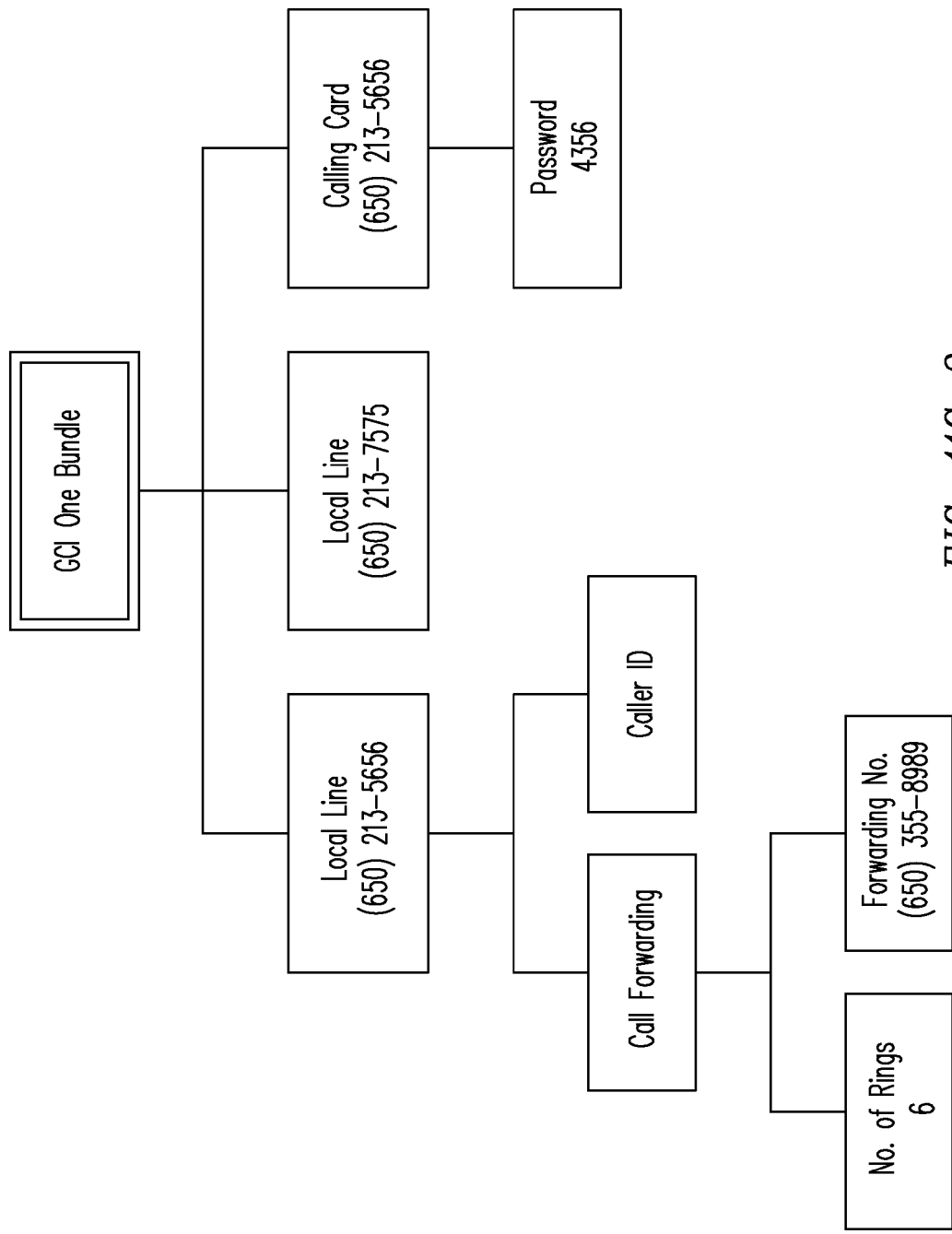

FIGS. 11C-1 through 11C-2 show an example of the results of the functions performed by the Apply Method that starts with an empty asset and applies a new install shown in FIG. 11C-1 to create a new complex asset shown in FIG. 11C-2.

Figures 1, 11D:
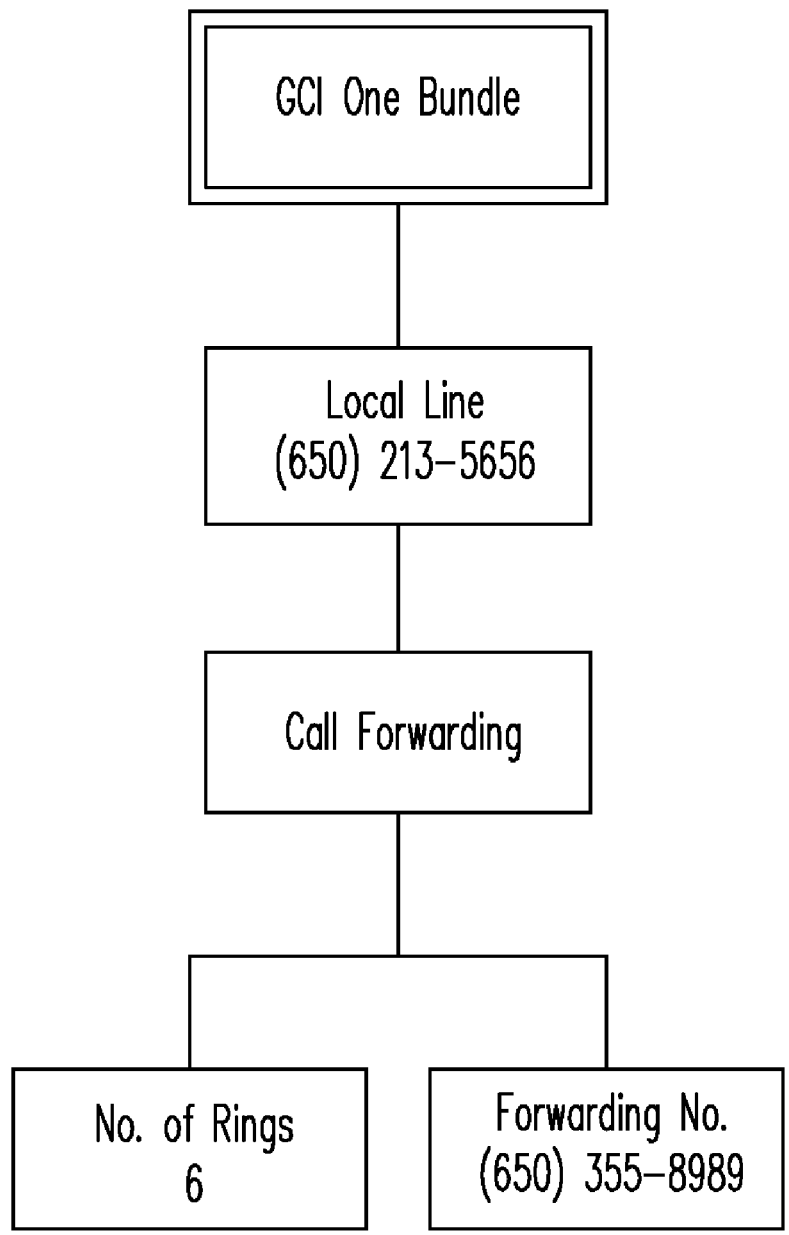
Figures 2, 11D:
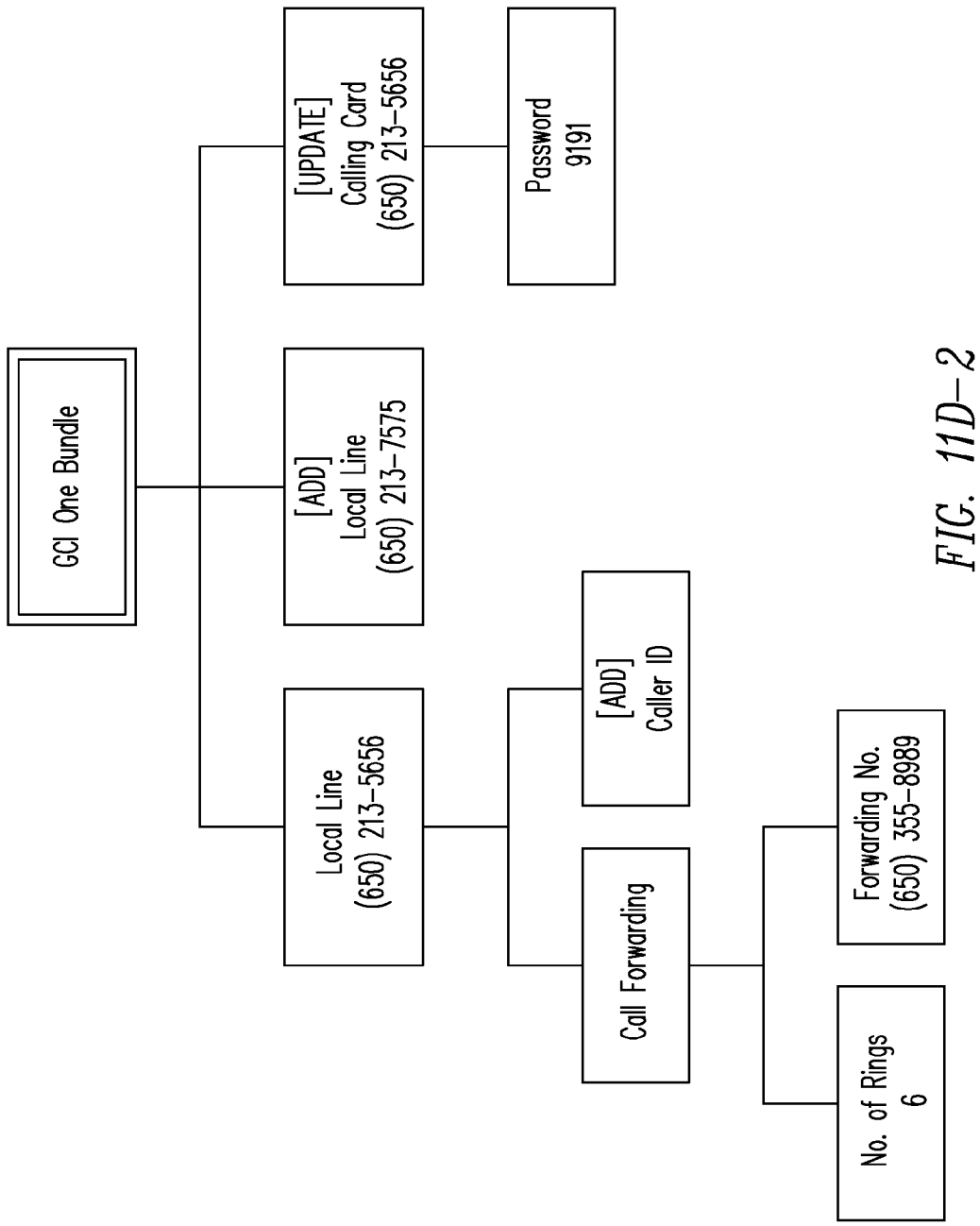
Figures 3, 11D:
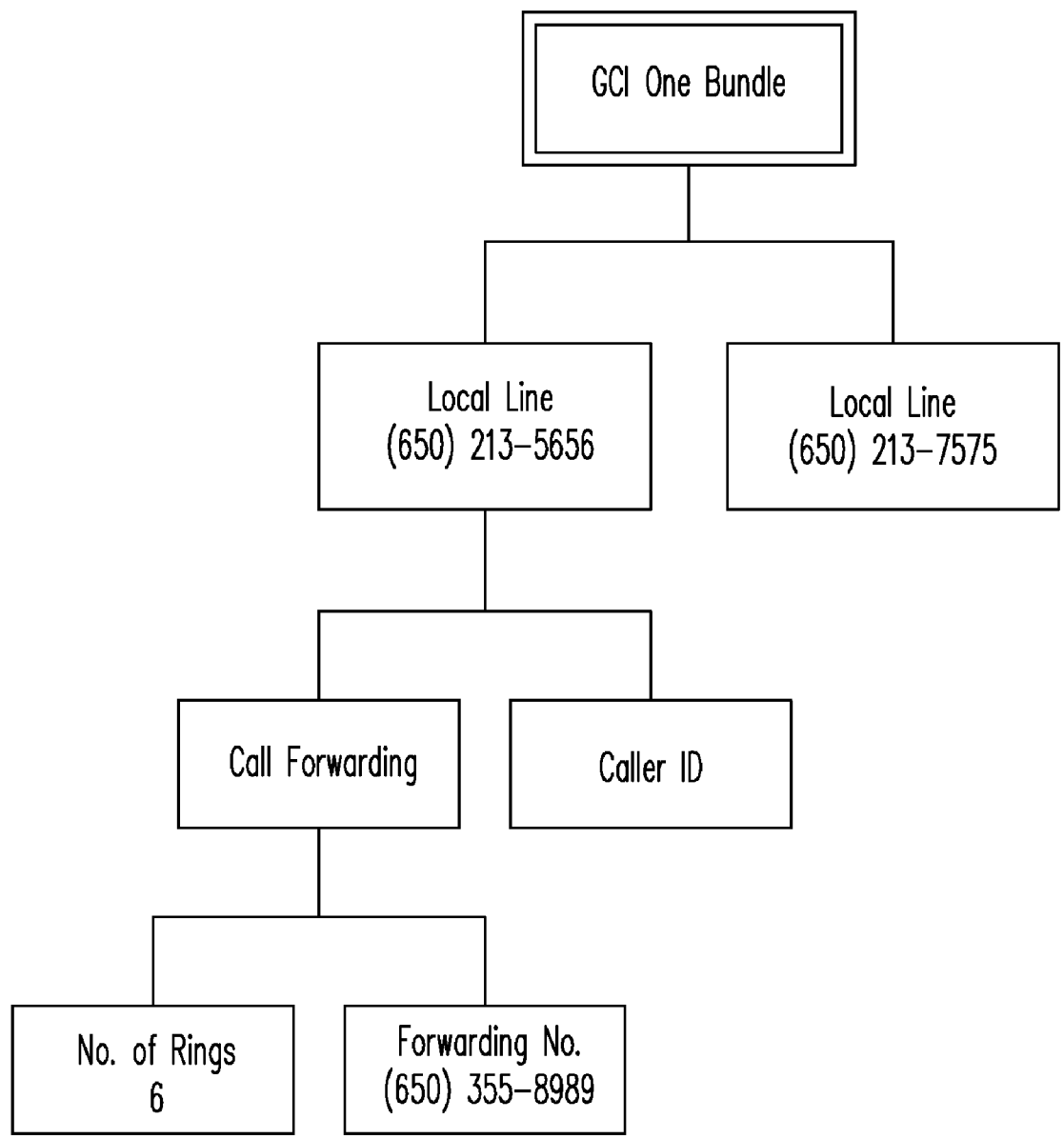

FIGS. 11D-1 through 11D-3 show an example of the results of the functions performed by the Apply Method that starts with a complex asset shown in FIGS. 11D-1 from an external profile management system, applies a delta quote shown in FIG. 11D-2 that was generated previously, and generates the complex asset shown in FIG. 11D-3. Note that the calling card referred to in the delta quote has been removed from the profile since the quote was created. The Apply Method ignores updates to the service item that no longer exists, but successfully executes the remaining changes.

Figures 1, 11E:
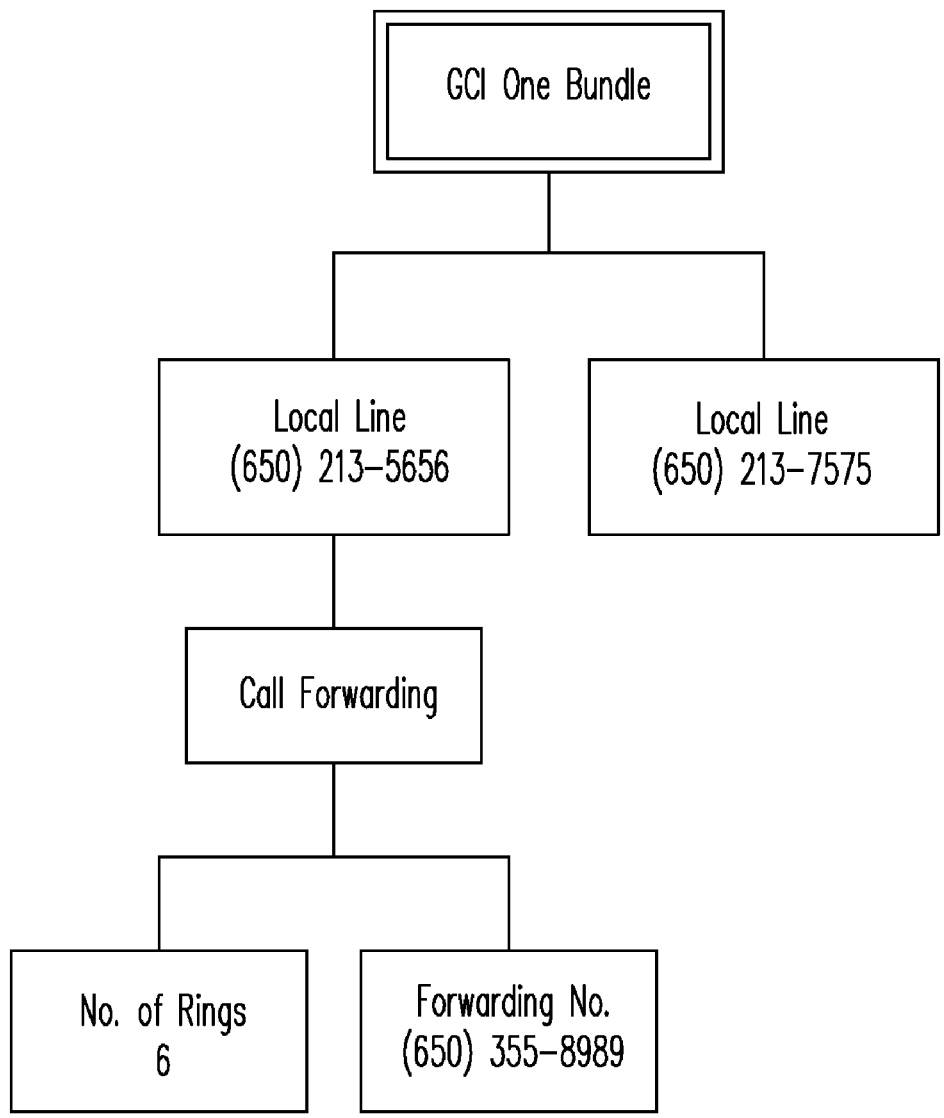
Figures 2, 11E:
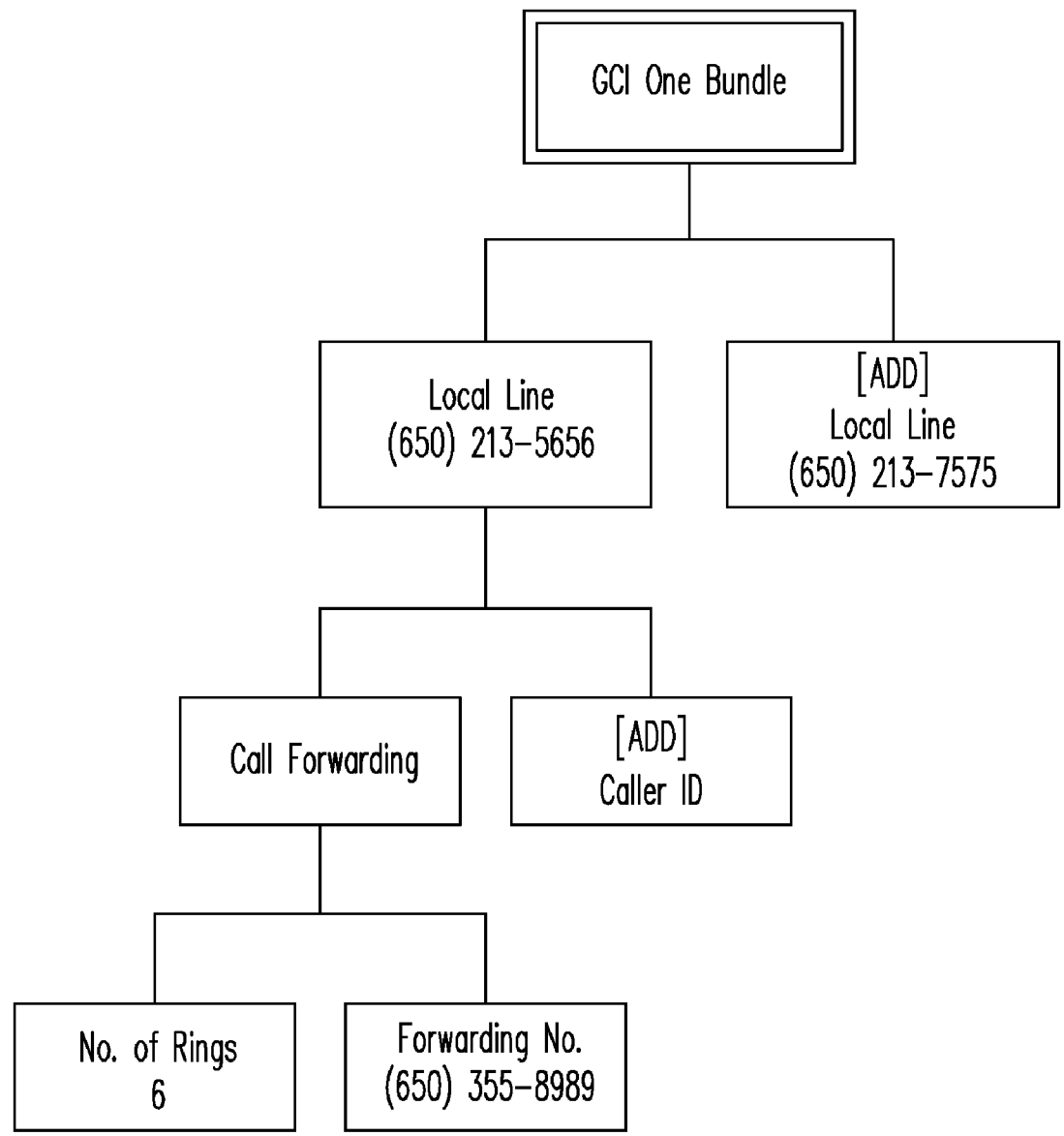
Figures 3, 11E:
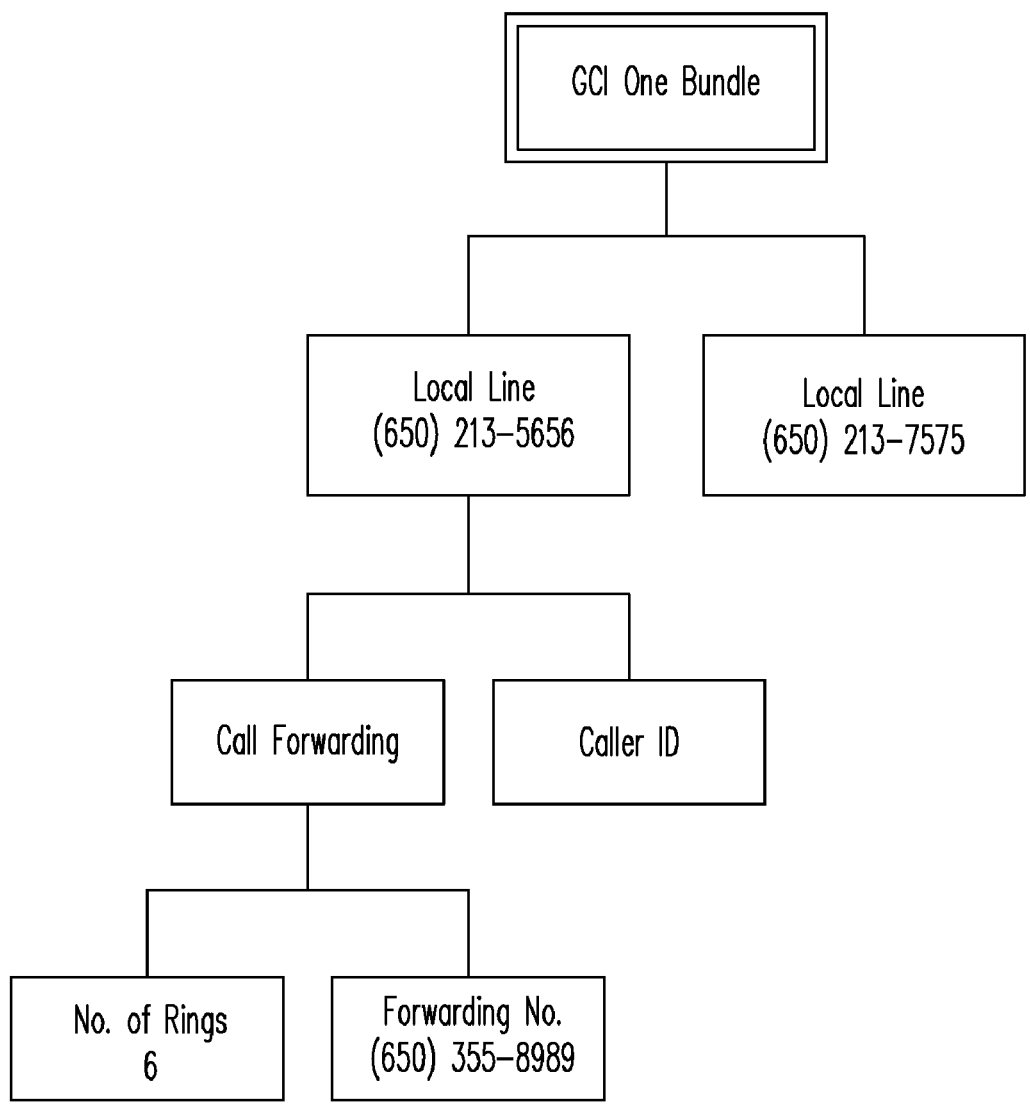

FIGS. 11E-1 through 11E-3 show an example of the results of the functions performed by the Apply Method that starts with a complex asset shown in FIGS. 11E-1 from an external profile management system, applies a delta quote shown in FIG. 11E-2 that was generated previously, and generates the complex asset shown in FIG. 11E-3. Note that the second local line (650) 213-7575 already exists in the service profile. The Apply Method ignores adds where the service item already exists, but successfully executes the remaining changes.

In some embodiments, the fields to be included from the asset and open orders data can be defined through user properties. Exception conditions in the application of items with conflicting action codes can be resolved as specified in the following example of pseudo-code for the Apply Method:

```
class classItemImage
    String    IntegrationId, // double-up required during
CreateMasterParentList( )
    String    LastAction,
    ItemInst  *ItemInst,
    String    ItemParent,
    Array     AttribList,
    Array     AttribListLastAction
endclass
Create CxObj from AssetIn
    Instantiate from PropertySet
    CacheAllItems
Enumerate Roots of OpenOrders
    Get OpenOrder PropertySet from OpenOrders PropertySet
    Create CxObj from OpenOrder
        Instantiate Order from PropertySet
        CacheAllItems
        Set OrderArray[ ].Order to OpenOrder
EndEnum
Create Empty MasterList keyed on Item.IntegrationId, saving
classItemImage
    Enumerate AssetIn
        Get AssetItem from AssetIn
        AddAssetItem(AssetItem)
    EndEnum
    Enumerate OrderArray
        Get OrderArray [ ].Order
        Enumerate Order
            Get OrderItem
            Get ParentId
            if OrderItem.ActionCode <> '–'
                Retrieve ItemImage from
MasterList[OrderItem.IntegrationId]
                if not in MasterList
                    if OrderItem.ActionCode = 'Add'
                        AddOrderItemAsAssetItem(OrderItem)
                    else
                        Log to ignorelog ('Update', 'Delete' with no record)
                    endif
                else
```

```
                switch
                    case OrderItem.ActionCode = 'Add'
                        if ItemImage.LastAction = 'Delete'
                            AddOrderItemAsAssetItem(OrderItem)
                        else
                            log to ignorelog ('Add' with master of
'Add', '-', 'Update'   )
                        endif
                    case OrderItem.ActionCode = 'Update'
                        if ItemImage.LastAction <> 'Delete'
                            UpdateAssetItem(ItemImage,OrderItem)
                        else
                            log to ignorelog ('Update' with master
of 'Delete')
                        endif
                    case OrderItem.ActionCode = 'Delete'
                        if ItemImage.LastAction <> 'Delete'
                            Set ItemImage.LastAction to 'Delete'
                        else
                            log to ignorelog ('Delete' with master
of 'Delete')
                        endif
                    endswitch
                endif
            endif
        EndEnum
    EndEnum
    Create Empty CxObj OutputAsset
    CreateMasterParentList( )
    BuildOutputAsset('Root') // kick off recursive build
    Create Output PropertySet from OutputAsset CxObj
    Clean Up and Exit
    // @@@@@@ --- subMethods --- @@@@@@
    submethod AddAssetItem (AssetItem)
        Retrieve OldItemImage from MasterList using
AssetItem.IntegrationId
        if OldItemImage
            Cleanup OldItemImage
        endif
        Create classItemImage ItemImage
        Set ItemImage.IntegrationId to AssetItem.IntegrationId
        Set ItemImage.LastAction to '-'
        Set ItemImage.ItemInst to AssetItem
        Set ItemImage.ParentId to AssetItem.ParentId
        Enumerate AssetItem.Attributes
            Get Attrib from AssetItem
            Set ItemImage.AttribList[Attrib.key] to Attrib
            Set ItemImage.AttribListLastAction[Attrib.key] to '-'
        EndEnum
        Set MasterList[AssetItem.IntegrationId] to ItemImage
    endsubmethod
    submethod AddOrderItemAsAssetItem (OrderItem)
        Create AssetItem
        CopyItemFields(OrderItem,AssetItem)
        AddAssetItem(AssetItem)
        Retrieve ItemImage from MasterList using
AssetItem.IntegrationId
        Enumerate OrderItem.Attributes
            Get Attrib from OrderItem
            if Attrib.ActionCode = 'Add'
                Set ItemImage.AttribList[Attrib.key] to Attrib
                Set ItemImage.AttribListLastAction[Attrib.key] to
Attrib.ActionCode
            else
                log to ignorelog (anything but 'Add')
            endif
        EndEnum
    endsubmethod
    submethod UpdateAssetItem (ItemImage,OrderItem)
        // assumes caller has checked validity of item update
        Set ItemImage.ParentId to OrderItem.ParentId // self-
healing
        Set ItemImage.LastAction to OrderItem.ActionCode
        CopyItemFields(OrderItem,ItemImage.Item)
        Enumerate OrderItem Attributes
            Get OrderItem.Attribute
            if OrderItem.Attribute.ActionCode <> '-'
                Retrieve Attrib from ItemImage.AttribList using
OrderItem.Attribute.Key
                if not in ItemImage.AttribList
                    if OrderItem.Attribute.ActionCode = 'Add'
                        Add OrderItem.Attribute to
ItemImage.AttribList[OrderItem.Attribute.Key]
                        Set
ItemImage.AttribLastAction[OrderItem.Attribute.Key] to
                            OrderItem.Attribute.ActionCode
                    else
                        Log to ignorelog ('Update', 'Delete' with no
attrib record)
                    endif
                else
                    switch
                        case OrderItem.Attribute.Actioncode = 'Add'
                            if ItemImage.AttribLastAction = 'Delete'
                                Set ItemImage.AttribList[OrderItem.Attribute.Key]
                                    to OrderItem.Attribute
                                Set
ItemImage.AttribLastAction[OrderItem.Attribute.Key] to
                                    OrderItem.Attribute.ActionCode
                            else
                                Log to ignorelog
                                    ('Add' with
ItemImage.AttribLastAction 'Add', '-', 'Update')
                            endif
                        case OrderItem.Attribute.Actioncode =
'Update'
                            if ItemImage.AttribLastAction <> 'Delete'
                                DiffAttribute(Attrib,OrderItem.Attribute)
                                if DiffAttribute
                                    CopyAttribFields(OrderItem.Attribute,Attrib)
                                    Set
ItemImage.AttribList[OrderItem.Attribute.Key] to Attrib
                                    Set
ItemImage.AttribLastAction[OrderItem.Attribute.Key] to
                                        OrderItem.Attribute.Actioncode
                                endif
                            else
                                log to ignorelog ('Update' with
                                    ItemImage.AttribLastAction
'Delete')
                            endif
                        case OrderItem.Attribute.Actioncode =
'Delete'
                            if ItemImage.AttribLastAction <> 'Delete'
                                Set
ItemImage.AttribLastAction[OrderItem.Attribute.Key] to
                                    OrderItem.Attribute.Actioncode
                            else
                                log to ignorelog('Delete' with
ItemImage.AttribLastAction 'Delete')
                            endif
                    endswitch
                endif
            endif
        EndEnum
    endsubmethod
    submethod CreateMasterParentList( )
        Enumerate MasterList
            Get ItemImage
            Set ItemTreeIsDeleted to FALSE
            Set NextParent to ItemImage.IntegrationId // start
with itself
            while NextParent <> NULL and ItemTreeIsDeleted = FALSE
                Retrieve ParentItemImage from MasterList using
NextParent
                if not ParentItemImage
                    Set ItemTreeIsDeleted to TRUE
                else
                    if ParentItemImage.LastAction = 'Delete'
                        Set ItemTreeIsDeleted to TRUE
                    endif
                    Set NextParent to ParentItemImage.ParentId
                endif
            endwhile
            if not ItemTreeIsDeleted
                if ItemImage.ParentId = NULL
                    Set ItemImage.ParentId to "Root"
                endif
```

```
        if not
MasterParentList[ItemImage.ParentId].ChildArray
            Create
        MasterParentList[ItemImage.ParentId].ChildArray
            endif
            Add ItemImage.IntegrationId to
        MasterParentList[ItemImage.ParentId].ChildArray
            endif
        EndEnum
    endsubmethod
    submethod BuildOutputAsset(ParentIntegrationId)
        Get ChildArray from MasterParentList using
ParentIntegrationId
        Enumerate ChildArray
            Get IntegrationId
            Retrieve ItemImage from MasterList using IntegrationId
            Get Item from ItemImage
            Add Item to Output Asset
            Enumerate ItemImage.AttribList
                Get Attribute from ItemImage.AttribList[ ]
                if ItemImage.AttribListLastActiontAttribute.Id) <>
'Delete'
                    Add Attribute to Item
                endif
            EndEnum
            BuildOutputAsset(IntegrationId)
        EndEnum
    endsubmethod
end Apply method PseudoCode
``` b. DeltaMethod

Figure 11F:
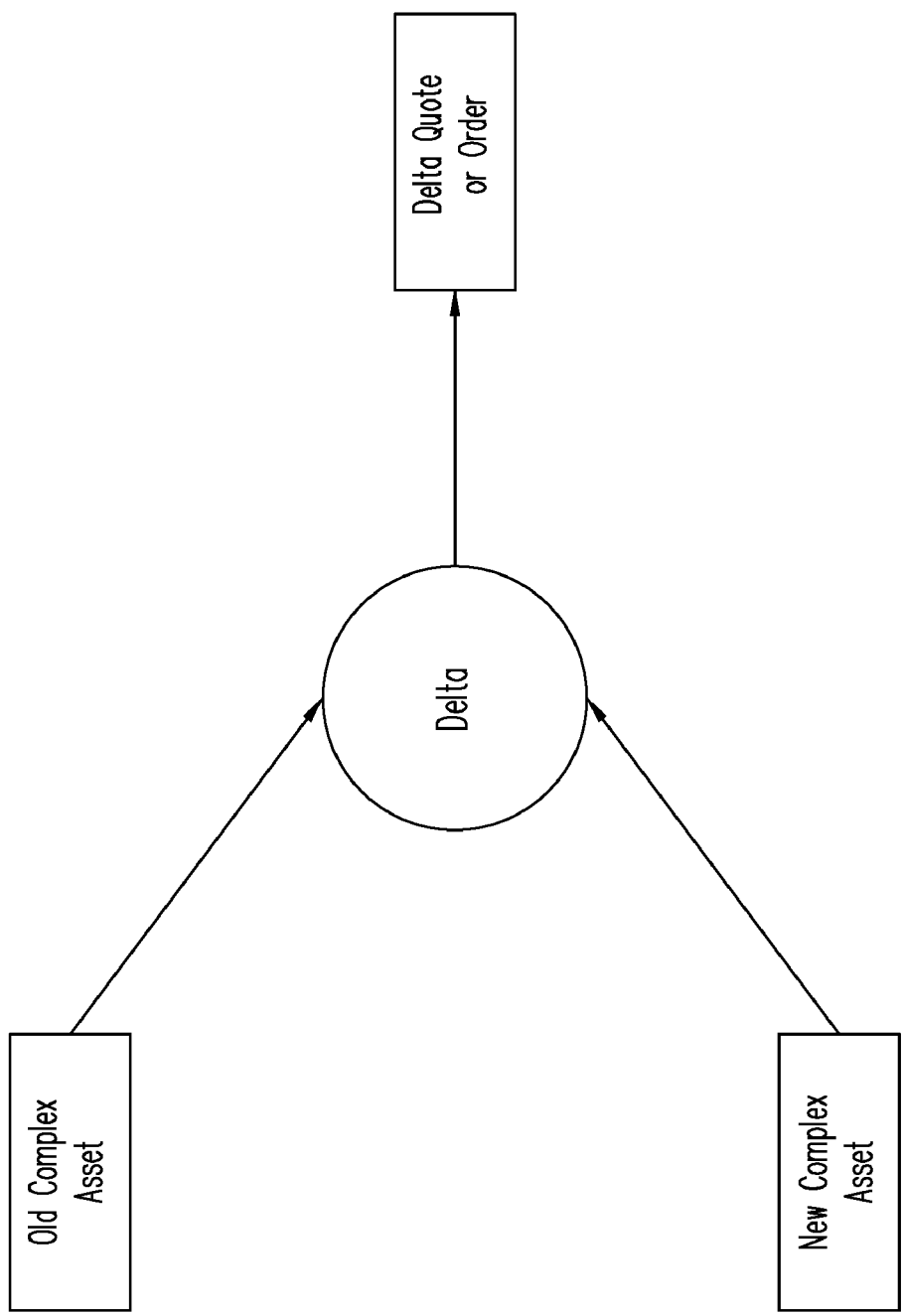
FIG. 11F shows a block diagram of input and output for a Delta Method that can be utilized in the complex order processing system of FIG. 7B.

The Delta Method generates a complex object that represents the difference, or "delta", between two or more complex objects, as represented for example by the flow diagram shown in FIG. 11F. In some embodiments, the complex objects are each contained in a property set. The Delta Method outputs one "delta" complex object as a property set that includes a superset of all existing items and attributes from the input complex objects, and the "delta" items. The items can be marked with an action code that indicates their disposition.

A set of rules can be used to determine which products and corresponding attributes to include in the complex object output by the Delta Method. Changes in the hierarchy of the complex object are addressed by assuming the parent structures of the newer of the complex objects. When a change in the hierarchy occurs, the action code of the child item is set to the internationalized equivalent of 'Update' when no other action is indicated.

In addition, a set of business service user properties allow user-defined differences as well. The user properties further allow the user to indicate which item fields and attributes to compare. The Delta Method then only compares the indicated item fields and attributes.

For example, in one embodiment, there are four different action codes that can be set, as indicated by the following Cases I-IV:

Case I: "Product not changed"

In this case the same items and corresponding attributes are found in both complex objects, therefore no "user defined" differences were found when comparing two complex objects or their attribute(s). The outcome of this case is that primary complex object's product, and corresponding attribute(s), will be added to the new complex object with an action code of "–".

Case II: "New product added"

In this case a new product is contained in the non-primary complex object and not contained in the primary complex object. When this occurs, the non-primary complex object's item, and corresponding attribute(s), will be added to the new complex object, as in Case I, but the item and attribute action code fields are all set to "Add".

Case III: "Product removed"

In this case a product is contained in the primary complex object, but not in the non-primary complex object. When this occurs, the primary complex object's product, and corresponding attribute(s), are added to the new complex object, as in Case I, but the item and attribute action code fields are all set to "Delete".

Case IV: "Product/Attribute has been changed"

In this case a difference has been detected in either the item or its attribute(s). This difference can be either that the product/attribute data has changed or attribute(s) themselves have been added or dropped. When this occurs, the non-primary complex object's item and corresponding attribute(s) are added to the new complex object. The action code field of the copied item will be set to "Update". The attribute(s) action code field is set as follows:

Case A: "Attribute data has changed"
Action field is set to "Update".
Case B: "Attribute has been added"
Action field is set to "Add".
Case C: "Attribute has been deleted"
Action field is set to "Delete".
Case D: "Attribute's data has not change"
Action field is set to "–"

In some embodiments, the Delta Method generates the set of actions required to change an initial complex asset into a final complex asset. The set of actions can be written to either a quote or a sales order. The Delta Method identifies each of the action codes allowed in a quote or sales order, such as "Add", "Update" and "Delete" action codes, for example. The Delta Method passes all fields in the new complex asset through to the delta quote or delta order.

Note that the Apply and Delta Methods function equally well if only those branches of the customizable product that have changed are included in the delta. The former approach was selected because it results in a simpler algorithm and provides a clearer picture to the user of the state of the customizable product at the time the delta was created.

FIGS. 11G-1 through 11I-2 show examples customizable products created by the Delta Process.

Figures 1, 11G:
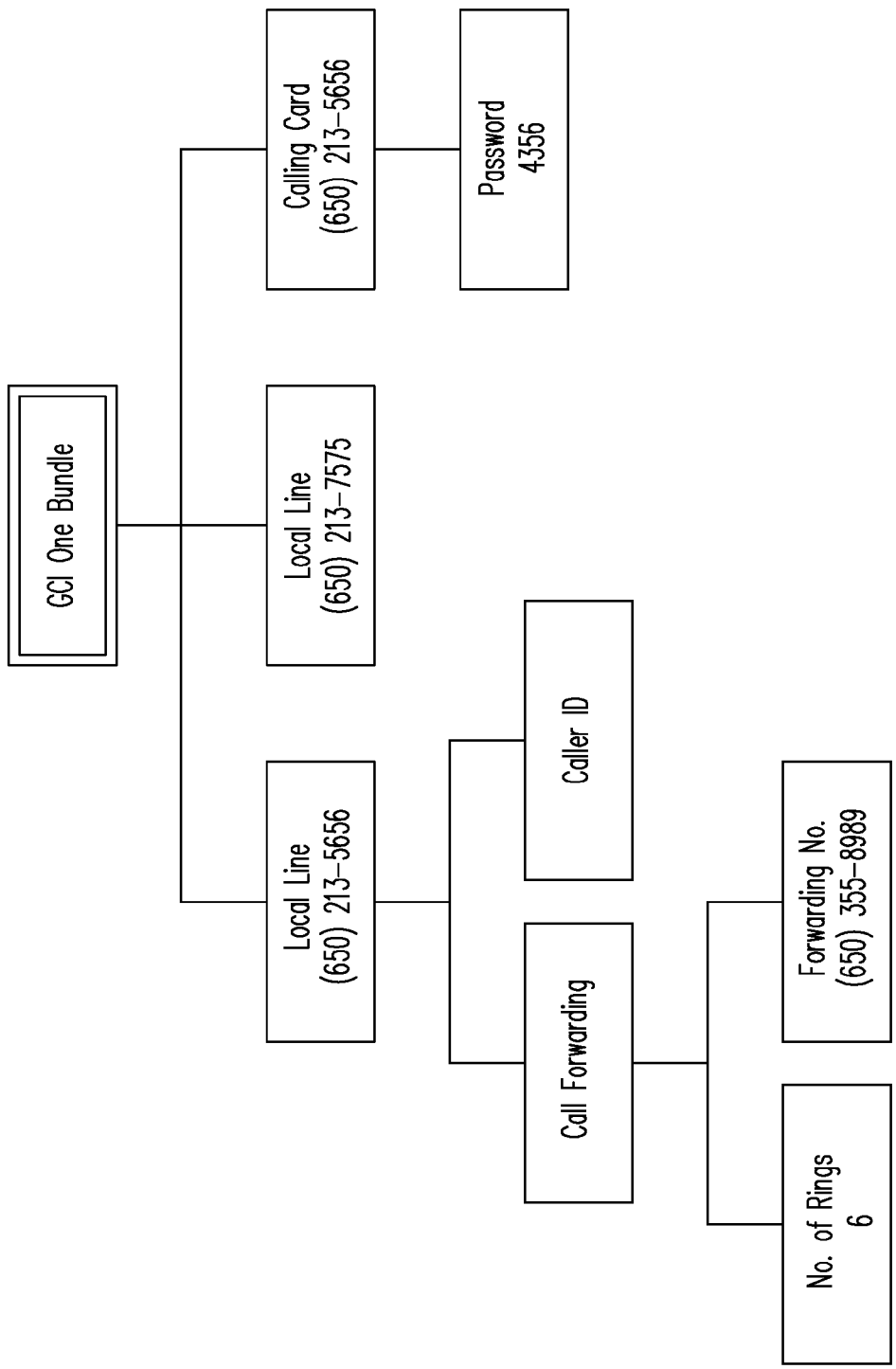
Figures 2, 11G:
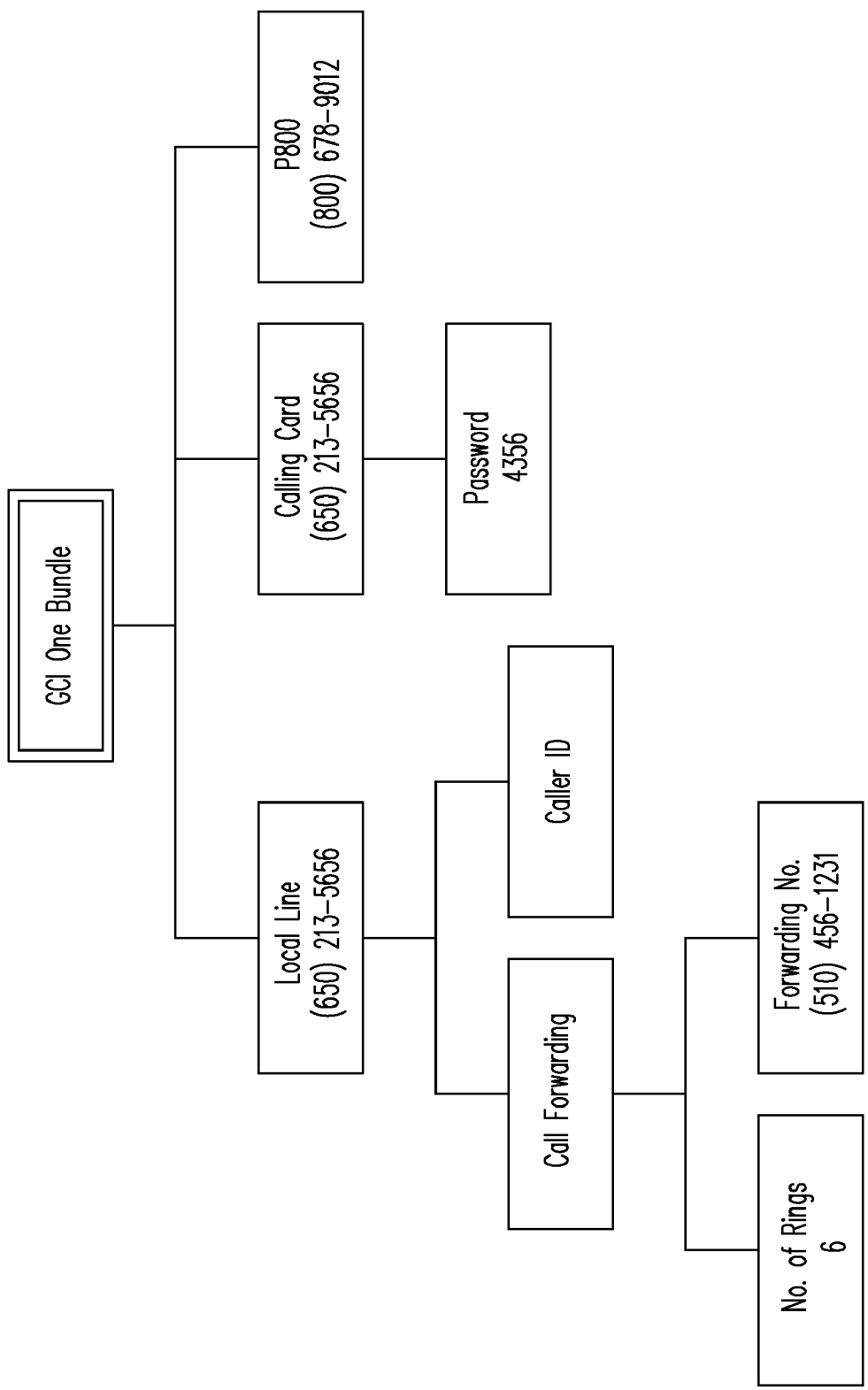
Figures 3, 11G:
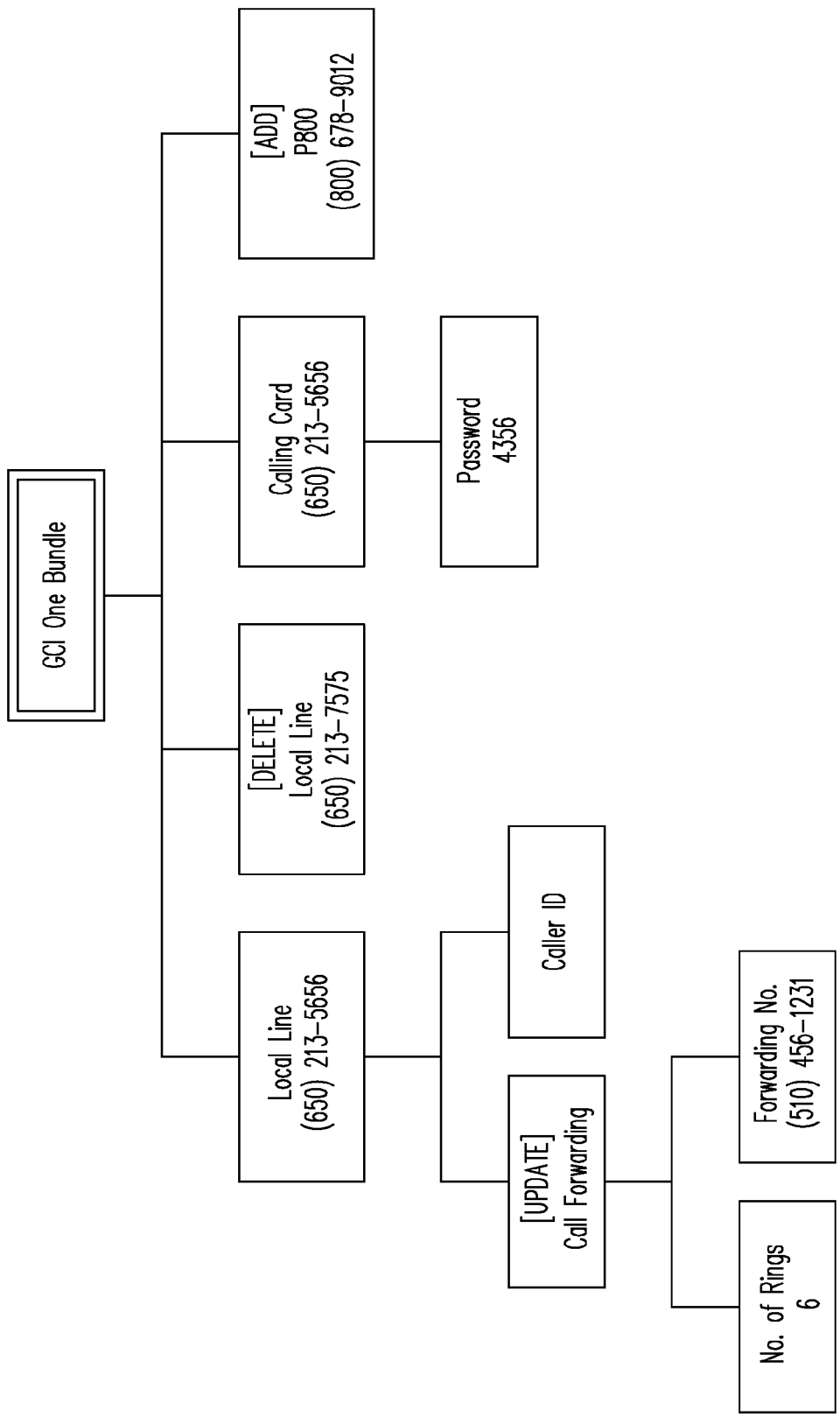

FIGS. 11G-1 through 11G-3 show an example of the results of the functions performed by the Delta Method that starts the GCI One Bundle in the state shown in FIG. 11G-1. A sales representative updates the complex asset as represented in FIG. 11G-2, and the Delta Method generates the delta quote shown in FIG. 11G-3.

Figures 1, 11H:
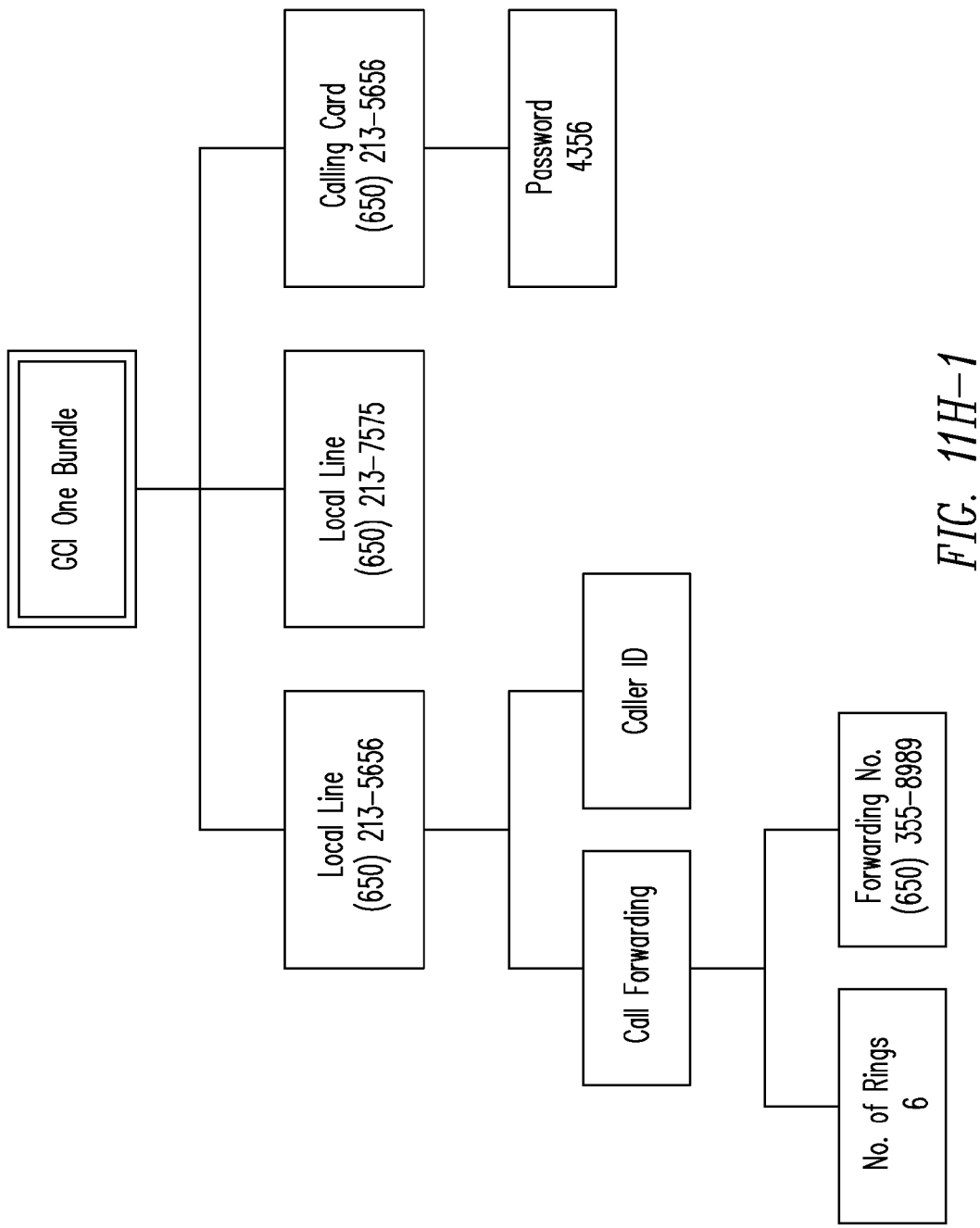
Figures 2, 11H:
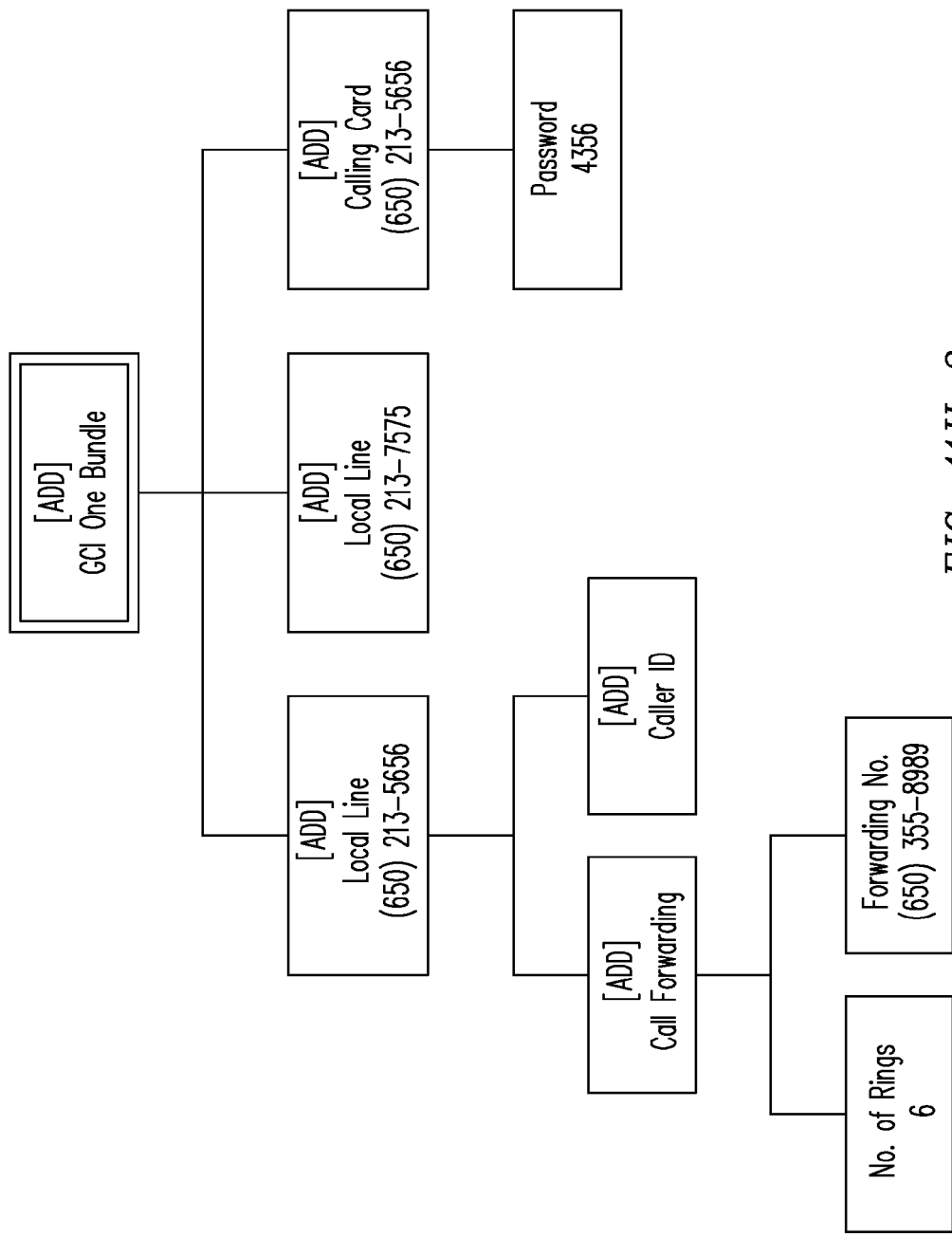

FIGS. 11H-1 through 11H-2 show an example of the results of the functions performed by the Delta Method that starts the without an existing asset, and the sales representative configures a new customizable product as represented in FIG. 11H-1. The Delta Method generates the delta quote shown in FIG. 11H-2.

Figures 1, 11I:
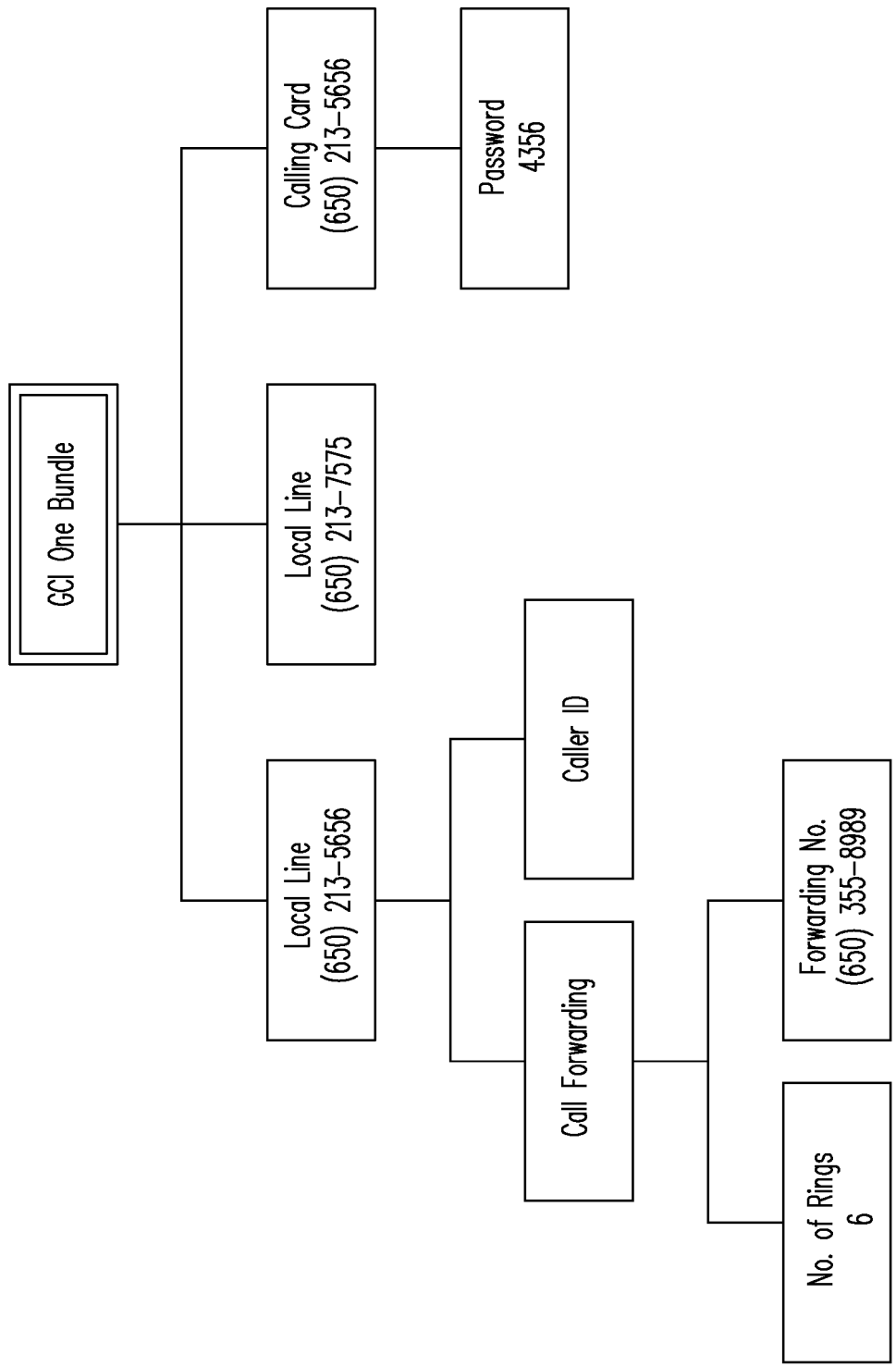
Figures 2, 11I:
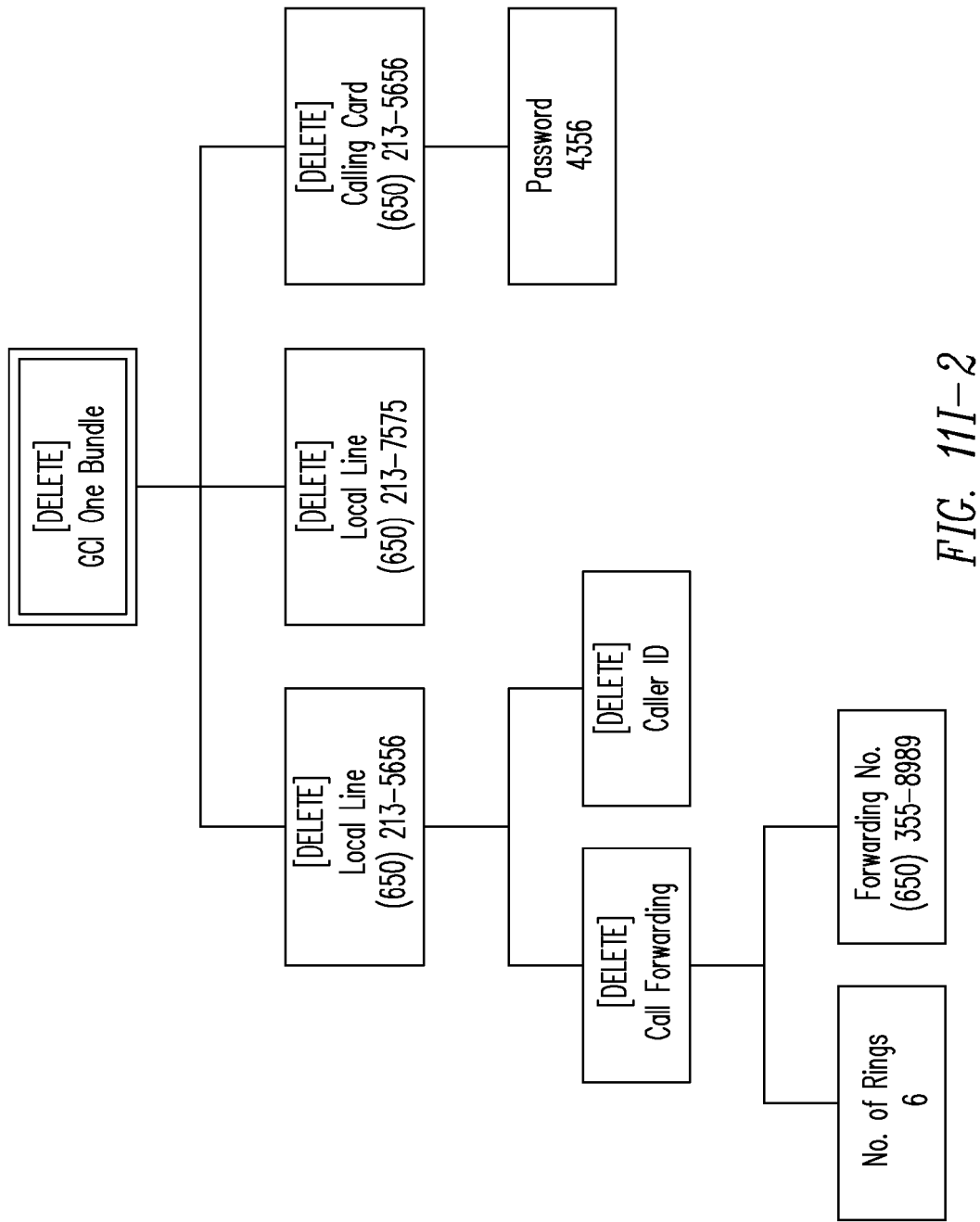

FIGS. 11I-1 through 11I-2 show an example of the results of the functions performed by the Delta Method that starts with an existing asset selected by a sales representative from a Products and Services View, such as shown in FIG. 9C. The sales representative selects the Disconnect Option in the view and the Delta Method operates with the current state of the complex asset and an empty complex asset as input arguments, resulting in the delta quote represented in FIG. 11I-2, which shows that the items will be deleted during the next update.

Figures 1, 11J:
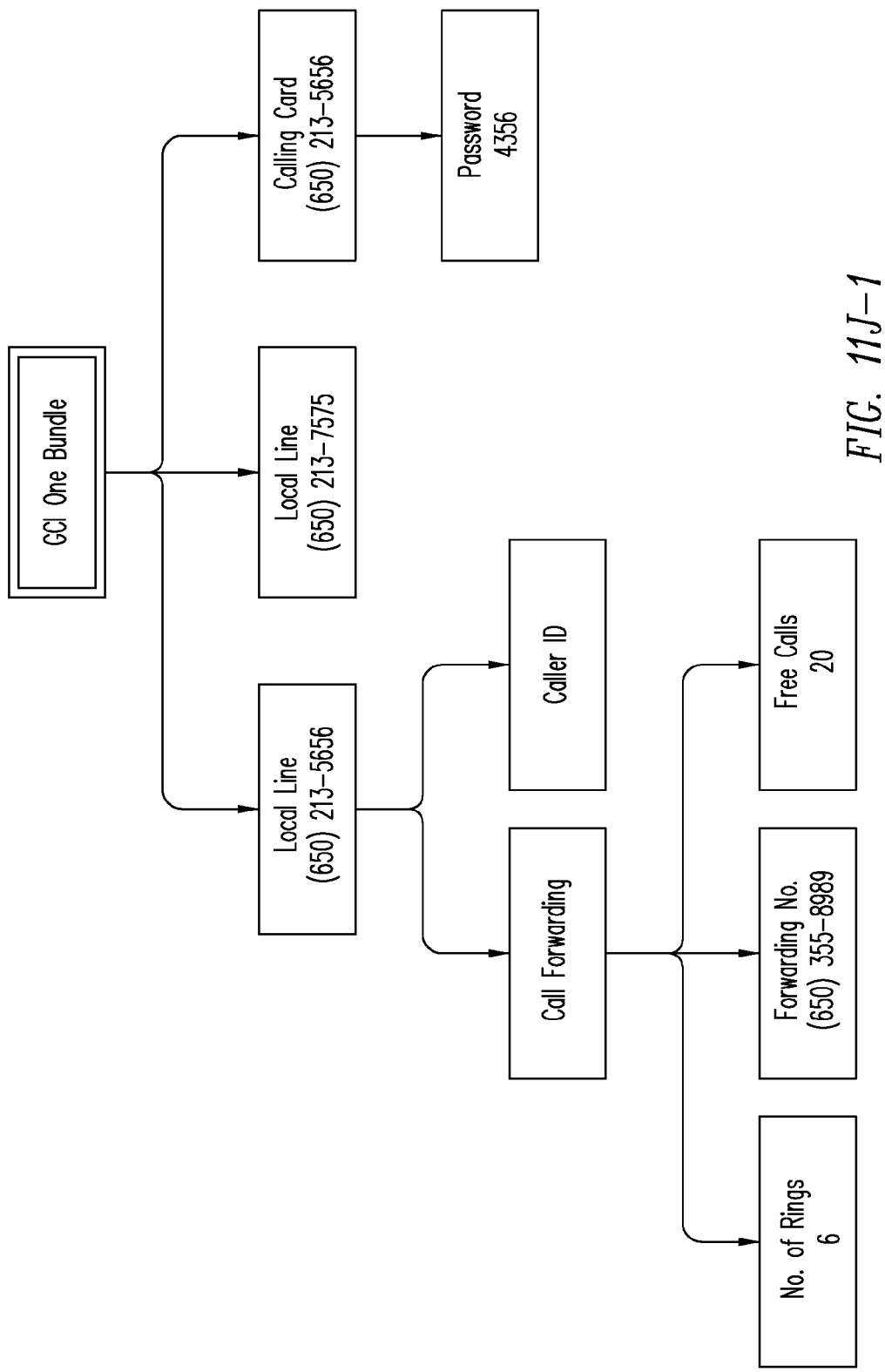
Figures 2, 11J:
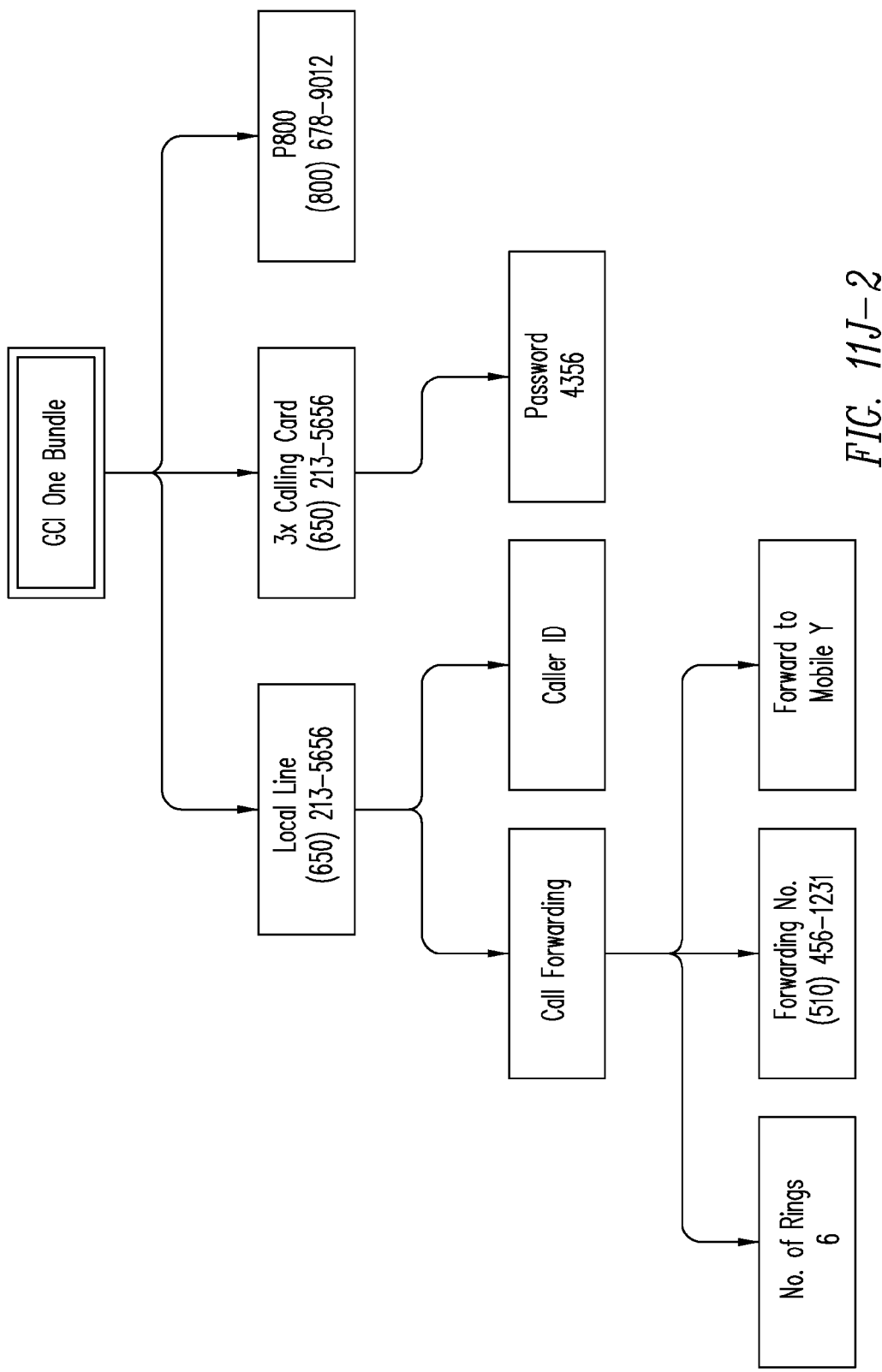
Figures 3, 11J:
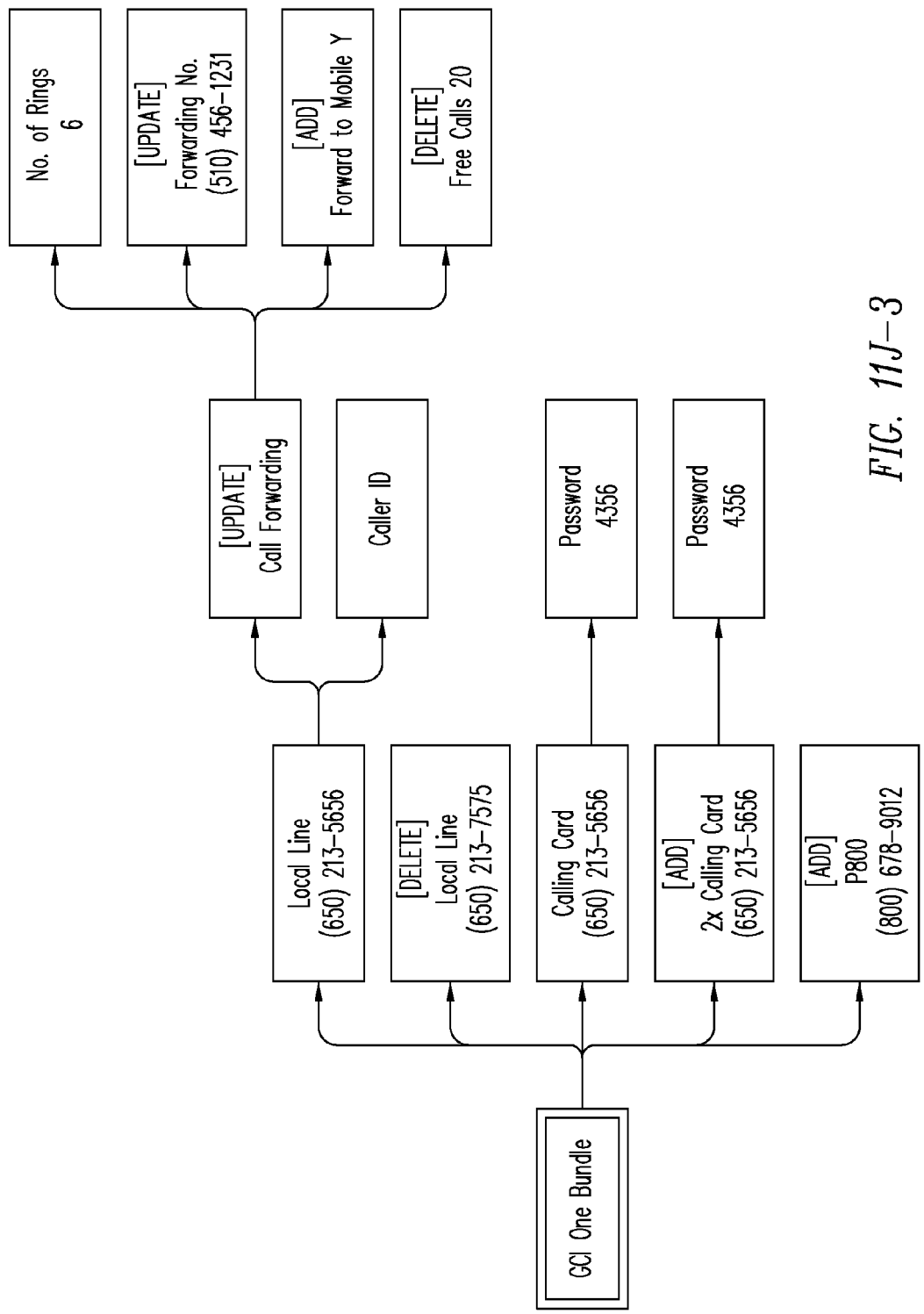

FIGS. 11J-1 through 11J-3 show an example of generating a delta property set to add additional copies of an asset. The user selects a customizable asset, such as shown in FIG. 11J-1. The user makes various changes including changing the quantity of Calling Cards from one to three, as shown in FIG. 11J-2. The Delta Method generates the Delta property set shown in FIG. 11J-3. The calling card record is split into the original, unchanged asset and an action to add the new copies of the original calling card.

Figures 1, 11K:
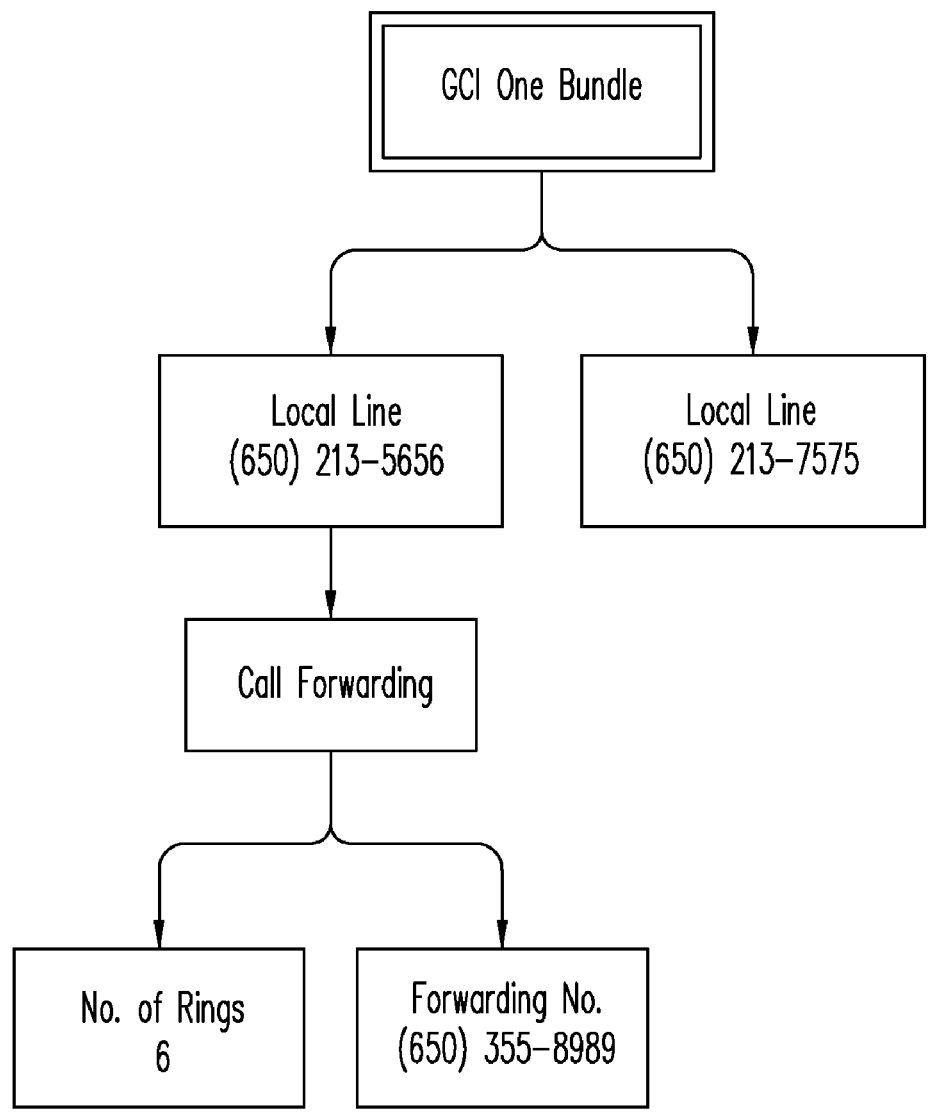
Figures 2, 11K:
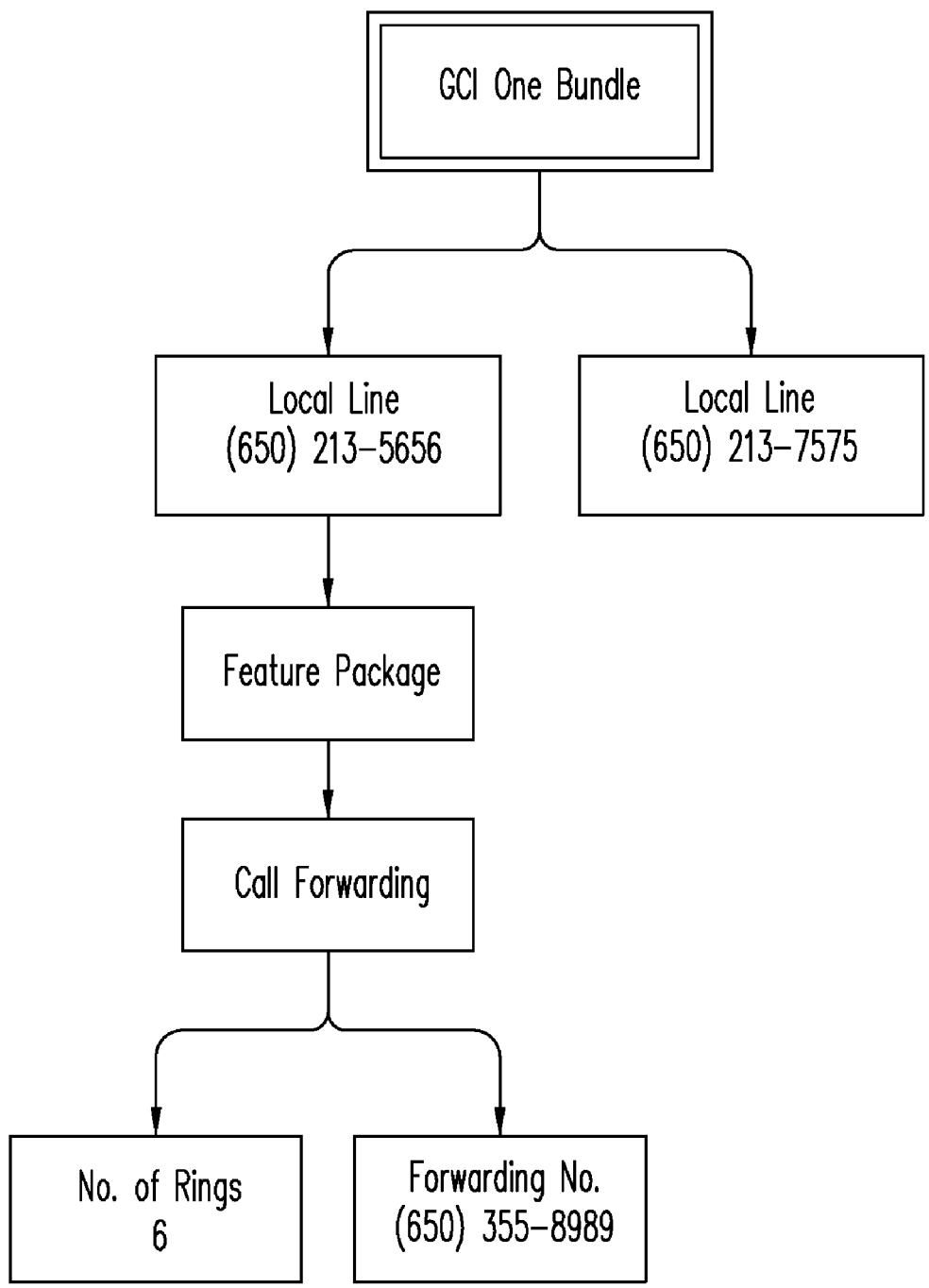
Figures 3, 11K:
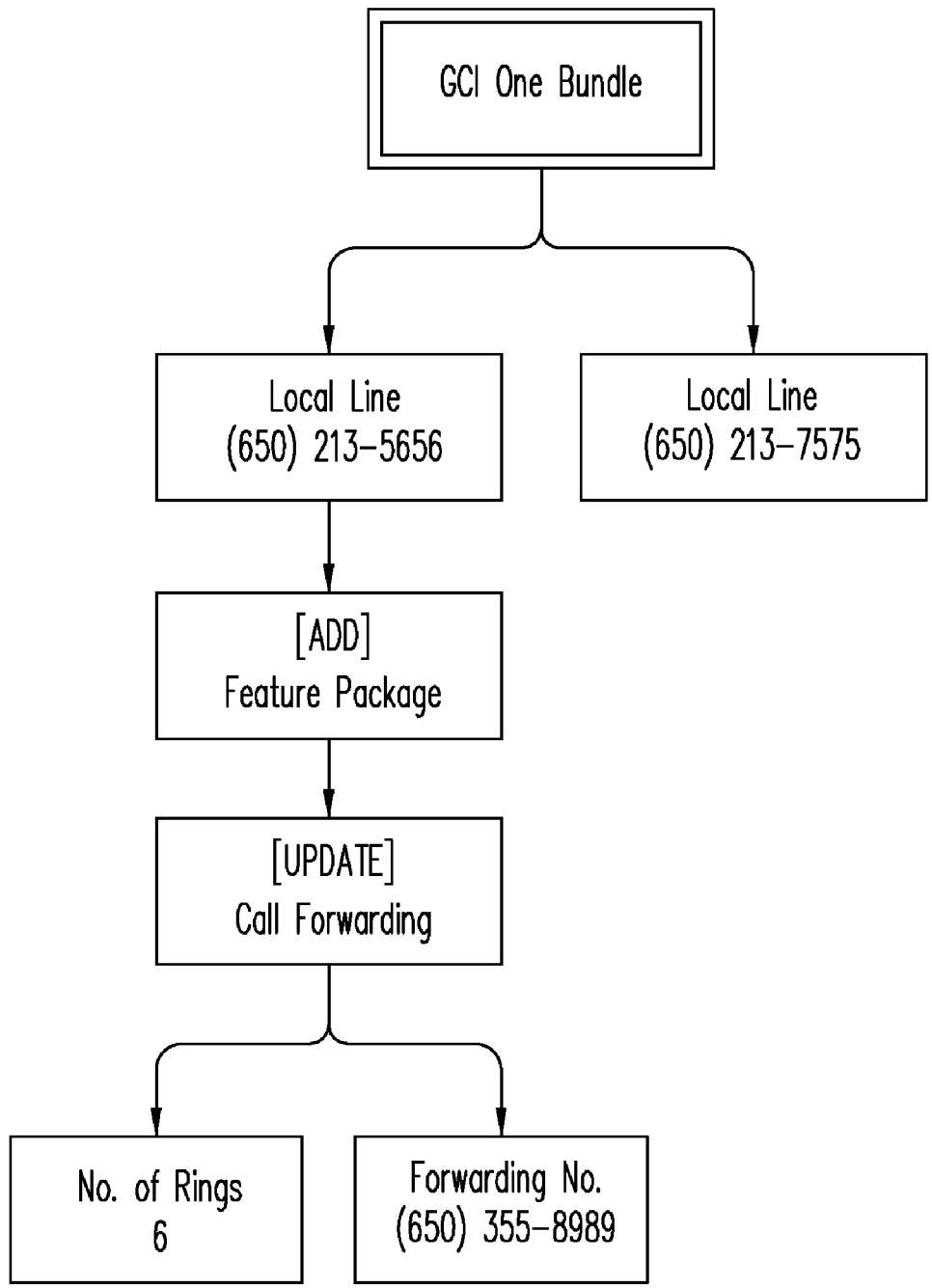

FIGS. 11K-1 through 11K-3 show an example of generating a delta property set to reflect a change in a product's structure. The user selects a customizable product, such as shown in FIG. 11K-1. Since the asset shown in FIG. 11K-1 was created, the customizable product structure has changed to group all features beneath a Feature Package component. When the product is loaded into the Product Configurator, it is relinked as shown in FIG. 11K-2. When the new structure is saved, the Delta Method identifies the new Feature Package component and marks the Call Forwarding feature for update because its parent has changed.

The following pseudo-code shows examples of the functions performed in an embodiment of the Delta Method:

```
Create CxObj from OldAsset
    Instantiate From PropertySet
    Cache All Items (to enable lookup by IntegrationId)
    Hierarchy OldAssetFlatList (Key=IntegrationId, Stored
fields
        (parent_id))
Create CxObj from NewAsset
    Instantiate From PropertySet
    Cache All Items (to enable lookup by IntegrationId)
    Hierarchy NewAssetFlatList (Key=IntegrationId, Stored
fields
        (parent_id))
Create CxObj OutputQuote (with Header Only)
if NewAsset CxObj is Empty
    Enumerate OldAsset
        Set OldAsset.Item.ActionCode to Delete
        Add OldAsset.Item to OutputQuote
            Enumerate OldAsset.Item Attributes
                Set Attribute.ActionCode to Delete
                Add Attribute to OutputQuote.Item
    EndEnum
    Cleanup and Exit
endif
Create AddItemList
    Enumerate NewAssetFlatlist
        Get NewAssetFlatList.Record
        Retrieve OldAssetFlatList.Record using
            NewAssetFlatList.Record.Key
        if OldAssetFlatList.Record
            do nothing
        else
            Add NewAssetFlatList.Record.Key to AddItemList
        endif
    EndEnum
Create DeleteItemParentList
    Enumerate OldAssetFlatlist
        Get OldAssetFlatList.Record
        Retrieve NewAssetFlatList.Record using
            OldAssetFlatList.Record.Key
        if NewAssetFlatList.Record
            do nothing
        else
            if not
DeleteItemParentList[OldAssetFlatList.Record.ParentId].ChildArray
                Create
DeleteItemParentList[OldAssetFlatList.Record.ParentId].ChildArray
            endif
            Add OldAssetFlatList.Record.Key to
DeleteItemParentList[OldAssetFlatList.Record.ParentId].ChildArray
        endif
    EndEnum
Enumerate NewAsset CxObj
    Get NewAsset.Item
    if NewAsset.Item in AddItemList
        Set NewAsset.Item.ActionCode to Add
        qty = NewAsset.Item.qty
        qtytoadd=1
        while (qtytoadd)
            Add Item to OutputQuote using qtytoadd as Qty
            Enumerate NewAsset.Item.Attributes
                Set NewAsset.Item.Attribute.ActionCode to Add
                Add NewAsset.Item.Attribute to OutputQuote.Item
            EndEnum
            qtytoadd = qty - 1
            qty = 1
        endwhile
    else
        Retrieve OldAsset.Item matching
            NewAsset.Item.IntegrationId
        Create NewItem without Attributes using OldAsset.Item
        DiffItem (OldAsset.Item, NewItem)
        if DiffItem
            Set NewItem.ActionCode to Update
            CopyItemFields (NewAsset.Item, NewItem)
        else
            if OldAssetFlatList[NewItem.IntegrationId].ParentId
                NewAssetFlatList[NewItem.IntegrationId].ParentId
                Set NewItem.ActionCode to Update
            else
                Set NewItem.ActionCode to '-'
            endif
        endif
        Enumerate NewAsset.Item Attributes
            Get NewAsset.Item.Attribute
            Save NewAsset.Item.Attribute.Id in
                DeleteAttribCompareList
            Create NewAttribute using NewAsset.Item.Attribute
            Retrieve OldAsset.Item.Attribute using Save
                NewAsset.Item.Attribute.Id
            if in OldAsset.Item
        DiffAttribute (OldAsset.Item.Attribute,NewAsset.Item.Attribute)
                if DiffAttribute
                    Set NewAttribute.ActionCode to Update
                    If NewAsset.Item.ActionCode is '-'
                        Set NewAsset.Item.ActionCode to Update
                    endif
                else
                    Set NewAttribute.ActionCode to '-'
                endif
            else
                Set NewAttribute.ActionCode to Add
                if NewAsset.Item.ActionCode is '-'
                    Set NewAsset.Item.ActionCode to Update
                endif
            endif
            Add NewAttribute to TempNewAttribList
        EndEnum
        Enumerate OldItem.Item.Attributes
            Get OldAsset.Item.Attribute
            Match OldAsset.Item.Attribute in
                DeleteAttribCompareList
            if not in DeleteAttribCompareList
                Create NewAttribute using
        OldAsset.Item.Attribute
                Set NewAttribute.ActionCode to Delete
                if NewAsset.Item.ActionCode is '-'
                    Set NewAsset.Item.ActionCode to Update
                endif
                Add NewAttribute to TempNewAttribList
            endif
        EndEnum
        qty = NewAsset.Item.qty
        qtytoadd=1
        while (qtytoadd)
            Add NewItem to OutputQuote using qtytoadd as Qty
            Enumerate TempNewAttribList
                Get Attribute
                Add Attribute to OutputQuote.Item
            EndEnum
            qtytoadd = qty - 1
            qty = 1
        endwhile
        if NewAsset.Item.Id in DeleteItemParentList
```

-continued

```
    Enumerate DeleteItemParentList[ParentId].ChildArray
        Get IntegrationId
            (DeleteItemParentList[ParentId].ChildArray[ ])
        Retrieve OldAsset.Item using IntegrationId
        Set OldAsset.ActionCode to Delete
        Add OldAsset.Item to OutputQuote
        Enumerate OldAsset.Item Attributes
            Set Attribute.ActionCode to Delete
            Add Attribute to OutputQuote.Item
        EndEnum
    EndEnum
  endif
EndEnum
Create Output PropertySet from OutputQuote CxObj
Clean Up and Exit
End Delta Method PseudoCode
``` c. Trim Method

Figures 1, 11L, 11M:
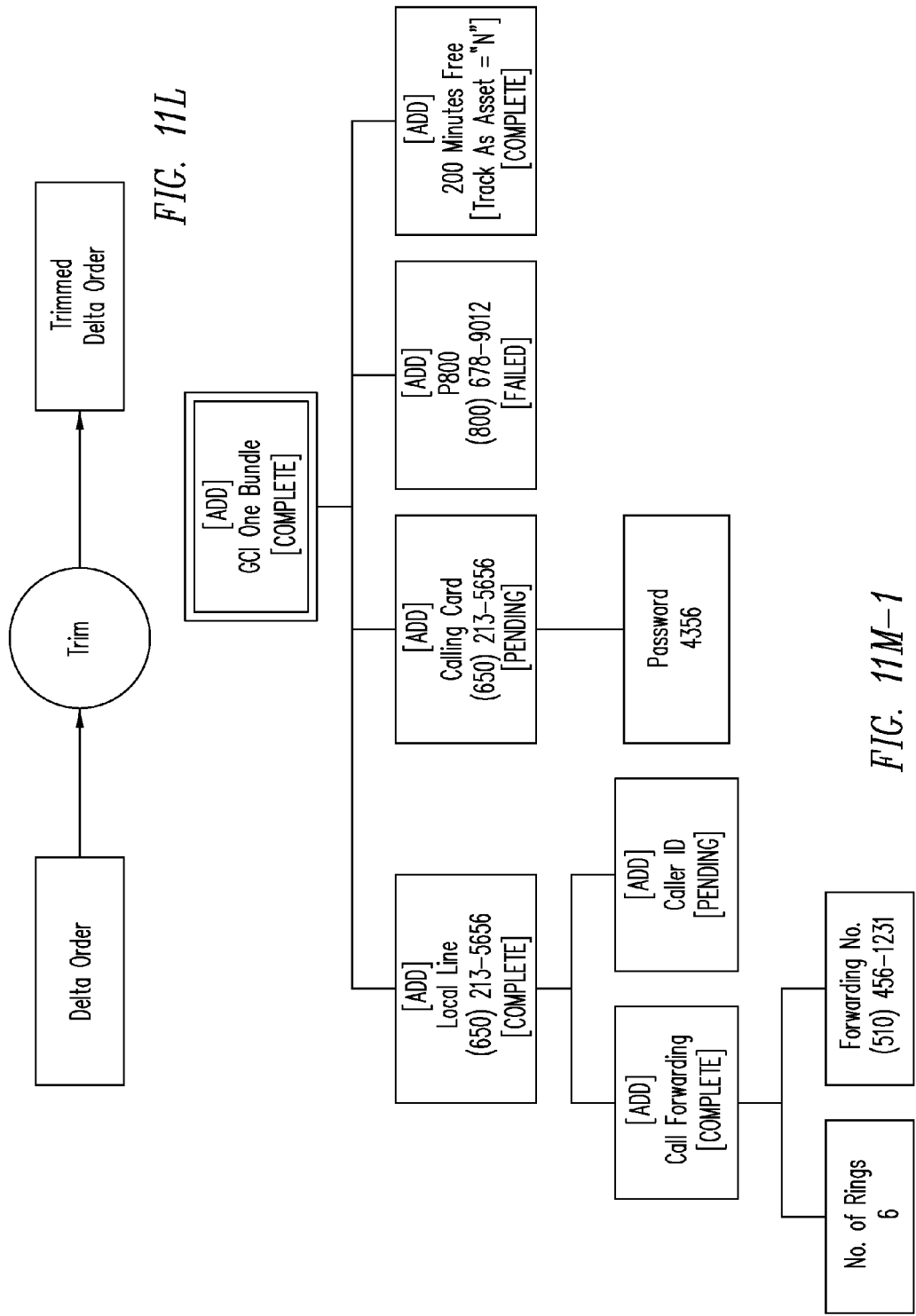
Figures 2, 11M:
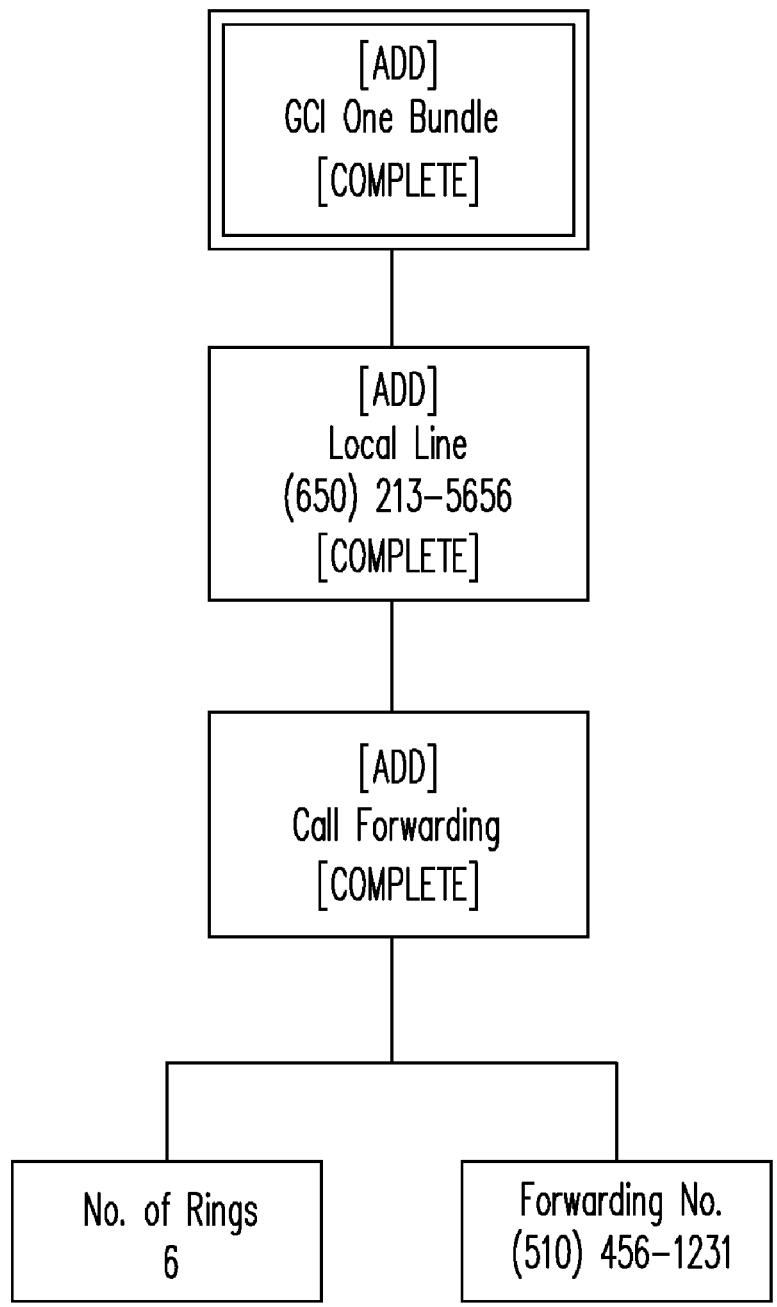
Figures 1, 2, 110:
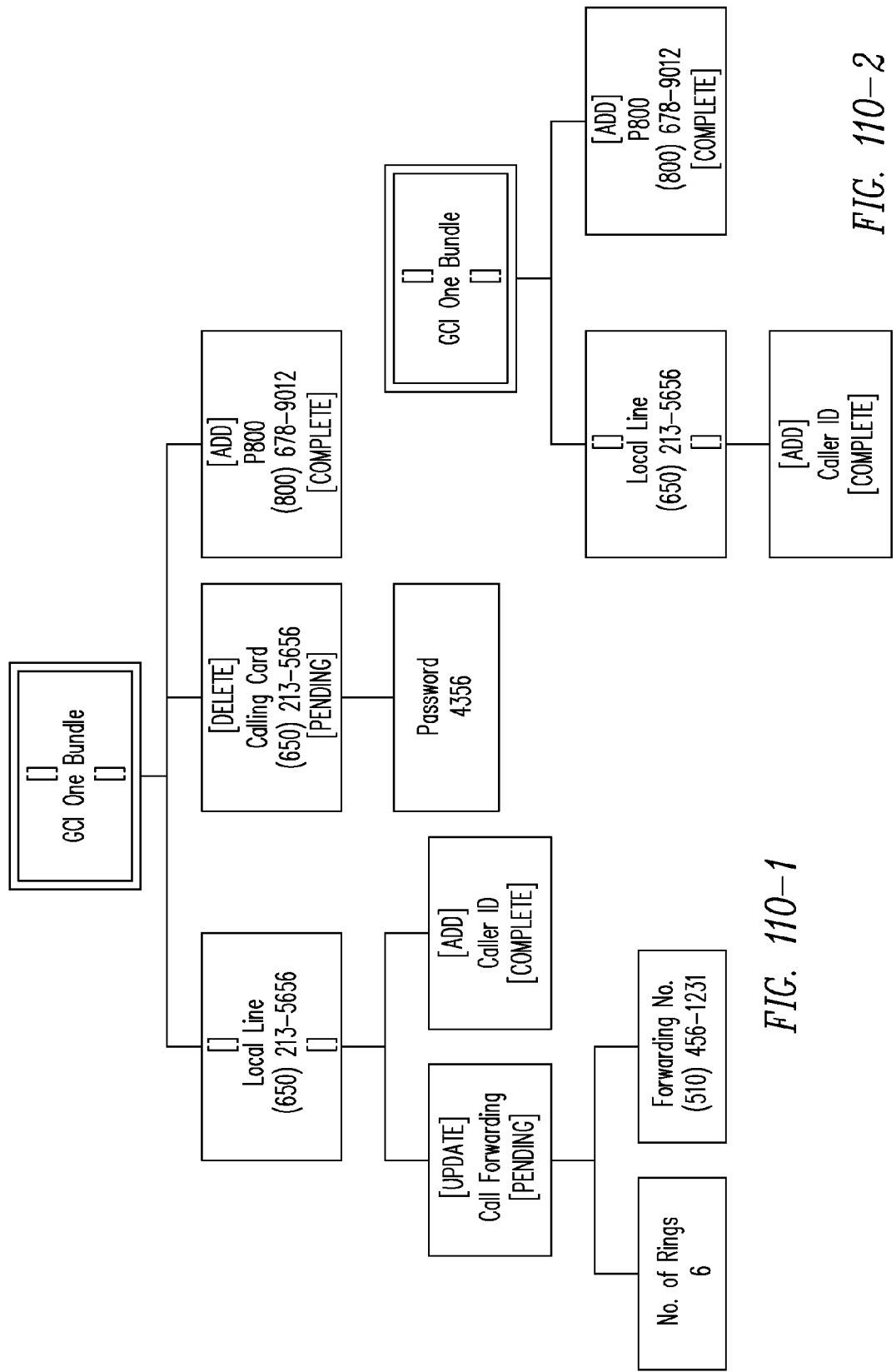

The Trim Method eliminates all items from a complex object that meet user-defined "trim" criteria to create a new complex object. The Trim Method receives a complex object and a "trim" specification string as a delta order as represented in FIG. 11L. The Trim Method evaluates each individual item to determine whether the item should be trimmed from the complex object and returns a trimmed version of the complex object.

In some embodiments, the Trim Method begins with the top-most item in the complex object tree, and proceeds recursively down through the root items. The property set input to create the complex object can be represented as an entire quote/order/service profile. A sub-process method can be included to evaluate each root item against the trim specification. If any item satisfies the "trim" specification, then that item and all of its children are removed from the output complex object. For example, the user can "trim" items when moving an item from order to asset that meet the following criteria:

NOT ((([Status]='Complete') OR ([Action Code]='–')) AND ([Track As Asset]='Y'))

In one embodiment, the Trim Method uses the following arguments:
  Name: Trim Specification
  Data Type String
  Type: Input
  Storage Type Property
  Display Name Trim Specification These arguments allows users to create and assign different trim specifications for each complex object. Additionally, a default trim specification can be provided with the workflows such as the following default trim specification:

NOT ((([Status]='Complete') OR ([Action Code]='–')) AND ([Track As Asset]='Y'))

The syntax for the trim specification can support arithmetic functions such as +, –, *, /, =, and ^. Logical operators can also be supported including AND, OR, NOT, IS NULL, IS NOT NULL. Following is a complete list of key words and symbols supported in one embodiment of the Trim Method:
  Any string in "" or ''. Any string enclosed in a single/double-quote can be treated as constant string.
  Numeric constant
  Integers and real numbers are all accepted.
  + Numeric Plus or string concatenation
  – Numeric subtraction
  * Numeric multiplication
  / Numeric division
  = Logical comparison for string/numeric values
  ^ Numeric Power i.e. 2^3=8
  TRUE Constant Boolean representation for TRUE
  FALSE Constant Boolean representation for FALSE
  NOT Logical negation i.e. NOT (TRUE) is FALSE
  AND Logical AND
  OR Logical OR
  IS NULL Check whether a field value is null
  IS NOT NULL Opposite of IS NULL. NOTE: An empty string "" is not null.
  >, >=, <, <= Numeric comparisons
  [ ] Anything enclosed in square bracket are considered fields of the complex object line item
  ( ) Logical grouping of operators; can be nested.

Any character or sequence of characters that is not recognized is treated as a constant string.

FIGS. 11M-1 through 11O-2 show examples of customizable products operated on and generated by the Trim Method.

FIGS. 11M-1 through 11M-2 show an example of the results of the functions performed by the Trim Method that starts with an existing asset as shown in FIG. 11M-1. The Trim Method eliminates all "Pending" and "Failed" items. It also eliminates the '200 Minutes Free' product because the Track As Asset parameter is set to 'N'. The resulting complex asset is represented in FIG. 11M-2.

FIGS. 11N-1 through 11N-2 show an example of the results of the functions performed by the Trim Method that starts with a new installation where a parent item is "Pending", and a child item is "Complete" as shown in FIG. 11N-1. The Trim Method eliminates all "Pending" and "Failed" items and their children, whether "Complete" or not. The resulting complex asset is represented in FIG. 11N-2.

FIGS. 11O-1 through 11O-2 show an example of the results of the functions performed by the Trim Method that starts with a partially completed update as represented in FIG. 11O-1. The Trim Method eliminates all "Pending" and "Failed" items and their children, whether "Complete" or not, and retaining any item with NULL action. The resulting complex asset is represented in FIG. 11O-2.

d. Logical Delete Method

Figures 1, 11P, 11Q:
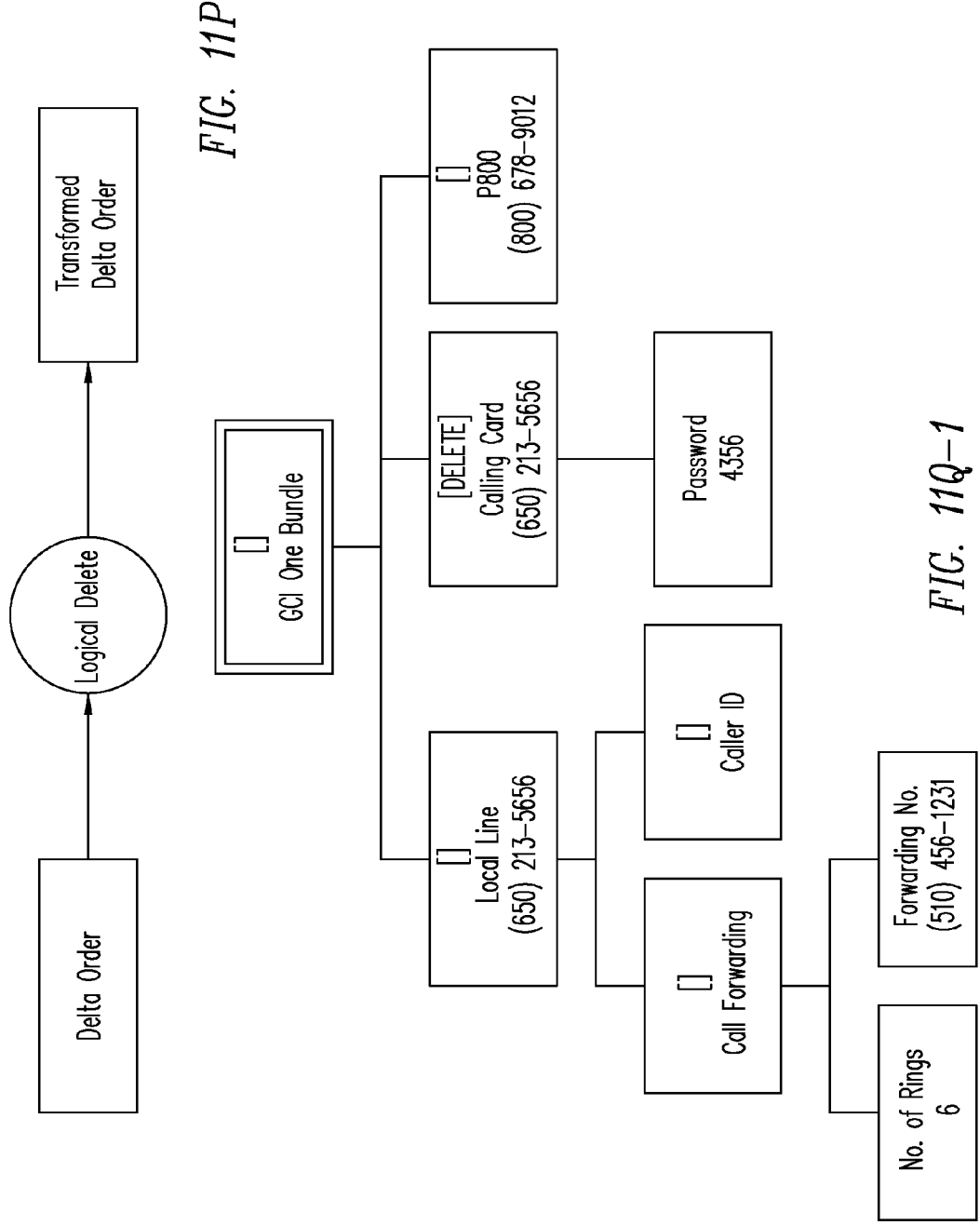
Figures 2, 11Q:
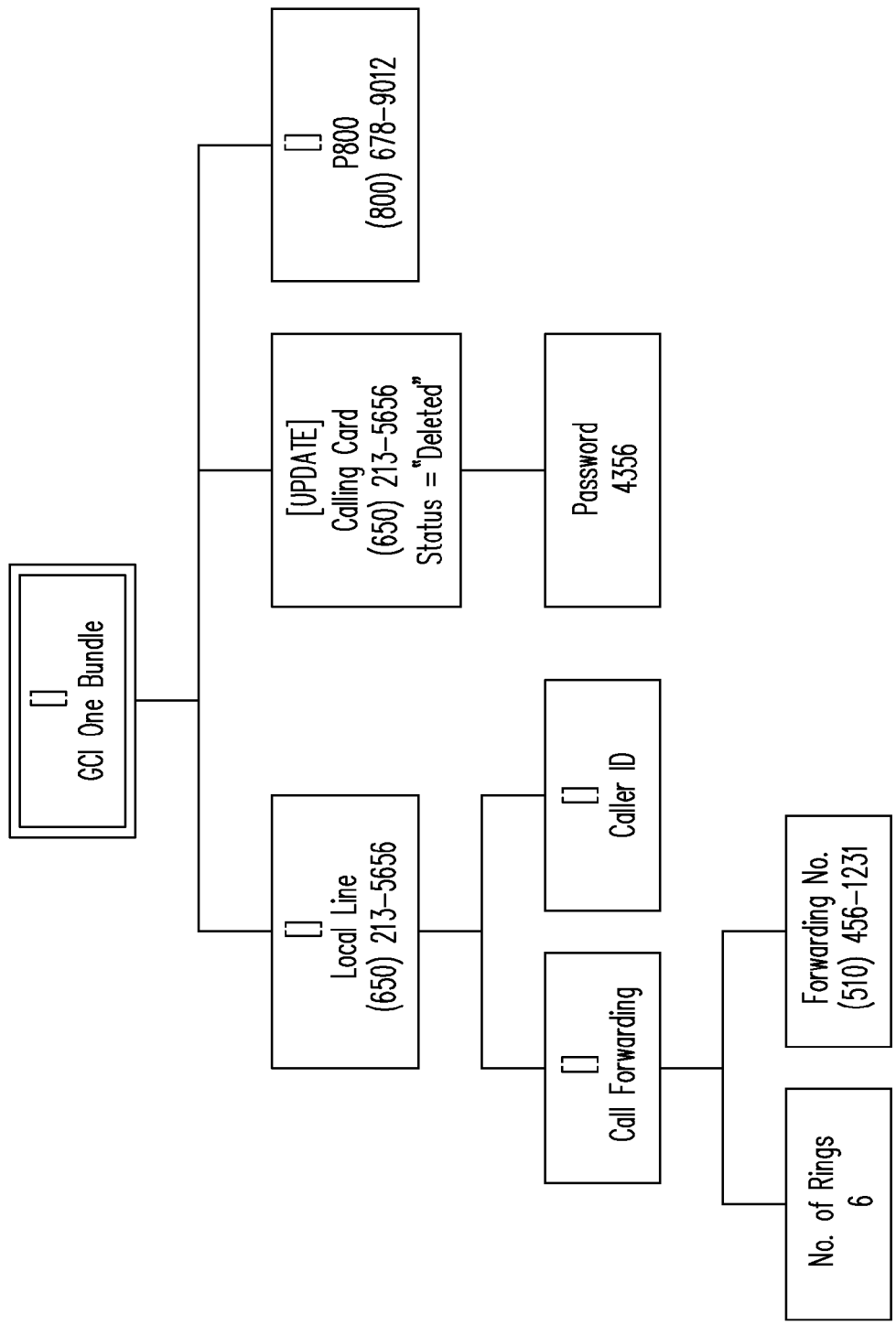

FIG. 11P shows a flow diagram of an embodiment of a Logical Delete Method that receives a complex object instance and performs a "logical" delete to generate a transformed delta order by transforming any item with action code "Delete" to "Update" and changes the status to be "Inactive". The Logical Delete Method allows a history of assets and/or services for an account to be maintained. The inputs and outputs are property sets.

In some embodiments, once the Logical Delete Method determines that a line item is marked "Inactive", the Logical Delete Method will not inspect the children of the logically deleted line item, regardless of their action codes. The Logical Delete Method can be implemented in one or more methods and sub-methods.

FIGS. 11Q-1 through 11Q-2 show an example of the results of the functions performed by the Logical Delete Method that starts with a disconnect order for a calling card as shown in FIG. 11Q-1. The Logical Delete Method converts the delete to an update. The resulting complex asset is represented in FIG. 11Q-2.

e. Explode Method

In some embodiments, the Explode Method receives a delta quote property set and copies complex items with quantity greater than one (1) to output a delta quote property set with a corresponding number of copies of the item with quantity equal to one (1). Items with a convert to asset flag set to "N" are ignored.

The Explode Method can be used in workflows such as:
1) Quote to Order (AutoOrder)
2) Edit Order Line Item
3) Ungroup One manner of invoking the Explode Method is by selecting the Ungroup Option on a user interface view such as shown in FIG. 9D-2. The Explode Method transforms a root level quote line item and all its children having quantities greater than one (1) into multiple copies of the line item with quantity equal to one (1). If the quantity of a sub-component of an item is greater than one, then multiple child records are created with the same parent. When the user selects the Ungroup Option, the entire hierarchy of the selected item is exploded and displayed on the screen. In one embodiment, the quantity can only be changed if the action code on the line item is 'Add', therefore, the Explode Method will explode a multi-unit item at any level of the hierarchy only if that particular item carries an action code of 'Add'.

The Explode Method supports both Quote and Order business objects. The Explode Method uses two input arguments: an object to be exploded, and a root item id indicating which root item of the complex object is to be exploded. The second argument is optional. If not provided, the Explode Method will traverse the entire hierarchy of each root level item of the quote complex object and explode each component on each level as long as the criteria in the item specification are satisfied. In some embodiments, all child items and attributes can be copied. In other embodiments, one or more of the following exceptions can apply:

a) One or more field identifiers for the item is included in a configurable list of unique identifiers that should not be duplicated. For example, the following list can be provided by a user, or by default, to prevent the fields from being copied:
      1) Ordered Asset Id
      2) Asset Integration identifier
      3) Conflict Id
      4) Created
      5) Created By
      6) Covered Asset Id
      7) Delivery Status Code
      8) Last Updated
      9) Last Updated By
      10) Modification Number
      11) Previous Item Revision Id
      12) Quantity Cancelled
      13) Quantity Invoiced
      14) Quantity Received
      15) Quantity Shipped
      16) Quantity To Invoice
      17) Service Asset Id
      18) Service Item Id
      19) Order Item Processed Flag
   b) The identifier for the field must be unique to create a valid copied object and store it in the database. For example, the user can provide the following list of identifiers, or the list can be provided by default, to prevent the fields with the following identifiers from being copied:
      1) Integration identifier
      2) Row Id
      3) Order Line Number
      4) Order Line Number 2

Note that other fields can be included in the lists, in addition to, or instead of, the identifiers shown in the examples above.

f. Fully Exploded Method:

In some embodiments, the Fully Exploded Method is used primarily in the Apply Completed Sales order Line Item to Service Profile workflow described herein to determine whether the items in a quote or order object have been fully exploded. For example, the method returns a "false" indicator when it detects an item that satisfies the Explode criteria (Action Code="Add" and Track As Asset="Y") but still has a quantity greater than one (1). Otherwise, the Fully Exploded Method returns a "true" indicator to the workflow. Criteria similar to that included in the exception lists for the Explode Method can apply to determine if an item should be "exploded".

g. Field Delta Method:

The Field Delta Method is invoked when the field(s) specified in the user properties are updated. Users can specify fields on the attribute level or the quote/order item level that trigger the Field Delta Method to set the action code of the parent quote item to "Update". Users can also specify a method on the quote/order item level to specify the field(s) to update when the Field Delta Method triggers. Users can furthermore provide a logic expression to perform the update only under certain conditions, e.g., Action Code !='Add'.

Users can also configure particular fields at the quote item/order item level to trigger the action code to be set to 'Update' on the same quote item/order item level. For attributes, users can configure changes in any of the 3 data types fields (Text, Numeric, Date) to trigger the action code to be set to 'Update'.

In some embodiments, the EXISTING action code of the quote item/order item determines whether an update should be triggered or not. In some embodiments, the action code is updated under the following conditions when there are changes in the fields/attributes:

In a quote line item the action code is changed to 'Update' during an update.

In an order line item the action code is changed to 'Update' when the following criteria is met:

| Original Action Code | Line Item Status |
| --- | --- |
| — | All |
| Add | = 'Complete' |
| Update | All | h. Set Effectivity Dates Method

FIG. 11R shows a block diagram of input and output for a Set Effectivity Dates Method that can be utilized in the complex order processing system of FIG. 7B. In some embodiments, the Set Effectivity Dates Method creates two calculated fields called "Calculated Effective End Date" and "Calculated Effective Start Date", and a new field called "Completed Date". The "Calculated Effective End Date" is set to the date the action code of the item was set to "delete". The "Calculated Effective Start Date" is set to the date the action code of the item was set to "add". The "Completed Date" is based on the date the order was completed.

FIGS. 11S-1 through 11S-2 show an example of input to and the results of the functions performed by a Set Effectivity Dates Method.

i. Set Action Method

In some embodiments, the Set Action Method takes a property set containing a customizable product as input along with an action code string parameter. The Set Action Method iterates through the customizable product, sets the action code unconditionally to the value of the action code parameter, and returns the updated property set as output.

j. Save Object Method

In some embodiments, the Save Object Method receives a key and a property set hierarchy that represents a complex object, and saves the object in a string to object map using the key.

k. Get Object Method

In some embodiments, the Get Object Method receives a key and returns an object that corresponds to the key in a local map.

l. Reset Method

In some embodiments, the Reset Method deletes all saved objects from the map.

m. Module Licensed Method

In some embodiments, the Module Licensed Method determines whether the copy of order processing software in accordance with the present invention is licensed for the computer system executing the software.

n. Update Order Status Method

In some embodiments, the Update Order Status Method receives as input a property set of an order. For each root order item, the Update Order Status Method checks the "Status" field of the root item and all child items to determine whether they are "Complete", "Failed" or NULL. If so, then the Order Item Processed Flag field is set to "Y". Otherwise, the Order Item Processed Flag field is set to "N".

o. Merge Method

In some embodiments, the Merge Method receives 2 property sets that each include a complex object, such as hierarchical assets, quotes or items, and copies all the line items from the source complex object to the target complex object. The target complex object's header information (i.e., quote header, order header) is retained. The merged complex object is returned in a property set. In one embodiment, the merge Method requires a call to the Save Object Method to retrieve a saved property set from an internal hashtable of the Business Service object using the key for the property set. The Merge Method then enumerates through the root level line items of the input source delta quote property set and creates a mirror root level line item in a complex object, adding all the children in the hierarchy. The Merge Method returns the newly instantiated complex object once the hierarchy is fully traversed.

p. Set Field Method

In some embodiments, the Set Field Method receives a property set that includes a complex object, a field name, and a field value. The Set Field Method enumerates through the line item hierarchy of the complex object wrapped by the property set, finds the named field of each line item, and sets the field to the value provided.

q. Create Empty Complex Object Method

In some embodiments, the Create Empty Complex Object Method returns a property set with a property called "Is Empty" whose value will be "Y". For example, an empty property set can appear as:

```
PropertySet@12345678 p#1 c#0 type="" value=""
{
    p["Is Empty"] = "Y";
}
```
whereas a non-empty property set that is a complex object can appear as:
```
PropertySet@12345678 p#2 c#1 type="" value=""
{
    p["OutputIntObjectName"] = "OM Quote";
    p["PrimaryRowId"] = "0V-14Z1";
    c[0] PropertySet@87654321 p#4 c#1 type="Message" value=""
    {
        p["MessageId"] = "123";
        p["MessageType"] = "Integration Object";
        p["IntObjectName"] = "OM Quote";
        p["IntObjectFormat"] "Hierarchical";
        c[0] PropertySet@abcdefgh p#0 c#1 type="ListOf OM Quote" value=""
        {
            ...
        }
    }
}
```

In some embodiments, the Create Empty Complex Object Method receives an integration object name, and creates an empty complex object of the specified type containing no line items. The integration objects that can be passed into this method can be restricted, as required. The Create Empty Complex Object Method can use the integration object name to retrieve meta-data defining the object type, e.g., order, quote, asset, and the structure of the object. The Create Empty Complex Object Method outputs a property set that includes the empty complex object.

The business services described herein provide examples of methods that can be utilized by some embodiments of complex order processing system 700 (FIG. 7B) in accordance with the present invention. It is recognized that other business services having different functions, configurations, parameters, parameter names, and numbers of parameters, can be utilized in complex order processing system 700.

Data Model and Tables

Figure 12:
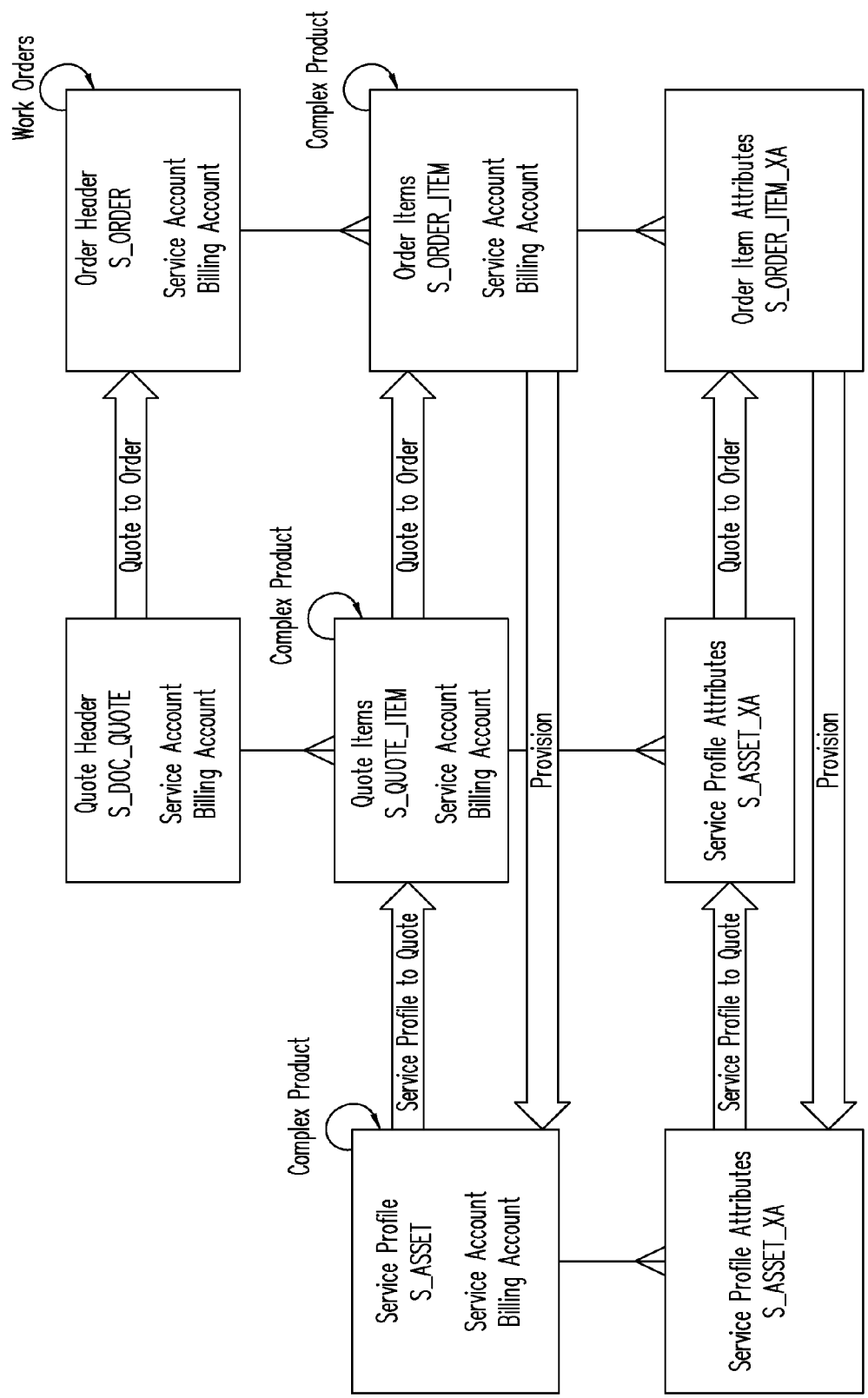
FIG. 12 shows an example of a logical data model that can be utilized in the complex order processing system of FIG. 7B.

FIG. 12 shows an example of a logical data model 1200 with database table names included in parenthesis that can be utilized in some embodiments of complex order processing system 700 (FIG. 7B) in accordance with the present invention. The tables in the data model 1200 include information for service items (S_ASSET), quote items (S_QUOTE_ITEM), and order items (S_ORDER_ITEM).

In some embodiments, the data model 1200 separates service items and sales orders. Service items are stored as assets to represent an instance of a product or service owned by an account. Both quote items and order items include an action field to indicate whether there is a change to the specified service item. Pricing can be stored in the quote item, sales order item, and service item entities. The tables included in some embodiments of complex order processing system 700 are as follows:

TABLE 1

Quote Line Item (S_QUOTE_ITEM)

| Column | Data Type | Purpose |
| --- | --- | --- |
| ACTION_CD | varchar 2 (30) | The action required for Delta Process (Add, Delete, Update) |
| SERV_ACCT_ID | varchar 2 (15) | Account at which the service is provided. |
| SERVICE_NUM | varchar 2 (100) | Holds the Telephone number, calling card number when asset, corresponding to these items, does not reside in the asset table. |
| INV_ACCT_ID | varchar 2 (15) | Account that is billed for the service. |
| ASSET_ID | varchar 2 (15) | Metering asset with which the service is associated. |
| INTEGRATION_ID | varchar 2 (30) | Unique identifier of the service item (asset). This is persistent throughout the quote, sales order, service profile to enable recreation of a future requested state of the service item. This differs from Service Asset ID because it is unique across all accounts and all time. |
| AGREE_ID | varchar 2 (15) | Agreement under which the quote line item is made. |
| EXTENDED_QTY | number (10, 0) | Absolute quantity of an item given its position in the customizable product hierarchy i.e. the product of the quantities of the parent items. |

TABLE 2

Product Integration (S_PROD_INT)

| Column | Data Type | Purpose |
| --- | --- | --- |
| SERV_INST_FLG | char (1) default 'N' | Flag to indicate whether a product requires a metering point. |
| CRT_AST_REC_FLG | char (1) default 'Y' | Flag to indicate that a product should be tracked as an asset. |
| PRICE_TYPE_CD | varchar 2 (30) | Price type (One-time, Recurring, Usage) |
| TRANSFERABLE_FLG | char (1) | Flag to indicate whether an asset is related to the site or whether it can be moved when the customer changes address. |

TABLE 3

Service Profile (S_ASSET)

| Column | Data Type | Purpose |
| --- | --- | --- |
| PURCH_ADJ_UNIT_PRI | number (22, 7) | Asset price adjusted to take into account discounts. |
| PURCH_LIST_UNIT_PRI | number (22, 7) | Base price of asset. |
| INTEGRATION_ID | varchar 2 (30) | Unique identifier of the service item (asset). This is persistent throughout the quote, sales order, and service profile to enable recreation of a future requested state of the service item. This differs from Service Asset ID because it is unique across all accounts and all time. |
| BL_ACCT_ID | varchar 2 (15) | The account that is billed for the service (asset). |
| SERV_ACCT_ID | varchar 2 (15) | The account at which the service (asset) is provided. |

TABLE 3-continued

Service Profile (S_ASSET)

| Column | Data Type | Purpose |
| --- | --- | --- |
| CUR_AGREE_ID | varchar 2 (15) | Agreement under which the service item (asset) is provided. |
| STATUS_CD | varchar 2 (30) | Status of the service item (Active, Deleted) |
| START_DT | date | Date service started. |
| END_DT | date | Date service ended. |
| PRI_DESC_TEXT | varchar 2 (?) | Price description (e.g. "10 c per minute for 20 minutes, 5 c per min after that") |
| SERVICE_POINT_ID | varchar 2 (15) | Metering asset with which the asset is associated. |
| EXTENDED_QTY | number (10, 0) | Absolute quantity of an item given its position in the customizable product hierarchy i.e. the product of the quantities of the parent items. |

TABLE 4

Service Profile Extended Attributes (S_ASSET_XA)

| Column | Data Type | Purpose |
| --- | --- | --- |
| ACTION_CD | varchar 2 (30) | The action required for Delta Process (Add, Delete, Update, -) |

TABLE 5

Quote Header Information (S_DOC_QUOTE):

| | |
| --- | --- |
| Agreement Id | The agreement under which this quote is made. |
| Service Account Id | The default service account for all quote line items. Default this to the account that is contracting for service. |
| Billing Account Id | The default billing account for all quote line items. Default this to the account that is contracting for service. |

TABLE 6

Quote Line Item Extended Attributes (S_QUOTE_ITEM_XA)

| Column | Data Type | Purpose |
| --- | --- | --- |
| ACTION_CD | varchar 2 (30) | The action required for Delta Process (Add, Delete, Update, -) |

TABLE 7

Order Header Information (S_ORDER)

| Column | Data Type | Purpose |
| --- | --- | --- |
| BL_ACCT_ID | varchar 2 (15) | Default billing account for all order line items. |
| SERV_ACCT_ID | varchar 2 (15) | Default service account for all order line items. |
| AGREE_ID | varchar 2 (15) | Agreement under which the order was made. |
| REV_NUM | number (22, 7) not null default 1 | Used for supplemental orders that revise existing orders. The revision number indicates the version of the original order. |

TABLE 7-continued

Order Header Information (S_ORDER)

| Column | Data Type | Purpose |
|---|---|---|
| ACTIVE_FLG | char (1) default 'Y' | Used for supplemental orders to indicate the active order. When an existing order is revised the active flag is set to 'N' and the supplemental order will have an active flag set to 'Y'. |

TABLE 8

Order Line Item (S_ORDER_ITEM)

| Column | Data Type | Purpose |
|---|---|---|
| ACTION_CD | varchar 2 (30) | The action required for Delta Process (Add, Delete, Update, -) |
| BL_ACCT_ID | varchar 2 (15) | Account at which the service is provided. |
| SERV_ACCT_ID | varchar 2 (15) | Account that is billed for the service. |
| AGREE_ID | varchar 2 (15) | Agreement under which the order line item was made. |
| SERVICE_NUM | varchar 2 (100) | Holds the Telephone number, calling card number when asset, corresponding to these items, does not reside in the asset table. |
| COMPLETED_DT | date | Date and time at which the order was completed (i.e. item was delivered; service was commenced or disconnected). |
| ASSET_ID | varchar 2 (15) | Metering asset with which the service is associated. |
| INTEGRATION_ID | varchar 2 (30) | Unique identifier of the service item (asset). This is persistent throughout the quote, sales order, service profile to enable recreation of a future requested state of the service item. This differs from Service Asset ID because it is unique across all accounts and all time. |
| PROCESSED_FLG | char (1) default 'N' | Order item processed flag indicates the status of the item and all of its children. If all the child items have a status of 'Complete', 'Failed' or '-', the flag will be 'Y'; otherwise 'N'. This is used to identify incomplete orders that need to be applied to the service profile at the start of an edit session. |
| EXTENDED_QTY | number (10, 0) | Absolute quantity of an item given its position in the customizable product hierarchy i.e. the product of the quantities of the parent items. |

TABLE 9

Order Line Item Extended Attributes (S_ORDER_ITEM_XA)

| Column | Data Type | Purpose |
|---|---|---|
| ACTION_CD | varchar 2 (30) | The action required for Delta Process (Add, Delete, Update, -) |

The following table provides examples of values that can be set in the following business component fields as utilized in some embodiments of complex order processing system 700:

| Business Component | Field | Value | Comment |
|---|---|---|---|
| Quote | Status | Retrieve from Service Profile | |
| Quote Line Item | Action Code | Add | |
| | | Update | |
| | | Delete | |
| | | — | Indicates no action. |
| Order | Type | Retrieve from Service Profile | Default to 'Sales Order'. |
| Order | Status | Retrieve from Service Profile + "Submitted" | |
| Order Line Item | Action | [See Quote Line Item] | |
| | Status | Pending | Quote has been converted to an order and is awaiting submission. Customer may configure intermediate steps to support order assurance or order approval. |
| | | Open | Submitted to provisioning system. |
| | | Complete | Enacted by the provisioning system. Now in service profile. |
| | | Failed | Dropped out during provisioning. |
| | | — | No action on this order item. |
| Asset | Status | Active | Product installed or service currently being delivered. |
| | | Inactive | Service has been disconnected. |
| | | Suspended | User can provide customized workflow to use this state. |

The data tables shown above are examples of tables that can be utilized by some embodiments of complex order processing system 700 (FIG. 7B) in accordance with the present invention. It is recognized that other data tables having different configurations such as the parameters, parameter names, numbers of parameters, storage requirements, and parameter values, can be utilized in complex order processing system 700.

Asset→Quote→Order Data Flow

Referring now to FIG. 12, a diagram of an example of the flow of data between the asset, quote items, and order items in some embodiments of complex order processing system 700 (FIG. 7B) is shown. In the example shown in FIG. 12, data in Service Profile and Service Profile Attributes tables is transferred to Quote Items and Quote Item Attributes tables, respectively during the Service Item to Quote Process workflow. Similarly, data in Quote Header, Quote Items, and Quote Item Attributes tables is transferred to Order Header, Order Items, and Order Item Attributes tables, respectively, during the Quote to Order Process workflow. Data in the Order Items, and Order Item Attributes tables is then transferred to the Service Profile and Service Profile Attributes tables, respectively, when an order is provisioned. Note that a user can supply an external provision workflow to perform the functions associated with maintaining the data tables when an order is provisioned.

The following table summarizes the flow of data in the asset, quote item, and order item tables from one table to the next in some embodiments of the asset to Quote to Order Process flow:

| Value | S_ASSET Column | S_QUOTE_ITEM Column | S_ORDER_ITEM Column |
|---|---|---|---|
| Action | | ACTION_CD | ACTION_CD |
| Adjusted Price* | PURCH_ADJ_UNIT_PRI | ADJ_UNIT_PRI | ADJ_UNIT_PRI |
| Agreement Id* | AGREE_ID | CUR_AGREE_ID | AGREE_ID |
| Asset Status | STATUS_CD | | |
| Billing Account Id* | BILL_ACCNT_ID | INV_ACCNT_ID | BILL_ACCNT_ID |
| Currency Code | ASSET_VAL_CURCY_CD | CURCY_CD | AMT_CURCY_CD |
| Due Date | | REQ_DLVRY_DT | REQ_SHIP_DT |
| Effective From Date | START_DT | | COMPLETE_DT |
| Effective To Date | END_DT | | COMPLETE_DT |
| Exchange Date | ASSET_VAL_EXCH_DT | AMT_DT | AMT_DT |
| Instance Id | INTEGRATION_ID | ASSET_INTEG_ID | ASSET_INTEG_ID |
| Line Number | | LN_NUM | LN_NUM |
| Order Line Status | | | STATUS_CD |
| Original Order Id | ORIG_ORDER_ID | | ROW_ID |
| Parent Item Id | PAR_ASSET_ID | PAR_SQ_ITEM_ID | PAR_ORDER_ITEM_ID |
| Pricing Comment* | COMMENTS | PRICING_COMMENT | PRICING_COMMENT |
| Product Id* | PROD_ID | PROD_ID | PROD_ID |
| Quantity | QTY | QTY_REQ | QTY_REQ |
| Quote Line Status | | STAT_CD | |
| Service Account Id* | SERV_ACCNT_ID | SERV_ACCNT_ID | SERV_ACCNT_ID |
| Service Id* | SERIAL_NUM | ASSET_NUM | ASSET_NUM |
| Service Point Id* | SERVICE_ID | ASSET_ID | ASSET_ID |
| Write-In Product Name | | PROD_NAME | PROD_NAME |

In some embodiments, other columns are copied in the Quote to Order Process (e.g. discounts, base price) but only the adjusted price is stored in the S_ASSET table. Other pricing related columns in S_QUOTE_ITEM and S_ORDER do not need to persist. Fields marked with an asterisk are compared during processing by some embodiments of the Delta Method.

Note that in some embodiments, SERIAL_NUM is used to store write-in service ids (e.g. telephone number) instead of ASSET_NUM. This is to ensure uniqueness of the S_ASSET_U1 user key. The same telephone number might be mapped to the same product at different times.

Usage Scenarios

The following provides an example of how an embodiment of complex order processing system 700 (FIG. 7B) may be utilized in a telecommunications company to set up an account, configure products and services for the customer, provide a quote for the products and services, modify the quoted configuration, place an order, and modify the order.

a. Initial Quote and Order

A telecom sales agent receives an inbound call from a customer who wants to establish ten local telephone lines for a new office his company has opened in Spokane, Wash. The sales agent establishes that American Widgets Inc is an existing GCI customer with offices in California and New York. She creates a new account by selecting the New Option on Identify Account View 900, such as shown in FIG. 9B, which initializes the details of the new service account in Spokane with the information from one of the existing accounts.

Once the new service account is established, the sales agent can invoke an Advisor program to understand the communications needs of the new office and offer recommendations for products and services to meet the customer's requirements. One Advisor program that is suitable for use is the eAdvisor program that is commercially available from Siebel Systems, Inc., San Mateo, Calif. If the product is customizable, the eAdvisor program invokes the Product Configurator. Other suitable Advisor programs can be utilized instead of the eAdvisor program.

The needs analysis indicates that a Small Business Enabler bundle is the most cost-effective solution for the customer. The customer has already read a description of the bundled plans, so he accepts the sales agent's advice. The sales agent selects an "Add to Shopping Basket" Option from the Advisor application program and the bundle appears in a Quotes Line Items View 932, such as shown in FIG. 9D-1. The sales agent then selects the Customize Option to launch the Product Configurator to configure the Small Business Enabler bundle of products.

The Small Business Enabler bundle offers up to ten local telephone lines for $5.99 per month per line. If the customer orders more than ten lines, the cost of all lines is reduced to $4.99 per month per line. A minimum of five lines must be purchased. Each line is configured with voice-mail and call waiting included in the base price. An additional optional feature is also included. The Small Business Enabler bundle itself costs $25 per month and includes consolidated billing.

The sales agent begins to configure the first local telephone line. She notes that the voice-mail and call waiting options have already been selected. The sales agent then enters a default password for the voice-mail account. She asks the customer if he would like to add caller id or call forwarding as an optional feature. The customer chooses caller id and confirms that he wants to set up all ten lines with the same features. The sales agent copies the first local telephone line and selects a new telephone number. She repeats the process until all ten lines are configured beneath the bundle and selects an Update Quote Option in the Price Configurator View (not shown). The Product Configurator places the configured services in the data tables, which are then retrieved by complex order processing system 700 (FIG. 7B) to populate the information fields in the Quote Line Items View 932.

The sales agent reviews the quote with the customer, which includes the Small Business Enabler bundle product with ten local telephone lines beneath it in the product hierarchy. Each of the local telephone lines has three child records to represent the voice-mail, call waiting, and caller id features. The voice-mail feature has an attribute to represent the account password. All items in the product hierarchy have an associated action code of "Add".

b. Delta Quote

A month later the customer calls the Telecom Company again and tells the sales agent that business is booming in Spokane and that he needs to add another five local telephone lines. The sales agent searches for the American Widgets Inc account located in Spokane, Wash. and navigates to the Customer Portal View 912 (FIG. 9C). There she sees that all of the services that the customer requested during his previous call were successfully installed and that each of the ten existing local telephone lines is in an "Active" state. She drills into the Small Business Enabler bundle product from the products and services service frame 916 (FIG. 9C). The sales agent determines that this is the best value plan for companies with up to twenty local phone lines. She then returns to the Customer Portal View 912, selects the Small Business Enabler bundle asset from the products and services (service) frame 916 and selects the Modify Option.

Upon selecting the Modify Option, the currently configured state of the Small Business Enabler bundle is displayed in the Product Configuration View (not shown). All ten local telephone lines are displayed with their calling features. The sales agent copies one of the existing local telephone lines five times and assigns a new telephone number to each. After creating the first new local telephone line, the sales agent notices that the recurring charge for each of the original ten local telephone lines has dropped from $5.99 per month to $4.99 per month. She tells the customer the good news. He is very pleased, but has one more request. A building contractor who had gone out of business under dubious circumstances had previously owned one of the telephone numbers assigned to American Widgets Inc.'s Spokane office. American Widgets had received calls from a number of angry creditors. The customer asks the sales agent to assign a new number to that line. The sales agent explains that she cannot change the number, but will instead disconnect that number and create a new one. She deletes the original local telephone line and copies one of the existing lines to create a replacement, which is then associated with a new telephone number. Finally, the sales agent presses the Update Quote Option to finish the configuration session.

The updated quote appears on a Quote Line Items View 932, such as shown in FIG. 9D-1. Nine of the original ten local telephone lines have an action code of "Update" and a new price of $4.99 per month. The local telephone line that caused the nuisance phone calls has an action code of "Delete". The child records of the original ten local telephone lines all have an empty action code field. The six new lines and their child records all have an action code of "Add".

After reviewing the quote, the sales agent asks the customer to confirm the changes. Unfortunately, the customer is no longer on the line. The sales agent saves the quote with an "In Progress" status and moves onto her next call.

c. Update Delta Quote and Order

A day later, the sales agent is reminded by a "to do" action to call the customer and see what he wants to do with the quote. She calls his office number where she finds the customer, who had to drop off the call to answer a call from his boss on another line. As it happens, his boss is moving to the Spokane office and wants to add an ISDN line. The sales agent again checks the Small Business Enabler bundle and sees that it also offers ISDN services at a discounted rate. The sales agent drills down on the active quote in quote frame 920 (FIG. 9C). This causes a Quotes Line Item View 932 to be presented with the corresponding information for the selected quote. The sales agent selects the Revise Option to change the service.

The Product Configuration View is again displayed showing the Small Business Enabler bundle in exactly the same state as it was after the sales agent configured the quote. The sales agent adds an ISDN line, associates it with a network asset and presses the Update Quote Option. The quote is updated with the additional ISDN line (with an action code of "Add") and an order for the quote is placed.

d. New Delta Quote with Open Order

That afternoon, the customer's boss logs onto the Telecom company's website to check the status of the new ISDN line. Upon logging in, the Customer Portal View 912 (FIG. 9C) is presented. The customer's boss does not see the ISDN line in the products and services (service and billing) frames 916, 918, so he selects the first open sales order in the orders frame 922. An Orders Line Items View 938, such as shown in FIG. 9E is presented that shows a summary of the sales order and the status of each order line item. The status of the ISDN line item is shown as "Pending".

Curious about the rates for the services, the customer's boss reviews the rates on the order and then drills into the Small Business Enabler bundle product to find out more. He sees that the bundle offers one free ISDN line for every two that are ordered. Thinking that the more senior sales representatives in the office might benefit from enhanced Intranet access, the boss decides to order two more ISDN lines to take advantage of the offer. He navigates back to the Customer Portal View 912 (FIG. 9C), selects the bundle product and selects the Revise Option. The Product Configurator View is presented with all of the installed products plus all of the changes and additions from the open order. The Product Configurator View shows the expected state of the customer service profile after the open order is provisioned. The boss adds two more ISDN lines and sees that the second of the two new lines is free. He selects the Update Quote Option and sees a summary of his changes. Only the two ISDN line items have an associated action ("Add"). They are correctly priced. The boss selects the Submit Option on the Orders Line Items View 938 (FIG. 9E) and logs off. The flexibility of complex order processing system 700 thus allows the customer to configure additional services, as well as delete services, while another order is still pending.

e. Legacy Systems

The architecture of complex order processing system 700 allows it to be configured to work without any change to a user's current "back-end" application programs. Historically, changes to the back-end application programs required years of effort and often resulted in errors and customer dissatisfaction.

Complex order processing system 700 can be configured to include the following customizations:

Two-way batch replication of customer account data to an external billing system, with a real-time Update Option if required.

Real-time access to customer service profile data via virtual business components. Customer service profiles continue to be stored in the user's mainframe system where they can be accessed and maintained by other application programs.

Real-time read access to sales orders by legacy order management and provisioning systems via virtual business components.

Capture and validation of quotes and sales orders prior to submission to the legacy order management and provisioning system.

Ability to configure a customer's service profile from the projected future state including all pending orders in complex order processing system 700 (FIG. 7B).

f. Supplemental Order

Another customer receives a call from an outbound telesales rep for the Telecom company. The sales rep explains the advantages of Telecom's local phone service and persuades the customer to switch to Telecom's service. The sales rep selects a Local Breakthrough Package, which includes a local telephone line plus caller id and call forwarding. The customer decides to forward calls to her office number after six rings. She asks the sales rep if voice-mail service is available. The sales rep explains that voice-mail is not included in the base package, but can be added for an additional $6.95 per month. The customer agrees to the terms, so the sales rep thanks her and submits the order.

Twenty minutes later the customer decides that $6.95 per month is a little much for voice-mail service. She calls Telecom's service number and speaks to the sales agent. The sales agent identifies the customer's account and sees that she has just signed up for service. The customer explains that she no longer wants to subscribe to voice-mail service. The sales agent selects the open order and sees all of the order line items are still open, so she selects the Revise Option to create a supplemental order. The original order is marked as inactive and is copied to a new active order with status "Pending" and a revision number of 2. Working in the new order, the sales agent selects the Local Breakthrough Package and deletes the voice-mail feature. The customer also requests a change to the call forwarding number she provided earlier to that of her cell phone number. The sales agent selects the forwarding number attribute of the call forwarding service and changes it as requested. She then saves the new configuration to the supplemental order and submits the supplemental order. The status of the supplemental order changes to "Open".

V. Other Embodiments

While complex order processing system 700 has been described using examples of telecommunication and energy products and services, complex order processing system 700 can be configured to process orders for a variety of companies and industries. For example, aircraft, computer, automobile, furniture, construction, travel, and entertainment companies can configure complex order processing system 700 to provide quotes and receive orders for their products and services.

A further advantage is that the architecture of complex order processing system 700 allows complex order processing system 700 to share information with other back-end application programs and databases without requiring changes to the application programs and databases.

A further advantage is that the customer can log in to complex order processing system 700 to view and modify current quotes and open orders without the assistance of a sales or customer representative.

A further advantage is that a third party provider can be given access to view a customer's current products, services, and orders. This enables the provider to determine a customer's requirements, such as the type of equipment installed at a customer's premises that requires service. The repairman can then arrive with the parts used in the equipment.

The foregoing detailed description has set forth various embodiments of the present invention via the use of block diagrams, flowcharts, and examples. It will be understood by those within the art that each block diagram component, flowchart step, and operation and/or element illustrated by the use of examples can be implemented, individually and/or collectively, by a wide range of hardware, software, firmware, or any combination thereof. In one embodiment, the present invention can be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The methods in accordance with the present invention can be embodied in the form of computer-implemented processes and apparatuses for practicing those processes. The methods can also be embodied in the form of computer program code embodied in tangible media, such as floppy diskettes, CD-ROMS, hard drives, or any other computer-readable storage medium where, when the computer program code is loaded into and executed by a computer, the computer becomes an apparatus for practicing the invention. The method can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Various embodiments of the present invention are well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

We claim:

1. A computer-implemented method comprising:
   submitting an order for provisioning,
   generating a list of accounts;
   selecting a selected account by detecting selection of one of the accounts, wherein the selecting a selected account is performed using a computer;

generating a list of orders associated with the selected account, wherein
the list of orders comprises orders that have been submitted to an external provisioning system for provisioning,
the orders comprise the order, and
the computer and the external provisioning system are communicatively coupled to one another;
selecting a selected order by detecting selection of one of the orders that has been submitted for provisioning by the external provisioning system, wherein
the selecting a selected order is performed using the computer, and
the selected order is the order;
detecting a request to make a change to the selected order, wherein the request comprises a change to the selected order;
incorporating the change in the selected order;
submitting a re-submitted order by submitting the selected order for provisioning by the external provisioning system;
synchronizing the re-submitted order in the external provisioning system to override the one of the orders that had been submitted for provisioning; and
causing the re-submitted order to be provisioned by the external provisioning system.

2. The computer-implemented method, as set forth in claim 1, further comprising:
generating a list of items comprising the selected order;
determining whether each item in the list of items has been delivered;
selecting a selected item by detecting selection of one of the items; and
allowing a user to reconfigure the selected item if the selected item has not been delivered.

3. The computer-implemented method, as set forth in claim 2, further comprising:
changing the status of the selected item to indicate that the selected item has been updated.

4. The computer-implemented method, as set forth in claim 1, further comprising:
changing the status of the selected order to indicate that the selected order has been updated.

5. The computer-implemented method, as set forth in claim 1, further comprising:
generating a list of quotes associated with the selected account.

6. The computer-implemented method, as set forth in claim 1, further comprising:
generating a list of quotes associated with the selected account;
selecting a selected quote by detecting selection of one of the quotes;
detecting a request to make a change to the selected quote; and
incorporating the change in the selected quote.

7. The computer-implemented method, as set forth in claim 1, further comprising:
generating a list of assets associated with the selected account;
selecting a selected asset by detecting selection of one of the assets;
detecting a request to make a change to the selected asset; and
incorporating the change to the asset in a quote.

8. The computer-implemented method, as set forth in claim 7, further comprising:
submitting the selected quote to an order.

9. The computer-implemented method, as set forth in claim 7, further comprising:
generating a list of items comprising the selected asset;
selecting a selected item by detecting selection of one of the items; and
allowing a user to reconfigure the selected item.

10. The computer-implemented method, as set forth in claim 9, further comprising:
ungrouping the selected item with a quantity of more than one to a corresponding multiple of items; and
allowing the user to individually reconfigure each item of the multiple of items.

11. The computer-implemented method, as set forth in claim 9, further comprising:
generating a list of quotes associated with the selected account;
selecting a selected quote by detecting selection of one of the quotes; and
detecting selection of an option to update potential revenue based on the price of items in the selected quote.

12. The computer-implemented method as set forth in claim 7, wherein the change comprises disconnecting the asset.

13. The computer-implemented method, as set forth in claim 1, further comprising:
detecting selection of an option to create a quote for a new asset, wherein the quote is associated with the selected account;
generating a list assets comprising products and services available;
selecting a selected asset by detecting selection of an asset; and
invoking a product configurator to allow the user to configure the selected asset.

14. The computer-implemented method as set forth in claim 1 wherein the change comprises transferring the selected asset, the method further comprising:
detecting selection of an option to transfer the selected asset;
copying information about the configuration of the selected asset to a quote;
setting the status of items in the quote to indicate that the items are to be included in a service profile at a new address; and
copying information about the selected asset.

15. The computer-implemented method as set forth in claim 14, further comprising:
copying the information about the configuration of the selected asset to a second quote; and
setting the status of items in the quote to indicate that the items are to be disconnected in a service profile at an old address.

* * * * *

UNITED STATES PATENT AND TRADEMARK OFFICE
CERTIFICATE OF CORRECTION

PATENT NO.       : 7,379,903 B2
APPLICATION NO.  : 10/028541
DATED            : May 27, 2008
INVENTOR(S)      : Caballero et al.

It is certified that error appears in the above-identified patent and that said Letters Patent is hereby corrected as shown below:

In column 2, line 33, delete "A" and insert -- a --, therefor.

In column 4, line 53, delete "11Q-2" and insert -- 11O-2 --, therefor.

In column 4, line 56, delete "11R" and insert -- 11P --, therefor.

In column 4, line 65, delete "11S" and insert -- 11S-1 --, therefor.

In column 14, line 32, delete "apply." and insert -- apply --, therefor.

In column 14, line 32, after "items" insert -- . --.

In column 14, line 62, delete "transmit" and insert -- transit --, therefor.

In column 17, line 7, before "provisioning" insert -- ( --.

In column 19, line 59, after "which" insert -- : --.

In column 21, line 43, after "applied" insert -- ; --.

In column 21, line 45, after "asset" insert -- . --.

In column 24, line 25, after "object" insert -- . --.

In column 30, line 23, delete "QrderItem" and insert -- OrderItem --, therefor.

In column 30, line 29, delete "(OrderItem" and insert -- [OrderItem --, therefor.

In column 31, line 19, delete "tAttribute.Id)" and insert -- [Attribute.Id] --, therefor.

In column 31, line 29, delete "DeltaMethod" and insert -- Delta Method --, therefor.

In column 32, line 27, after ""–"" insert -- . --.

UNITED STATES PATENT AND TRADEMARK OFFICE
CERTIFICATE OF CORRECTION

PATENT NO. : 7,379,903 B2
APPLICATION NO. : 10/028541
DATED : May 27, 2008
INVENTOR(S) : Caballero et al.

It is certified that error appears in the above-identified patent and that said Letters Patent is hereby corrected as shown below:

In column 34, line 21, below "if OldAssetFlatList[NewItem.IntegrationId].ParentId" insert -- < > --.

In column 35, line 44, after "Type" insert -- : --.

In column 35, line 46, after "Type" insert -- : --.

In column 35, line 47, after "Name" insert -- : --.

In column 36, line 45, delete "110-2." and insert -- 11O-2. --, therefor.

Signed and Sealed this

Seventh Day of July, 2009

JOHN DOLL
*Acting Director of the United States Patent and Trademark Office*